United States Patent
Bala et al.

(10) Patent No.: US 10,608,858 B2
(45) Date of Patent: *Mar. 31, 2020

(54) ZERO TAIL AND UNIQUE WORD BASED WAVEFORMS FOR DFT-S OFDM AND OFDM

(71) Applicant: IDAC HOLDINGS, INC., Wilmington, DE (US)

(72) Inventors: Erdem Bala, East Meadow, NY (US); Mihaela C. Beluri, Jericho, NY (US); Kyle Jung-Lin Pan, Saint James, NY (US); Tao Deng, Roslyn, NY (US); Liangping Ma, San Diego, CA (US); Yugeswar Deenoo, Chalfont, PA (US); Ravikumar V. Pragada, Warrington, PA (US); Alphan Sahin, Westbury, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,991

(22) Filed: Mar. 5, 2019

(65) Prior Publication Data

US 2019/0199569 A1 Jun. 27, 2019

Related U.S. Application Data

(63) Continuation of application No. 15/777,761, filed as application No. PCT/US2016/064196 on Nov. 30, 2016, now Pat. No. 10,284,407.

(Continued)

(51) Int. Cl.
*H04L 27/26* (2006.01)

(52) U.S. Cl.
CPC ...... *H04L 27/2627* (2013.01); *H04L 27/2605* (2013.01)

(58) Field of Classification Search
CPC ............... H04L 5/0007; H04L 27/2602; H04L 27/2605; H04L 27/2607
See application file for complete search history.

(56) References Cited

U.S. PATENT DOCUMENTS 7,573,944 B2 8/2009 Chang et al.
9,178,737 B2 11/2015 Fechtel
(Continued)

FOREIGN PATENT DOCUMENTS

EP 2566121 A1 3/2013

OTHER PUBLICATIONS

Berardinelli et al., "On the Potential of Zero-Tail DFT-Spread-OFDM in 5G Networks," Proceedings of the IEEE Vehicular Technology Conference (VTC) (Sep. 2014).
(Continued)

*Primary Examiner* — Kevin Kim

(57) ABSTRACT

Methods and systems for operation in a wireless network are provided, the methods including receiving modulated data symbols and zeros in a frequency-domain, and mapping in the frequency-domain the modulated data symbols and zeros in an interleaved manner to sub-carriers within a resource allocation. The methods and systems further include generating a time-domain data signal based on the mapped sub-carriers, and generating a time domain cancellation signal by sign inverting and repeating a predetermined number of time-domain samples at a tail portion of the data signal. The methods and systems further include combining the time-domain data signal and the time domain cancellation signal to generate an exact zero tail data signal such that the exact zero tail data signal has a zero tail length equal to the predetermined number of time-domain samples, and transmitting the exact zero tail data signal.

10 Claims, 37 Drawing Sheets

Related U.S. Application Data

(60) Provisional application No. 62/262,649, filed on Dec. 3, 2015.

(56) References Cited

U.S. PATENT DOCUMENTS

| | | | |
|---|---|---|---|
| 9,313,063 B1* | 4/2016 | Jia | H04L 27/2605 |
| 9,544,171 B2* | 1/2017 | Berardinelli | H04L 25/03343 |
| 2012/0213312 A1 | 8/2012 | Futatsugi et al. | |
| 2016/0006586 A1 | 1/2016 | Berardinelli et al. | |
| 2016/0233899 A1 | 8/2016 | Thomas et al. | |

OTHER PUBLICATIONS

Berardinelli et al., "On the Potential of OFDM Enhancements as 5G Waveforms," Proceedings of the IEEE Vehicular Technology Conference (VTC Spring), pp. 1-5 (May 2014).

Berardinelli et al., "Zero-tail DFT-spread-OFDM signals," IEEE Globecom 2013 Workshop, pp. 229-234 (Dec. 9, 2013).

Ghosh et al., "Millimeter Wave Enhanced Local Area Systems: A High Data Rate Approach for Future Wireless Networks", IEEE Journal on Selected Areas in Communications, vol. 32, No. 6, pp. 1152-1163 (Jun. 2014).

Huemer et al., "Classical and Bayesian Linear Data Estimators for Unique Word OFDM," IEEE Transactions on Signal Processing, pp. 6073-6085 (Dec. 2011).

Huemer et al., "Non-Systematic Complex Number RS Coded OFDM by Unique Word Prefix," IEEE, pp. 1-16 (Dec. 2012).

Huemer et al., "The Potential of Unique Words in OFDM," Proceedings of the 15th International OFDM-Workshop, pp. 140-144 (Sep. 2010).

Intel Corporation, "Discussion on waveform for high frequency bands," 3GPP TSG RAN WG1 Meeting #85, R1-164176, Nanjing, P.R.O.C (May 23-27, 2016).

KDDI, "Link level evaluation of waveforms for open-loop synchronized Uplink," 3GPP TSG RAN WG1 Meeting #85, R1-165257, Nanjing, China (May 23-27, 2016).

Qualcomm Technologies, Inc., "5G Waveform & Multiple Access Techniques," pp. 1-46 (Nov. 4, 2015).

Rappaport et al., "Millimeter Wave Mobile Communications for 5G Cellular: It Will Work!," IEEE Access, vol. 1, pp. 335-349 (2013).

Sahin et al., "An Improved Unique Word DFT-Spread OFDM Scheme for 5G Systems," IEEE Globecom Workshops, pp. 1-6 (Dec. 6, 2015).

Third Generation Partnership Project, "Technical Specification Group Radio Access Network; Small cell enhancements for E-UTRA and E-UTRAN—Physical layer aspects (Release 12)," 3GPP TR 36.872 V12.0.0 (Sep. 2013).

Third Generation Partnership Project, "Technical Specification Group Radio Access Network; Small cell enhancements for E-UTRA and E-UTRAN—Physical layer aspects (Release 12)," 3GPP TR 36.872 V12.1.0 (Dec. 2013).

Third Generation Partnership Project, "Technical Specification Group Radio Access Network; Evolved Universal Terrestrial Radio Access (E-UTRA); Radio Frequency (RF) system scenarios (Release 11)," 3GPP TR 36.942 V11.0.0 (Sep. 2012).

Third Generation Partnership Project, "Technical Specification Group Radio Access Network; Evolved Universal Terrestrial Radio Access (E-UTRA); Radio Frequency (RF) system scenarios (Release 12)," 3GPP TR 36.942 V12.0.0 (Sep. 2014).

Third Generation Partnership Project, "Technical Specification Group Radio Access Network; Evolved Universal Terrestrial Radio Access (E-UTRA); Radio Frequency (RF) system scenarios (Release 13)," 3GPP TR 36.942 V13.0.0 (Jan. 2016).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).

Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).

Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).

Third Generation Partnership Project, "Technical Specification Group Radio Access Network; Evolved Universal Terrestrial Radio Access (E-UTRA); Physical channels and modulation (Release 13)," 3GPP TS 36.211 V13.3.0 (Sep. 2016).

Third Generation Partnership Project, "Technical Specification Group Radio Access Network; Evolved Universal Terrestrial Radio Access (E-UTRA); Physical channels and modulation (Release 14)," 3GPP TS 36.211 V14.0.0 (Sep. 2016).

Hasegawa et al., "Static Sequence Assisted Out-of-Band Power Suppression for DFT-s-OFDM," 2015 IEEE 26th Annual International Symposium on Personal, Indoor and Mobile Radio Communications, pp. 61-66 (Sep. 2015).

Jiang et al., "A New Out-of-Band Power Suppression Scheme by Extending Effective Cyclic-Prefix of OFDM," 2010 IEEE 71st Vehicular Technology Conference (May 2010).

* cited by examiner

ZERO TAIL AND UNIQUE WORD BASED WAVEFORMS FOR DFT-S OFDM AND OFDM

CROSS REFERENCE TO RELATED APPLICATION

This application is a continuation of U.S. patent application Ser. No. 15/777,761 filed on May 21, 2018, which is the U.S. National Stage, under 35 U.S.C. § 371, of International Application No. PCT/US2016/064196 filed Nov. 30, 2016, which claims the benefit of U.S. provisional application No. 62/262,649 filed Dec. 3, 2015, the contents of which are hereby incorporated by reference herein.

BACKGROUND

In order to meet the high data rate required for the next generation of cellular communication systems, the wireless industry and academia have been exploring ways to leverage the bandwidths available below-6 GHz and above-6 GHz frequencies, e.g., at centimeter wave (cmW) and millimeter wave (mmW) frequencies. The large bandwidth available at these frequencies may provide enormous capacity improvement for user-specific data transmission.

One challenge of using above-6 GHz frequencies may be characteristics related to their propagation which may be unfavorable for wireless communication, especially in an outdoor environment. For example, higher frequency transmissions may experience higher free space path loss. Rainfall and atmospheric gasses, for example, oxygen, may add further attenuation and foliage may cause attenuation and depolarization.

Narrow beam patterns, which may be used to counter these losses, may pose challenges for a base station (e.g., eNodeB) in delivering cell-specific or broadcast information. As a result, initial mmW access link system design may focus on cellular system procedures that enable add-on mmW data transmission (e.g., at least downlink transmission) to an existing network such as a small cell LTE network. Outdoor mmW cellular networks may be feasible through the use of beamforming techniques. In addition, a large number of reflected and scattered multipath components (MPC) may be utilized to facilitate the mmW coverage in non-line-of-sight (NLOS) conditions.

SUMMARY

Methods, apparatuses and systems for operation in a wireless network are provided for transmitting and/or receiving an exact zero tail data signal.

According to an embodiment, method implemented in a wireless communication device includes generating, by at least one processor, a data signal, including mapping, in a frequency domain, a plurality of data symbols and a plurality of zeros to a plurality of allocated subcarriers in an interleaved manner such that the plurality of zeros are mapped to empty subcarriers of the plurality of allocated subcarriers interleaved among data subcarriers of the plurality of allocated subcarriers; converting, by the at least one processor, the data signal to a time-domain; selecting, by the at least one processor, a plurality of tail time-domain samples from a tail portion of the converted data signal; generating, by the at least one processor, a cancellation signal from the selected plurality of tail time-domain samples; generating, by the at least one processor, an exact zero tail data signal in the time domain by combining the cancellation signal with the converted data signal such that the tail portion of the data signal is canceled; and transmitting, by a transmitter, the exact zero tail data signal.

According to another embodiment, a method for transmitting an exact zero tail data signal in wireless communications includes receiving, by at least one processor, modulated data symbols and zeros in a frequency-domain; mapping in the frequency-domain, by at least one processor, the modulated data symbols and zeros in an interleaved manner to sub-carriers within a resource allocation; generating, by the at least one processor, a time-domain data signal based on the mapped sub-carriers; generating, by the at least one processor, a time domain cancellation signal by sign inverting and repeating a predetermined number of time-domain samples at a tail portion of the data signal; combining, by the at least one processor, the time-domain data signal and the time domain cancellation signal to generate an exact zero tail data signal, such that the exact zero tail data signal has a zero tail length equal to the predetermined number of time-domain samples; and transmitting, by a transmitter, the exact zero tail data signal.

According to another embodiment, a wireless communication device configured to transmit an exact zero tail data signal in wireless communications is provided. The wireless communication device includes at least one processor configured to generate a data signal by mapping, in a frequency domain, a plurality of data symbols and a plurality of zeros to a plurality of allocated subcarriers in an interleaved manner such that the plurality of zeros are mapped to empty subcarriers of the plurality of allocated subcarriers interleaved among data subcarriers of the plurality of allocated subcarriers; the at least one processor is further configured to convert the data signal to a time-domain and select a plurality of tail time-domain samples from a tail portion of the converted data signal; the at least one processor is further configured to generate a cancellation signal from the selected plurality of tail time-domain samples; the at least one processor is further configured to generate the exact zero tail data signal in the time domain by combining the cancellation signal with the converted data signal such that the tail portion of the data signal is canceled; and a transmitter configured to transmit the exact zero tail data signal.

BRIEF DESCRIPTION OF THE DRAWINGS

A more detailed understanding may be had from the following description, given by way of example in conjunction with the accompanying drawings wherein.

DETAILED DESCRIPTION

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Embodiments described herein may define transmission modes (including reference signals and channel state information (CSI) feedback) and transmission schemes for operation of highly directional beamformed systems. In addition, embodiments may define how to mitigate control and/or data channel performance loss due to narrow beam misalignment, for example, for systems operating in higher frequency bands (e.g., above-6 GHz frequencies).

The latter problem can further be broken down into two different scenarios. In the first scenario, a change in the wireless transmit/receive unit (WTRU) orientation may be such that the data channel performance using a narrow beam pair may be significantly degraded, while the downlink (DL) wide beam control channel may still be received by the WTRU. In the second scenario, the WTRU orientation change may be such that both the data and the control channels may not be received by the WTRU.

Embodiments may include downlink/uplink (DL/UL) transmission schemes for the access link of beamformed systems operating in the high frequency bands (e.g., above 6 GHz) using one or multiple radio frequency (RF) chains. In addition embodiments may define DL/UL transmission modes and modes of operations.

In addition to presenting transmission schemes and transmission modes for above 6 GHz systems, embodiments described herein that are applicable to systems operating below 6 GHz and may include various scenarios where significant degradation of the control and/or data channel performance may occur due to transmit-receive (Tx-Rx) beam misalignment. Embodiments may address techniques for control and data fallback to maintain connectivity until a transmission mode change or a beam change is performed. Thus, embodiments may provide solutions that leverage the bandwidths available both below-6 GHz and above-6 GHz frequencies.

Figure 1A:
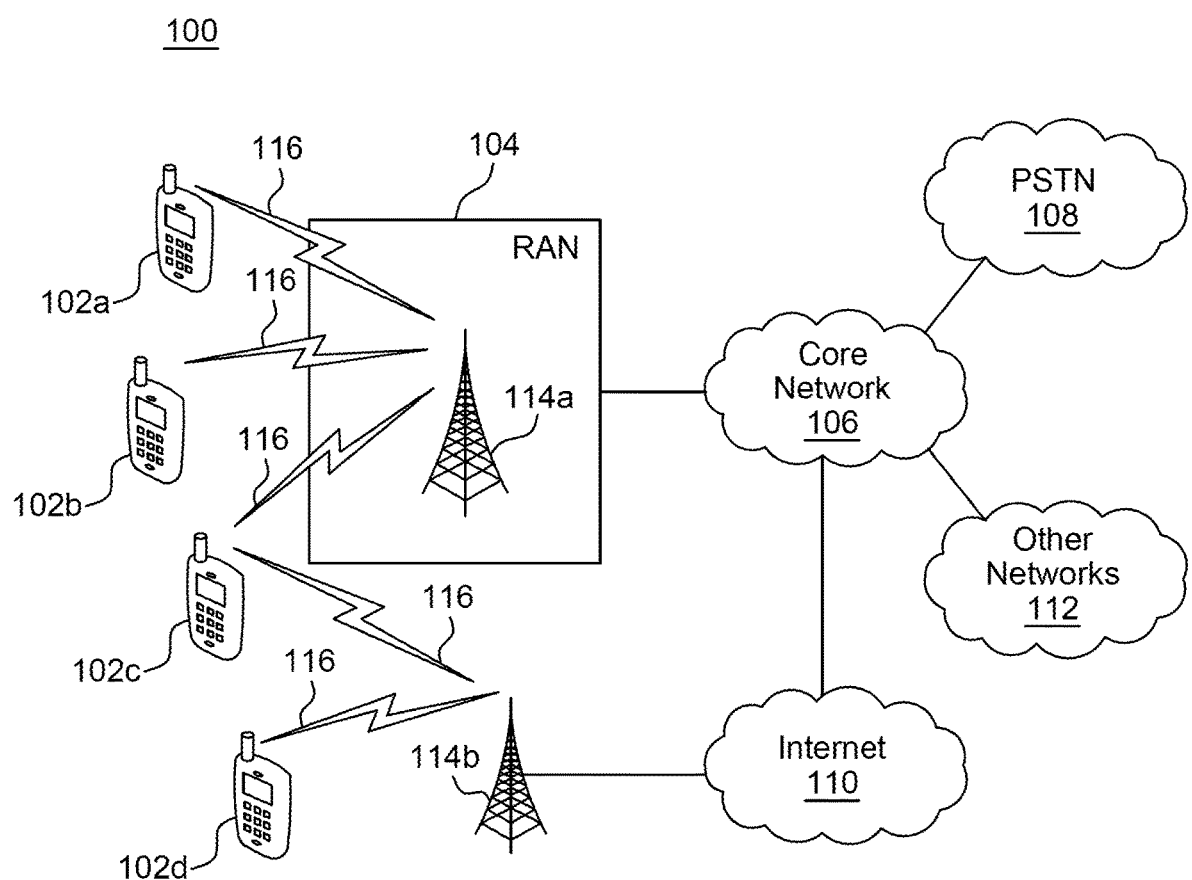
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access embodiments, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

One or more of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
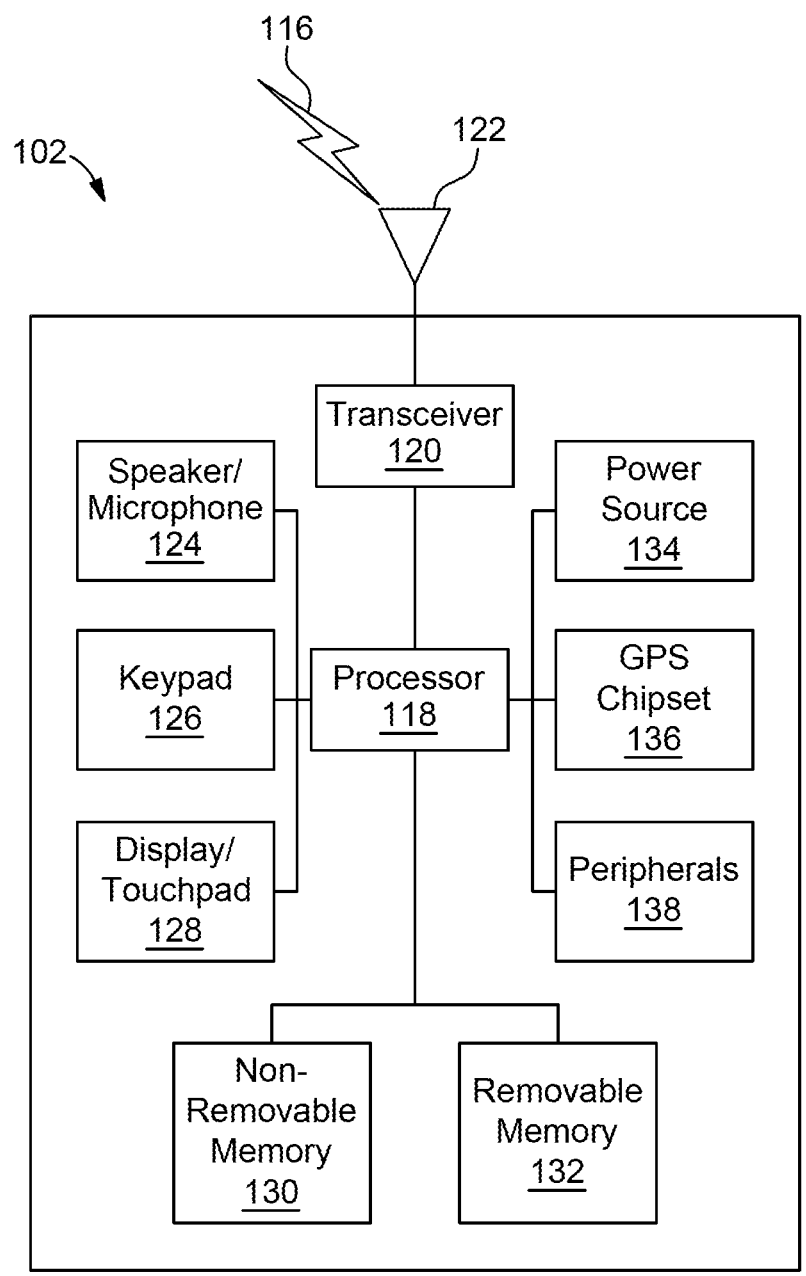
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive radio frequency (RF) signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
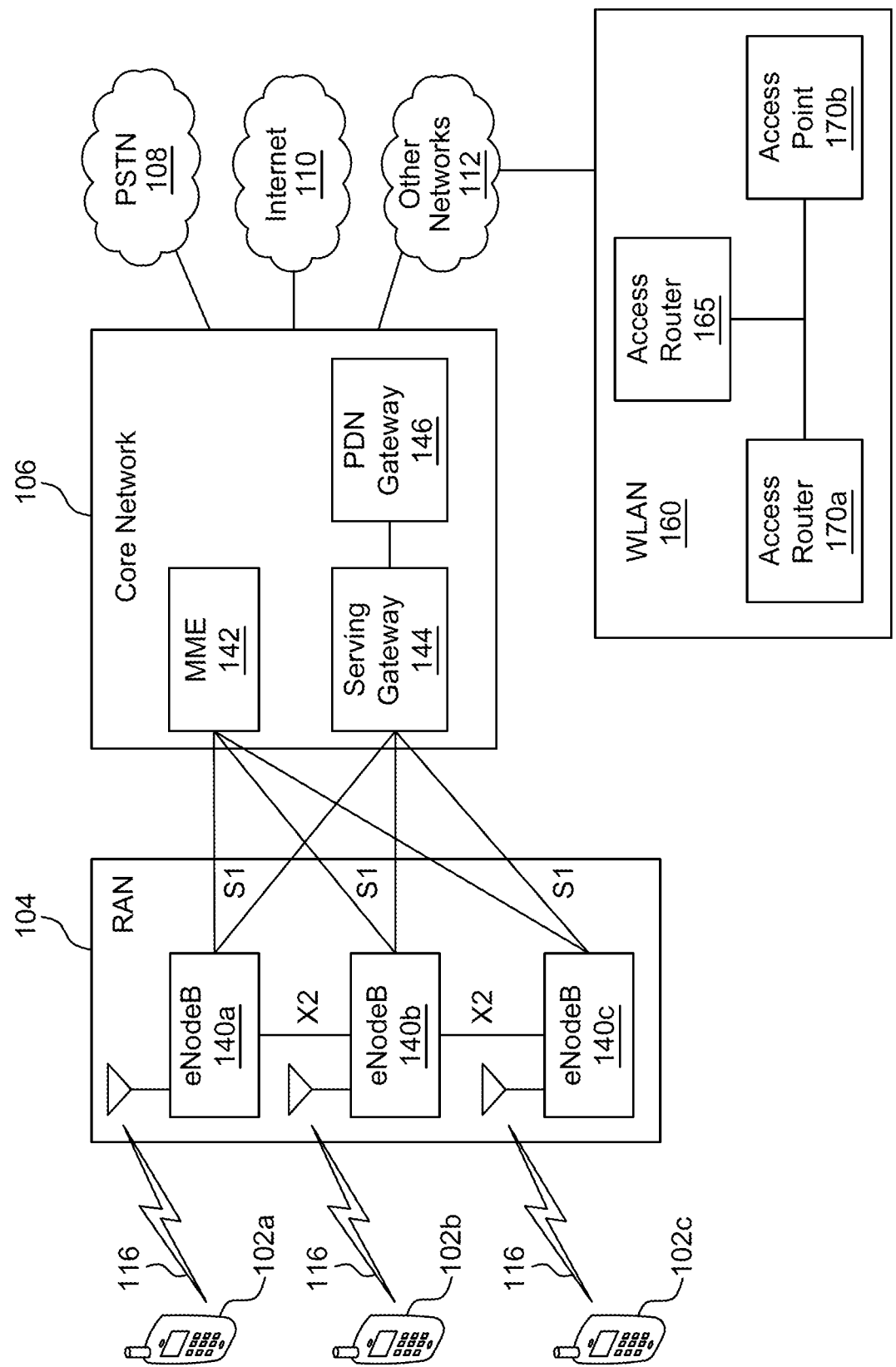
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

It should be noted that although 3GPP LTE may be used for example purposes, the techniques described herein may be applied to any other system.

The following list of definitions, although not intended to be limiting, may be helpful in understanding the following embodiments.

A "beam" may be one of the lobes, for example, main/side/grating lobes of the transmit radiation pattern and receive gain pattern of an antenna array. A beam may also denote a spatial direction that may be represented with a set beamforming weights. A beam may be identified or associated with a reference signal, an antenna port, a beam identity (ID), and/or a scrambling sequence number. A beam may be transmitted and/or received at a specific time, frequency, code, and/or spatial resource. A beam may be formed digitally, in an analog manner, or both (i.e., hybrid beamforming). The analog beamforming may be based on fixed code-book or continuous phase shifting.

A "beam-specific reference signal" (BSRS) may be a sequence associated with a transmit beam used for beam acquisition, timing and/or frequency synchronization, channel estimation for a physical downlink directional control channel (PDDCCH), fine beam tracking, beam measurement, etc. BSRS may carry (e.g., implicitly carry) beam identity information. There may be different types of BSRS. For example, there may be BSRS for an mmW sector and its member segments. The segment may be referred as a beam direction (e.g., a narrow beam direction or a wide beam direction).

A "data channel beam" may be used to transmit a data channel, a Physical Downlink Shared Channel (PDSCH), a mPDSCH, a mmW PDSCH, a mmW data channel, a directional PDSCH, a beamformed data channel, a spatial data channel, a data channel slice, or a high frequency data channel. The data channel beam may be identified or associated with a reference signal, an antenna port, a beam identity (ID), and/or a scrambling sequence number. The data channel beam may be transmitted and/or received at a specific time using frequency, code, and/or spatial resources.

A "control channel beam" may be used to transmit a control channel, a control channel beam, a PDCCH, an mPDCCH, an mmW PDCCH, an mmW control channel, a directional PDCCH, a beamformed control channel, a spatial control channel, a control channel slice or a high frequency control channel. A control channel beam may be identified or associated with a reference signal, an antenna port, a beam identity (ID), a scrambling sequence number and may be transmitted and/or received at a specific time and/or frequency and/or code and/or spatial resources.

A "measurement beam" may be used to transmit a signal or channel for beam measurement. This may include a beam reference signal, a beam measurement reference signal, Cell Specific Reference Signal (CRS), Channel State Information-Reference Signal (CSI-RS), CSI-interference measurement (CSI-IM), etc. The measurement beam may be identified or associated with a reference signal, an antenna port, a beam identity (ID), and/or a scrambling sequence number. The measurement beam may be transmitted and/or received at a specific time, frequency, code, and/or spatial resource.

A "control channel beam duration" may be the length in the time domain, which may be referred to in units of OFDM symbols, used within a scheduling interval for the transmission of one control channel beam. For example, a control channel beam duration may be a number of OFDM symbols in a TTI occupied by one control channel beam.

A "control region" may be the length in the time domain, which may be referred to in units of OFDM symbols, used within a scheduling interval for the transmission of all the control channel beams in that scheduling interval. For example, a control region may be the number of OFDM symbols in a TTI occupied by all the control channel beams transmitted in the TTI.

A "data region" may be part of the scheduling interval in time domain, which may be referred to in units of OFDM symbols, used for the transmission of all data channel beams in that scheduling interval.

In one or more embodiments described herein, the terms base station, eNode-B (eNB), mmW eNB (mB), Small Cell mmW eNB (SCmB), cell, small cell, primary cell (Pcell), and secondary cell (Scell) may be used interchangeably. In some embodiments, the term operate may be used interchangeably with transmit and/or receive. In some embodiments, the terms component carrier, mmW carrier may be used interchangeably with serving cell.

In one or more embodiments, the mB may transmit and/or receive one or more mmW channels and/or signals in a licensed band and/or an unlicensed band.

In some embodiments, the term WTRU may be substituted for eNB and/or vice versa and still be consistent with this disclosure. In some embodiments, UL may be substituted for DL and/or vice versa and still be consistent with this disclosure.

In one or more embodiments, a channel may refer to a frequency band that may have a center frequency (i.e., a carrier frequency) and a bandwidth. Licensed and/or unlicensed spectrum may include one or more channels which may or may not overlap. Channel, frequency channel, wireless channel, and mmW channel may be used interchangeably. Accessing a channel may be the same as using (e.g., transmitting and/or receiving on or using) a channel.

In one or more embodiments, a channel may refer to a mmW channel or signal, such as an uplink or downlink physical channel or signal. Downlink channels and signals may include one or more of the following: mmW synchronization signal, mmW broadcast channel, mmW cell reference signal, mmW beam reference signal, mmW beam control channel, mmW beam data channel, mmW hybrid automatic repeat request (ARQ) indicator channel, mmW demodulation reference signal, primary synchronization signal (PSS), secondary synchronization signal (SSS), demodulation reference signal (DMRS), CRS, CSI-RS, Physical Broadcast Channel (PBCH), Physical downlink Control Channel (PDCCH), Physical Hybrid ARQ Indicator Channel (PHICH), Enhanced Physical Downlink Control Channel (EPDCCH), and PDSCH. Uplink channels and signals may include one or more of the following: mmW Physical Random Access Channel (PRACH), mmW control channel, mmW data channel, mmW beam reference signal, mmW demodulation reference signal, PRACH, Physical Uplink Control Channel (PUCCH), sounding reference signal (SRS), DMRS and Physical Uplink Shared Channel (PUSCH). Channel and mmW channel may be used interchangeably. Channels and signals may be used interchangeably. PRACH and preamble may also be used interchangeably.

In one or more embodiments, data may mean data signal and/or data channel, and control may mean control signal and/or control channel. Control may include synchronization. The data/control may be mmW data/control. Data/control, data/control channels, and/or data/control signals may be used interchangeably. The terms control channel, control channel beam, PDCCH, mPDCCH, mmW PDCCH, mmW control channel, directional PDCCH, beamformed control channel, spatial control channel, control channel slice, high frequency control channel may be used interchangeably. The terms data channel, data channel beam, PDSCH, mPDSCH, mmW PDSCH, mmW data channel, directional PDSCH, beamformed data channel, spatial data channel, data channel slice, and high frequency data channel may be used interchangeably.

In one or more embodiments, channel resources may be resources (e.g., 3GPP LTE or LTE-A resources) such as time, frequency, code, and/or spatial resources, which may, at least sometimes, carry one or more channels and/or signals. In some embodiments, channel resources may be used interchangeably with channels and/or signals.

The terms mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, and measurement RS may be used interchangeably. mmW cell, mmW small cell, SCell, secondary cell, license-assisted cell, unlicensed cell, and Licensed Assisted Access (LAA) cell may be used interchangeably. The terms mmW cell, mmW small cell, PCell, primary cell, LTE cell, and licensed cell may be used interchangeably.

The terms interference and interference plus noise may be used interchangeably.

A WTRU may determine the uplink (UL) and/or downlink (DL) directions of one or more subframes according to one or more received and/or configured frequency division duplex (FDD) and/or time division duplex (TDD) UL/DL configurations. UL/DL and UL-DL may be used interchangeably.

In one or more embodiments, the terms transmit power, power, antenna array transmit power may be used interchangeably. Further, in one or more embodiments, cmW and mmW may be used interchangeably.

mmW deployment is disclosed herein such that SCmB deployment may be based on a 3rd Generation Partnership Project (3GPP) Release 12 (R12) small cell deployment. The mmW operation may be performed by two network nodes including a SCmB and a mmW WTRU (mWTRU).

An SCmB may be an LTE small cell eNB capable of operating an mmW air interface in parallel with a LTE air interface in the downlink. An SCmB may be equipped with advanced antenna configuration and beamforming technique and may simultaneously transmit LTE downlink channels in a wide beam pattern and mmW channels in narrow beam patterns. In order to support mmW WTRUs without mmW uplink transmission, an SCmB may support new features and procedures in the LTE uplink operation.

An mWTRU may be a WTRU capable of operating both an LTE and mmW air interface in parallel. An mWTRU may have two sets of antennas and accompanied RF chains, one operating in the LTE band and the other in the mmW frequency band. A mWTRU may also include two independent baseband processing functions. The two baseband functions may possibly share certain hardware (HW) blocks if the mmW air interface bears similarity with the LTE system.

The add-on mmW channels may be an extension of the LTE carrier aggregation embodiment with a new carrier type in the mmW frequency band that may apply a different air interface. mmW channels may lend themselves to opportunistic use for high-throughput and/or low-latency traffic data application.

Control signaling, for example, including system information update, paging, radio resource control (RRC) and network access stratum (NAS) signaling (signaling radio bearers) and multicast traffic may be carried in LTE channels. In addition, certain mmW L1 control signaling may be carried in LTE channels.

Due to the high propagation loss, especially in non-line of sight (NLOS) environments at a mmW frequency band, one or both of an SCmB and mWTRU may employ narrow beamforming, for example to ensure sufficient link budget for high-throughput and low-latency data transmission.

Transmit and receive narrow beam pairing may be critical in certain scenarios. For example, at 28 GHz and 38 GHz in urban area using steerable 10°-beamwidth and 24.5-dBi horn antenna at both transmitter and receiver, a consistent coverage with a cell-radius of up to 200 meters may be achieved.

As indicated above, systems operating at high carrier frequency (e.g., above 6 GHz) may need to use beamforming (analog, digital or hybrid) to compensate for a 20-30 dB pathloss since it becomes more significant as the carrier frequency becomes higher. The beamforming may be used at the transmitter and/or at the receiver. The highest beamforming may be achieved when both transmitter and receiver use beamforming and the beam directions are aligned (e.g., transmitter and receiver beams are paired). The transmit and receive beam widths may be determined as a function of the type, size and number of antenna elements of the phased array antenna (PAA).

Figure 2:
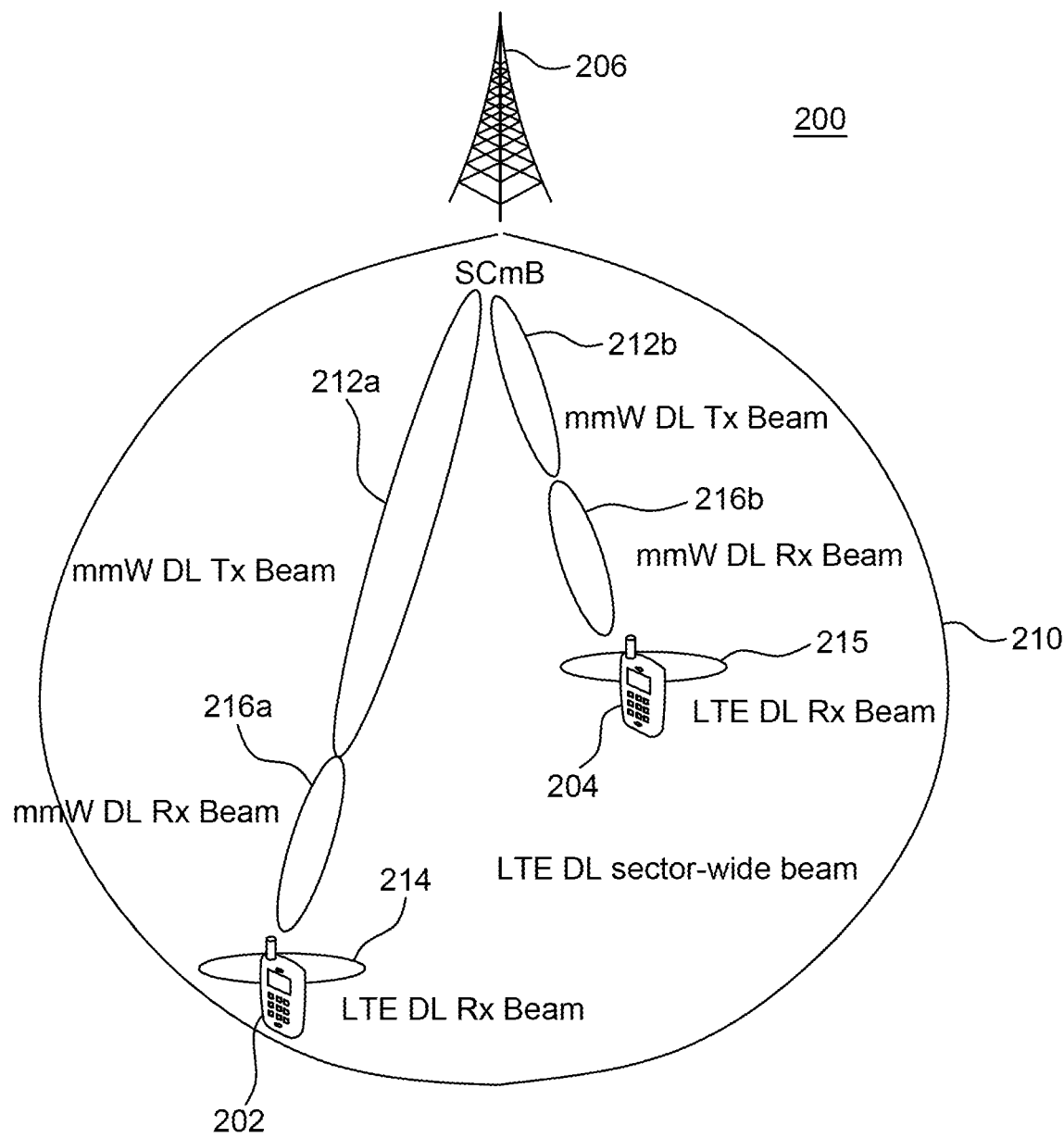
FIG. 2 illustrates an example of a millimeter wave (mmW) small cell deployment system according to one or more embodiments.

FIG. 2 illustrates an example of an SCmB deployment system 200. In addition to a downlink transmit narrow beam and a downlink receive narrow beam used by the SCmB and the mWTRUs, respectively, a broad beam pattern (wide beam) may also be applied for LTE operations including cell search, random access, cell selection/reselection, etc. For example, as shown in FIG. 2, a first mWTRU 202 and a second mWTRU 204 communicate with a SCmB 206. The SCmB may use a downlink wide transmit beam 210 and downlink narrow transmit beams 212a and 212b for transmitting signals to one or more of the mWTRUS 202 and 204. The first mWTRU 202 and the second mWTRU 204 may use downlink wide beams 214 and 215, respectively, for receiving signals transmitted by the SCmB using the wide transmit beam 210. In addition, first mWTRU 202 and the second mWTRU 204 may use downlink narrow beams 216a and 216b, respectively, that reside in the wide transmit beam 210 and are used for receiving signals transmitted by the SCmB using the narrow transmit beams 212a and 212b, respectively. When a downlink receive narrow beam (e.g., 216a or 216b) is aligned with downlink transmit narrow beam (e.g., 212a and 212b), the receive and transmit narrow beams are referred to as "paired" and form a Tx-Rx beam pair.

Figure 3:
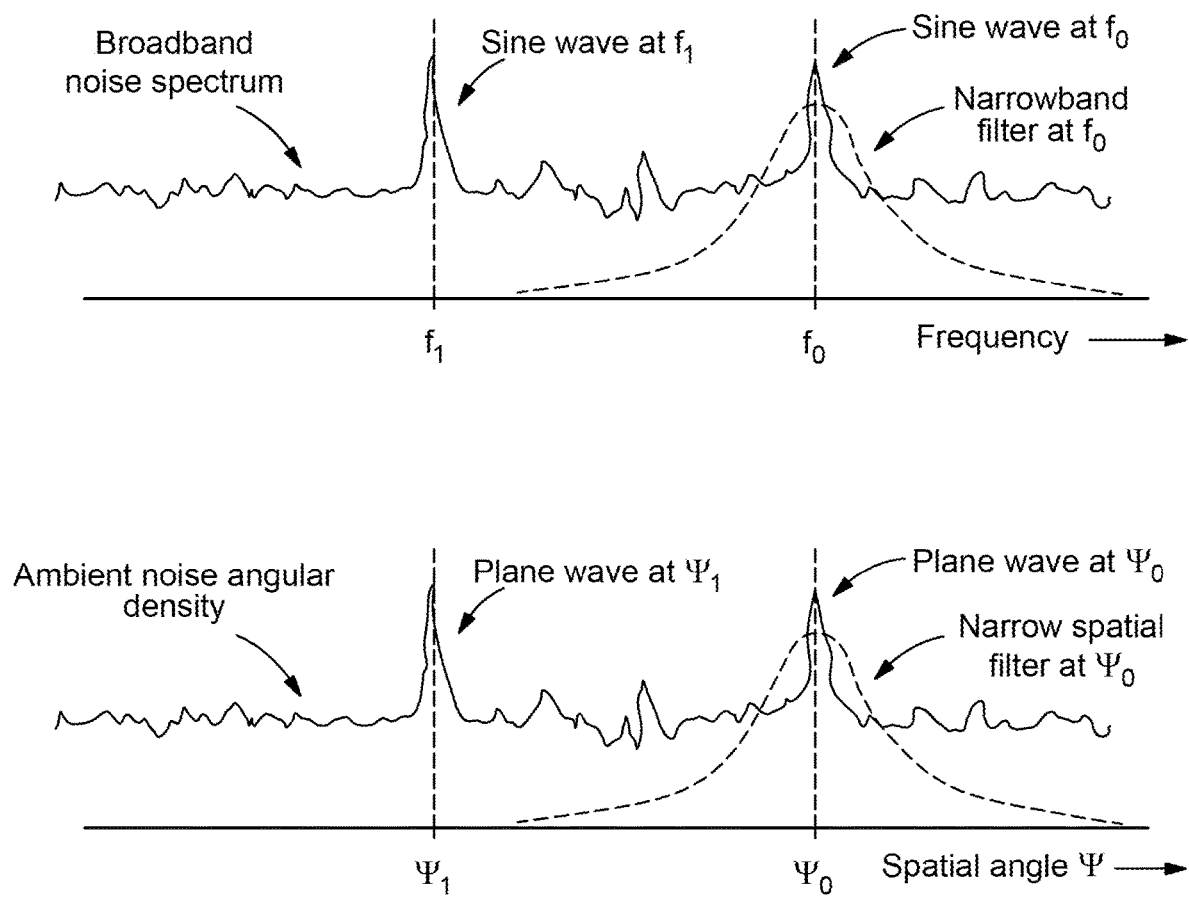
FIG. 3 illustrates a comparison of frequency and spatial filtering.

FIG. 3 illustrates a comparison of frequency (top) and spatial filtering (bottom). The mWTRU receive beam forming may be regarded as narrow spatial filtering as shown in FIG. 3. To better demonstrate the effect of spatial or angular filtering, a comparison with a frequency domain filtering is also shown in FIG. 3.

In a similar approach to how frequency filtering removes unwanted frequency components, spatial filtering may allow a mWTRU to detect a channel impulse response at a distinct angular direction captured by the narrow receive beam. This may result in a flat effective channel by excluding angular incoming paths outside of its beamwidth. An LTE WTRU may be assumed to have an omni-directional receive beam pattern and consequently may perceive a superimposed channel impulse response over the entire angular domain. Therefore, an aligned mmW transmit and receive beam pair may provide an additional degree of freedom in the angular domain as compared with current LTE systems.

Accordingly, a mmW system, for example, a downlink system design may focus on integrating directivity (e.g., the directivity of a narrow transmit and receive beam pair) into cellular system procedures which may include physical layer 1 (L1) control signaling, data scheduling, narrow beam pairing, beam measurement, L1 control information feedback, etc.

Exemplary mmW system parameters and assumptions are disclosed herein. These parameters and assumptions may change. These parameters and assumptions are not intended to be limiting but serve to illustrate one possible set of parameters and assumptions of an example mmW system.

A carrier frequency may be 28 GHz. This is intended for exemplary system numerology, but embodiments disclosed herein may be extended to other mmW frequencies such as 38 GHz, 60 GHz, 72 GHz, etc. A system bandwidth may be variable up to 1 GHz with aggregation to a higher bandwidth. An estimated root mean square (RMS) delay spread may be 100-200 ns with a narrow beam pattern. A required latency may be 1 millisecond (ms). A waveform may be OFDM-based or broad-band-single-carrier-based. Connectivity may be available using an LTE Small Cell eNB with mmW add-on channels and two separate antennas and RF chains connected to two different antenna solutions. Exemplary data rates may achieve a DL minimum 30 megabit (Mbit)/s for at least 95% of mWTRUs. Mobility may be optimized data for a data connection at 3 km/h and maintain a connection at 30 km/h. Coverage may meet the data rate and mobility requirement with less than a 100-m cell radius.

A frame structure for the system may depend on the applied waveform. A transmission time interval (TTI) length such as 100 us may be used, for example to achieve low latency. A system bandwidth such as one in the range of 50 MHz to 2 GHz may be used, for example, to achieve high data rates.

In one or more embodiments, an OFDM frame structure may be utilized. A mmW frame structure of an OFDM-based waveform may offer flexibility in coordination between the LTE and mmW channels and possibly enable common functional block sharing in a mWTRU device. An example is presented herein.

A mmW sampling frequency may be selected as an integer multiple of the LTE minimum sampling frequency of 1.92 MHz, which may lead to an mmW OFDM sub-carrier spacing $\Delta f$ being an integer multiple of the LTE sub-carrier spacing of 15 kHz, i.e. $\Delta f=15*K$ kHz. The selection of the integer multiple K and the resulting $\Delta f$ may take into consideration the sensitivity to the Doppler shift, different types of frequency errors and the ability to remove channel time dispersion. The orthogonality between sub-carriers may deteriorate and inter-sub-carrier interference (ISI) may increase when the Doppler shift increases in proportion to the sub-carrier spacing.

In order to achieve low latency, the TTI length of the mmW transmission may be reduced significantly compared to the 1-ms TTI length of the LTE system. It may be beneficial to have a mmW sub-frame length of 1 ms to align with the LTE 1-ms sub-frame timing. Though the mmW sub-frame may contain multiple mmW TTIs whose length is tied to other parameters such as sub-carrier spacing, symbol length, CP length, FFT size, etc.

With all consideration taken into account, an example with a conservative CP length using a 4× channel delay spread is summarized in Table 1. It should be noted the CP length selection is based on the assumption that the delay spread over all potential mmW frequency bands is lower than 200 ns.

TABLE 1

Exemplary mmW Downlink OFDM Numerology

| OFDM Numerology Parameters | | | | |
|---|---|---|---|---|
| System bandwidth (MHz) | 125 | 250 | 500 | 1000 |
| Sampling rate (MHz) | 153.6 | 307.2 | 614.4 | 1228.8 |
| Sub-carrier spacing (kHz) | 300 | 300 | 300 | 300 |
| Number of sub-carrier per RB | 12 | 12 | 12 | 12 |
| RB bandwidth (MHz) | 3.6 | 3.6 | 3.6 | 3.6 |
| Number of assignable RBs | 32 | 64 | 128 | 256 |
| Number of occupied sub-carriers | 384 | 768 | 1536 | 3072 |
| Occupied bandwidth (MHz) | 115.2 | 230.4 | 460.8 | 921.6 |
| IDFT(Tx)/DFT(Rx) size | 512 | 1024 | 2048 | 4096 |
| OFDM symbol duration (us) | 3.333 | 3.333 | 3.333 | 3.333 |
| CP length (ratio to symbol length) | 1/4 | 1/4 | 1/4 | 1/4 |
| CP length (us) | 0.833 | 0.833 | 0.833 | 0.833 |
| Number of symbols per slot | 24 | 24 | 24 | 24 |
| Slot duration (TTI) (us) | 100 | 100 | 100 | 100 |
| Sub-frame duration (ms) | 1 | 1 | 1 | 1 |
| Number of slots per sub-frame | 10 | 10 | 10 | 10 |
| Frame duration (ms) | 10 | 10 | 10 | 10 |
| Number of sub-frames per frame | 10 | 10 | 10 | 10 |
| Number of symbols per TTI per RB | 288 | 288 | 288 | 288 |
| Number of symbols per TTI using all RBs | 9216 | 18432 | 36864 | 73728 |
| Signaling overhead | 20% | 20% | 20% | 20% |
| Data rate using uncoded 64 QAM (Mbps) | 442.368 | 884.736 | 1769.472 | 3538.944 |
| Spectral efficiency | 3.538944 | 3.538944 | 3.538944 | 3.538944 |

For example, the maximum Doppler shift at 30 km/h and 28 GHz is 778 Hz. The latest 28-GHz channel time dispersion measurement in dense urban area by Poly New York University (NYU) indicates the RMS delay spread σ is between 100 and 200 ns up to 200-m cell radius. The 90% coherence bandwidth may be estimated at 1/50σ of 100 kHz and the 50% coherence bandwidth at 1/5σ of 1 MHz ([15]).

A sub-carrier spacing $\Delta f$ between 100 kHz and 1 MHz may thus be reasonable. A sub-carrier spacing of 300 kHz (K=20) may be robust against Doppler shift and other types of frequency error and reduce considerably the implementation complexity. The corresponding symbol length (1/$\Delta f$) is 3.33 us.

A cyclic prefix (CP) length is normally required to span over the entire length of the channel time dispersion in order to eliminate the inter-symbol-interference. On the other hand, as a cyclic prefix (CP) does not carry useful data, a long CP may cause excessive system overhead. One example of CP length for a $T_{symbol}$ of 3.33 us may be selected at 1/14 of $T_{symbol}$, 0.24 us and the corresponding CP overhead is 7% as calculated by $T_{CP}/(T_{CP}+T_{symbol})$.

Figure 4:
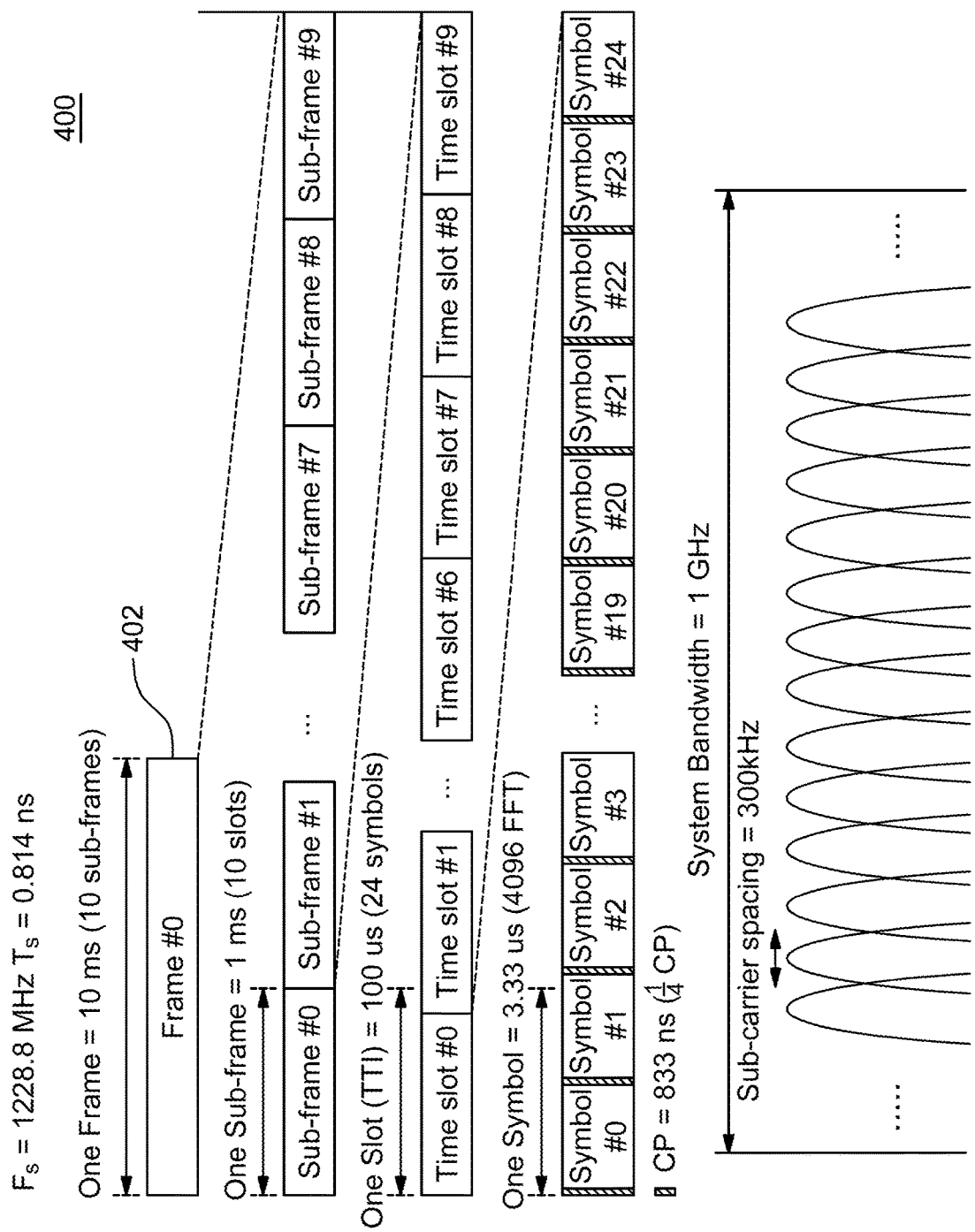
FIG. 4 illustrates an exemplary orthogonal frequency division multiplexing (OFDM) frame structure.

FIG. 4 depicts an example OFDM-based frame structure. In the example, the system bandwidth is 1 GHz and a sub-carrier spacing of 300 kHz with a corresponding symbol length of 3.33 μs is used. An example CP length of ¼ of $T_{symbol}$ which equals 0.833 μs is used. Accordingly, FIG. 4 shows a diagram of an OFDM frame structure 400 over a 1-GHz system bandwidth. According to the OFDM-based frame structure 400 shown in FIG. 4, a frame 402 includes 10 sub-frames, each sub-frame includes 10 slots, and each slot includes 24 symbols. The OFDM-based frame structure 400 may have, for example, a sub-carrier spacing of 300 kHz with a corresponding symbol length ($T_{symbol}$) of 3.33 μs. Considering a CP length may span over the entire length of the channel time dispersion in order to eliminate the inter-symbol-interference, one example of CP for a $T_{symbol}$ of 3.33 μs may be selected at ¼ of $T_{symbol}$ (i.e., at 0.833 μs). This example numerology may be used for a range of above-6 GHz system bandwidths (e.g., from 50 MHz to 2 GHz) with corresponding Fast Fourier Transform (FFT) length.

The frame structure and example disclosed herein assumes an OFDM-based mmW waveform, which may be readily incorporated into the OFDM-based LTE small cell network. However, the system procedure design disclosed in the subsequent sections is not bound by this specific frame structure and may be applied to other waveform candidates.

Exemplary mmW physical channels are disclosed herein. An SCmB deployment may employ new mmW physical layer channels and reference signals as described herein in addition to the existing LTE physical channels.

A beam-specific reference signal (BSRS) may be a unique sequence transmitted per transmit beam used for beam acquisition, timing/frequency synchronization, channel estimation for a physical downlink directional control channel (PDDCCH), beam tracking and measurement, etc. It may implicitly carry beam identity information including a BSRS sequence index. It should be noted that there may be different types of BSRS. A BSRS resource allocation may be pre-defined.

An adaptive antenna reference signal (AARS) may be a unique sequence scheduled and transmitted dynamically for the purpose of beam pair measurement specific to one antenna port. It may embed implicitly the beam identity information in the sequence index or carry a small payload including the same information.

A physical downlink directional data channel (PDDDCH) may carry all data related control information for a mWTRU to identify, demodulate and decode the associated PDDDCH correctly. The PDDCCH may be carried in a mmW narrow beam or broad beam and may apply different multiple access.

For example, there may be a common PDDCCH transmitted in downlink mmW broad beam covering a sector or cell and a dedicated PDDCCH only transmitted in a narrow beam pair when mWTRU-specific data transmission is ongoing. The dedicated PDDCCH may carry scheduling information for its associated PDDDCH on a per-TTI basis and may not carry beam specific information. A common PDDCCH may include cell-specific information including sector/segment identity or beam identity. In addition, a mWTRU may read the common PDDCCH to determine if it is scheduled for narrow beam pairing procedure in order to begin narrow beam data transmission subsequently.

A PDDDCH may carry payload information received in the form of a MAC PDU from mmW MAC layer. The complete resource allocation of this channel is determined by the downlink scheduling information carried in PDDCCH. The PDDDCH intended for a mWTRU may be transmitted in a transmit (Tx) narrow beam and received in a properly paired receive (Rx) narrow beam, for example a narrow beam pair. Due to this spatial isolation, PDDDCHs for different WTRUs in different beam pairs may reuse a time, frequency, or code resource. Multiple PDDDCHs may also operate in one beam pair using multiple access in a time, frequency, or code domain. In addition, a common PDDDCH may be used to carry data in broad mmW antenna pattern associated with the common PDDCCH.

A demodulation reference signal (DMRS) may include symbols embedded in the transmission for channel estimation for PDDDCH. They are placed in both the time and frequency domain according to a pre-defined pattern to ensure correct interpolation and reconstruction of the channel.

Figure 5:
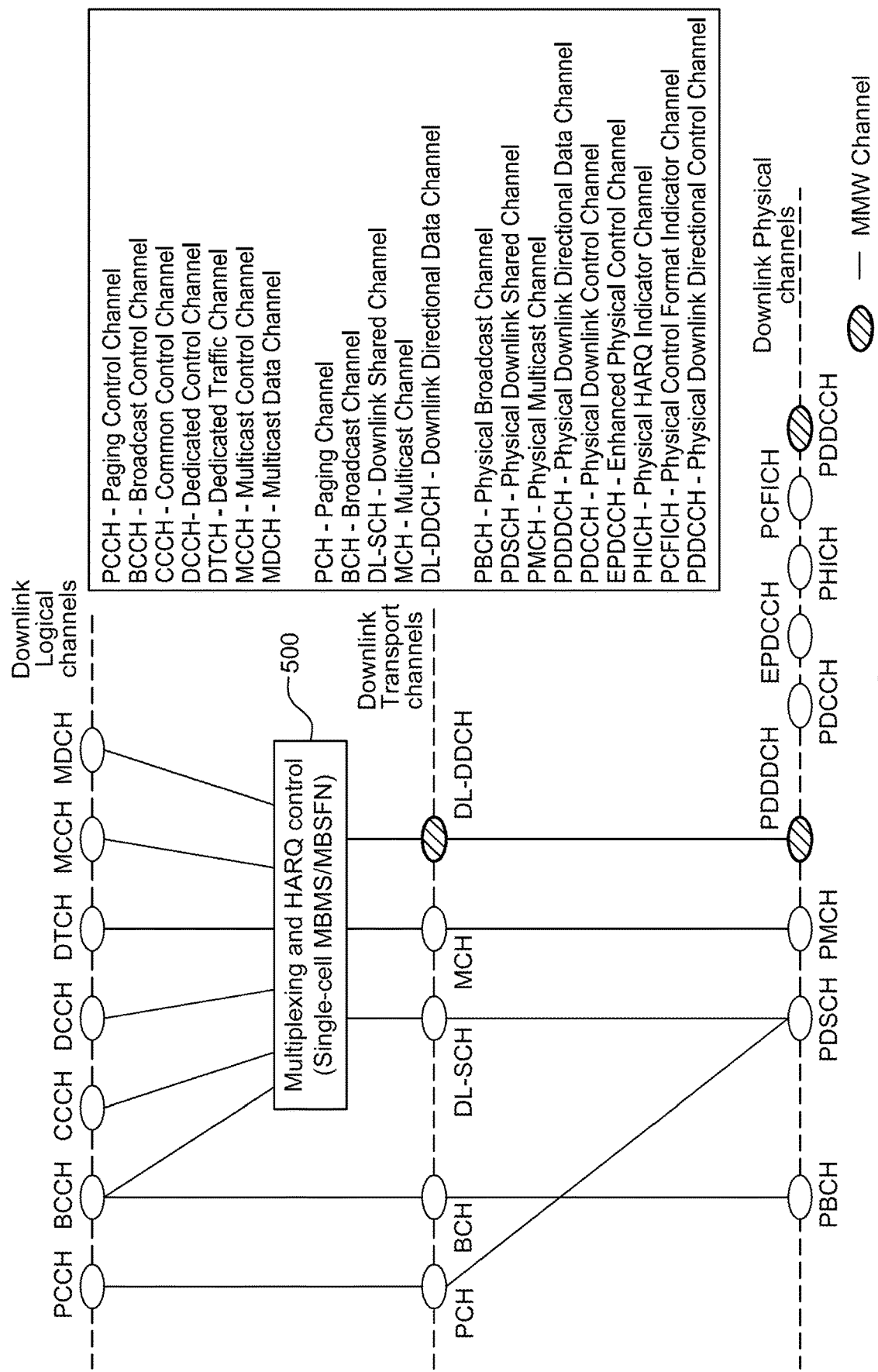
FIG. 5 is diagram which illustrates a channel mapping of mmW downlink logical, transport and physical channels.

Channels and reference signals in a narrow beam pair are beamformed identically and considered to be transmitted via one physical antenna port. Given the directivity of the transmission of these channels, carrying broadcast or multicast information may not be an optimal application. Accordingly, the SCmB deployment with mmW downlink data transmission may adopt a channel mapping as illustrated in FIG. 5 with mmW channels. Specifically, FIG. 5 is diagram which illustrates a channel mapping of mmW downlink logical, transport and physical channels with the mmW channels shown with shading. The mapping shows the various channels connected to Multimedia Broadcast Multicast Service (MBMS)/Multicast-broadcast single-frequency network (MBSFN) single-cell 500 having multiplexing and hybrid automatic repeat request (HARQ) control functionality.

The downlink logical channels include: a PCCH—Paging Control Channel, a BCCH—Broadcast Control Channel, a CCCH—Common Control Channel, a DCCH—Dedicated Control Channel, a DTCH—Dedicated Traffic Channel, an MCCH—Multicast Control Channel, and an MDCH—Multicast Data Channel.

The downlink transport channels include: a PCH—Paging Channel, a BCH—Broadcast Channel, a DL-SCH—Downlink Shared Channel, an MCH—Multicast Channel, and a DL-DDCH—Downlink Directional Data Channel.

The downlink physical channels include: a PBCH—Physical Broadcast Channel, a PDSCH—Physical Downlink Shared Channel, a PMCH—Physical Multicast Channel, a PDDDCH—Physical Downlink Directional Data Channel, a PDCCH—Physical Downlink Control Channel, an EPDCCH—Enhanced Physical Control Channel, a PHICH—Physical HARQ Indicator Channel, PCFICH—Physical Control Format Indicator Channel, and a PDDCCH—Physical Downlink Directional Control Channel.

A mWTRU may use a phase antenna array to achieve the beamforming gain necessary to compensate the high path loss at mmW frequencies, at which the short wavelength allows a compact form factor of the device design. While an element spacing of 0.5λ is typically used in theoretical performance analysis, in practice a large spacing such as 0.7λ may be applied.

Figure 6:
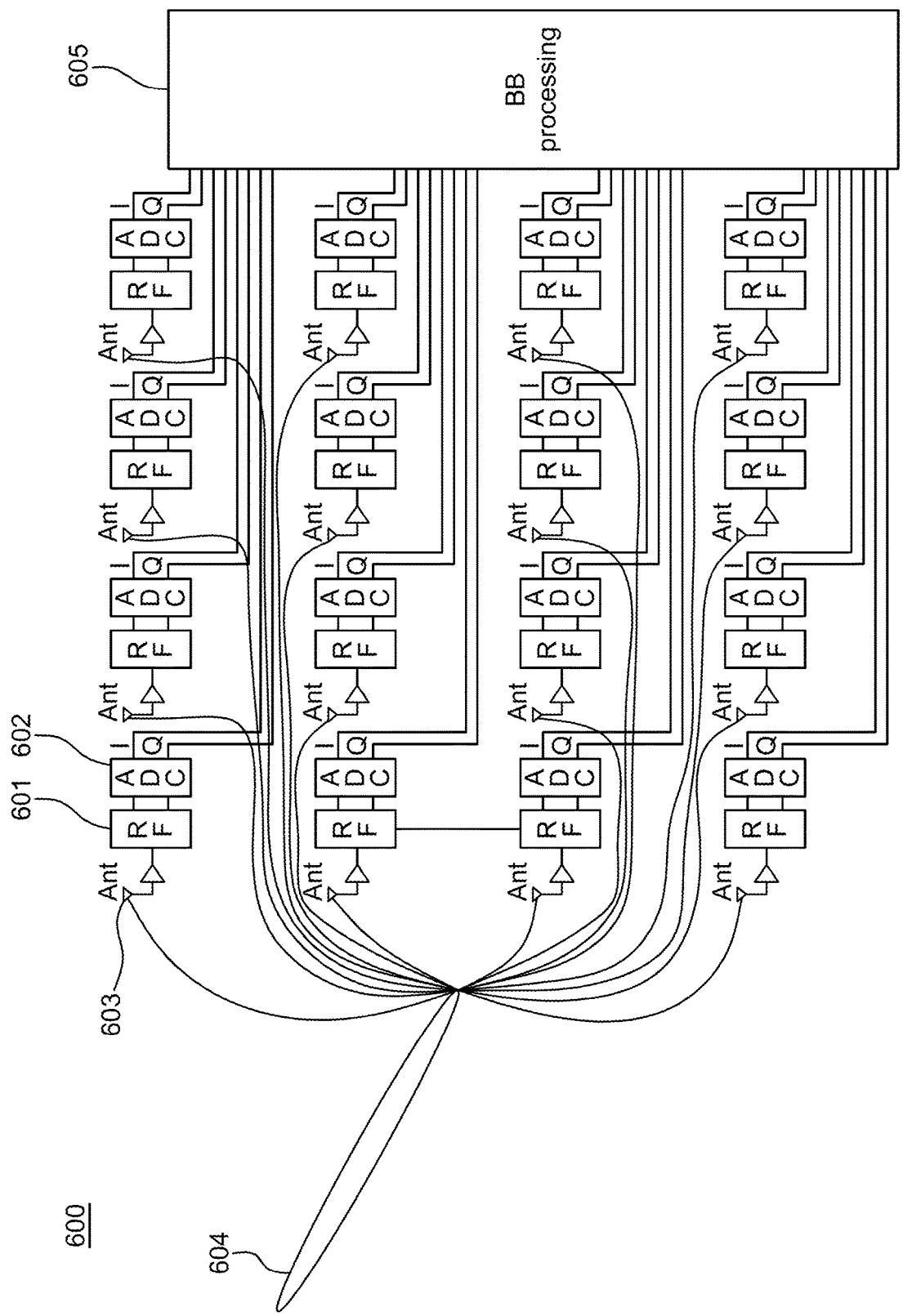
FIG. 6 illustrates millimeter wave WTRU (mWTRU) fully digitized beamforming.

Referring now to FIG. 6, FIG. 6 shows a diagram illustrating a fully digitized beamforming system 600 according to one or more embodiments. A phase antenna array (PAA) may be used for beamforming with element spacing, e.g., at 0.5λ. The phase antenna may apply different beamforming algorithms. A fully digitized beamforming approach may have a dedicated RF chain including an RF processor 601 and an analog-to-digital converter (ADC) 602 for each antenna element 603. The signal 604 processed by each antenna element 603 may be controlled independently in phase and amplitude to optimize the channel capacity. A baseband (BB) processor 605 is configured to perform BB processing on each dedicated RF chain based on the signals received from each ADC 602.

Thus, the configuration shown in FIG. 6 has the same number of RF chains and ADCs as that of antenna elements. While offering very high performance, this mWTRU antenna configuration may impose a very high cost and complexity in implementation and cause high energy consumption in operation. Thus, the fully digitized beamforming may not be adopted in the initial roll-out of mWTRU implementation and could become feasible in the future with advanced technology.

Figure 7:
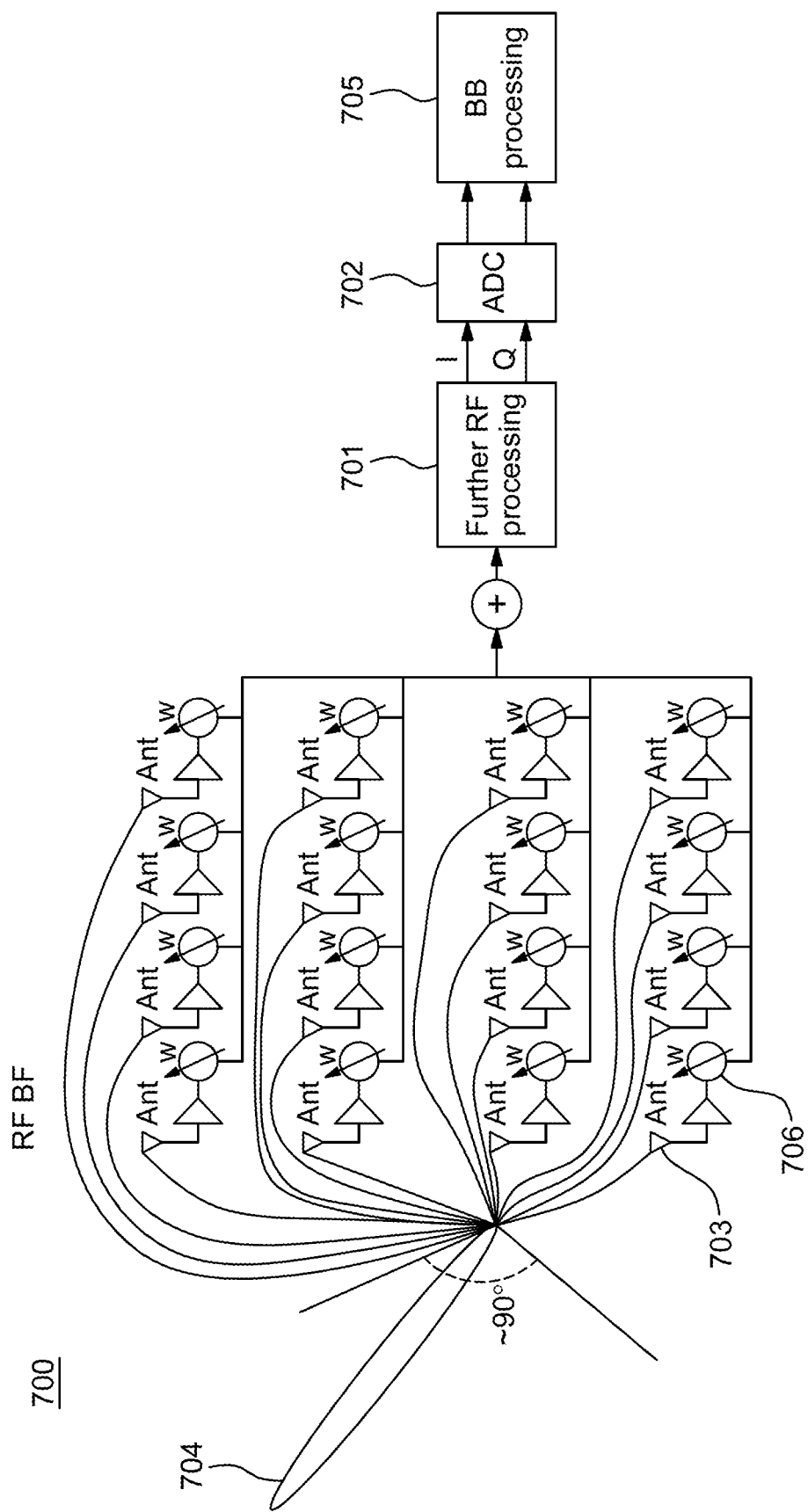
FIG. 7 illustrates mWTRU analog beamforming with one PAA and one RF chain.

Referring now to FIG. 7, FIG. 7 shows a diagram illustrating an analog beamforming system 700 according to one or more embodiments. In this embodiment, the analog beamforming may be with one PAA and one RF chain. The analog beamforming may apply one RF chain for a number of antenna elements 703 that process the signal 704. Each antenna element 703 may be connected to a phase shifter 706 that may be used to set the weight for beamforming and steering. The RF chain further includes an RF processor 701 and an ADC 702 which provides an output to a BB processor 705. The implemented number of RF chains may be significantly reduced as well as the energy consumption.

It should be noted that in this case only the phase of the signal at each antenna element is adjusted in the beamforming. The phase shifting and combining may be implemented in different stages (e.g., at RF state, at BB analog stage, or at Local Oscillator (LO) stage). One example is a single-beam analog configuration. It may operate one beam at a time and the single beam may be placed at, for example, the strongest angular direction such as a line of sight (LOS) path obtained from beam measurement. A broad beam pattern may cover a range of angular directions at the expense of reduced beamforming gain. Furthermore, each exemplary solution may be evaluated in terms of signal loss, phase error, power consumption, etc.

The mWTRU analog beamforming algorithms may include fixed codebook-based beamforming and continuous phase shifting beamforming.

For example, using fixed codebook-based beamforming, a grid of beams are comprised of a set of fixed beams. Each beam is formed by the mWTRU applying a beamforming weight vector v chosen from a pre-defined codebook $v \in \{v_1, v_2, v_3 \ldots v_N\}$ where N denotes the number of fixed beams. Each vector may include pre-calibrated phase shifts for all phase shifters and thus represent a unique analog beam direction, i.e., "beam." The number of beams may depend on the Half-Power-Beam-Width (HPBW) of the beamforming and desired coverage.

Using continuous phase shifting beamforming, the desired weight of each phase shifter may be calculated based on the estimated short-term channel information and converted using a high resolution digital-to-analog converter (DAC) in order to apply to the phase shifter. Continuous phase shifting beamforming may provide a continuous and adaptive beamforming to track the channel conditions. The algorithm may perform well in scenarios with increased multipath, high angular spread and low WTRU mobility.

Combining both the digitized and analog beamforming, a mWTRU may employ a hybrid approach. This approach may include analog beamforming performed over the phase array antenna elements each associated with a phase shifter and all connected to one RF chain. This approach may further include digital precoding applied on the baseband signal of each RF chain when there is more than one RF chain. MIMO embodiments may be implemented using digital precoding.

The basic system parameters of hybrid beamforming may include a number of data streams (NDATA), a number of RF chains TRX (NTRX), a number of antenna ports (NAP), a number of antenna elements (NAE), and a number of phase antenna arrays (NPAA). The configuration of these parameters may impact on the system function and performance as disclosed herein. In one or more embodiments, the parameters may be configured as follows: $N_{PAA} \leq N_{AP} \leq N_{TRX} \leq N_{AE}$.

One PAA may be comprised of multiple antenna elements, for example a PAA of size 4×4 has 16 antenna elements. An antenna port may be defined such that the channel over which a symbol on the antenna port is conveyed may be inferred from the channel over which another symbol on the same antenna port is conveyed. There is one resource grid per antenna port. For reference purposes, the LTE R12 antenna port configurations are listed herein. Cell-specific reference signals may support a configuration of one, two, or four antenna ports and are transmitted on antenna ports p=0, $p \in \{0,1\}$ and $p \in \{0,1,2,3\}$, respectively.

MBSFN reference signals are transmitted on antenna port p=4. WTRU-specific reference signals associated with PDSCH are transmitted on antenna port(s) p=5, p=7, p=8, or one or several of $p \in \{7,8,9,10,11,12,13,14\}$. Demodulation reference signals associated with EPDCCH are transmitted on one or several of $p \in \{107,108,109,110\}$. Positioning reference signals are transmitted on antenna port p=6. CSI reference signals support a configuration of one, two, four or eight antenna ports and are transmitted on antenna ports p=15, $p \in \{15,16\}$, $p \in \{15,16,17,18\}$, and $p \in \{15,16,17,18,19,20,21,22\}$, respectively. Each antenna port may carry a beamformed reference signal uniquely associated with this antenna port that may be used to identify the antenna port. When the number of RF chains ($N_{TRX}$) equals the number of antenna elements ($N_{AE}$), for example, one RF chain per antenna element, the antenna configuration becomes fully digitized solution as shown in FIG. 6.

Figure 8:
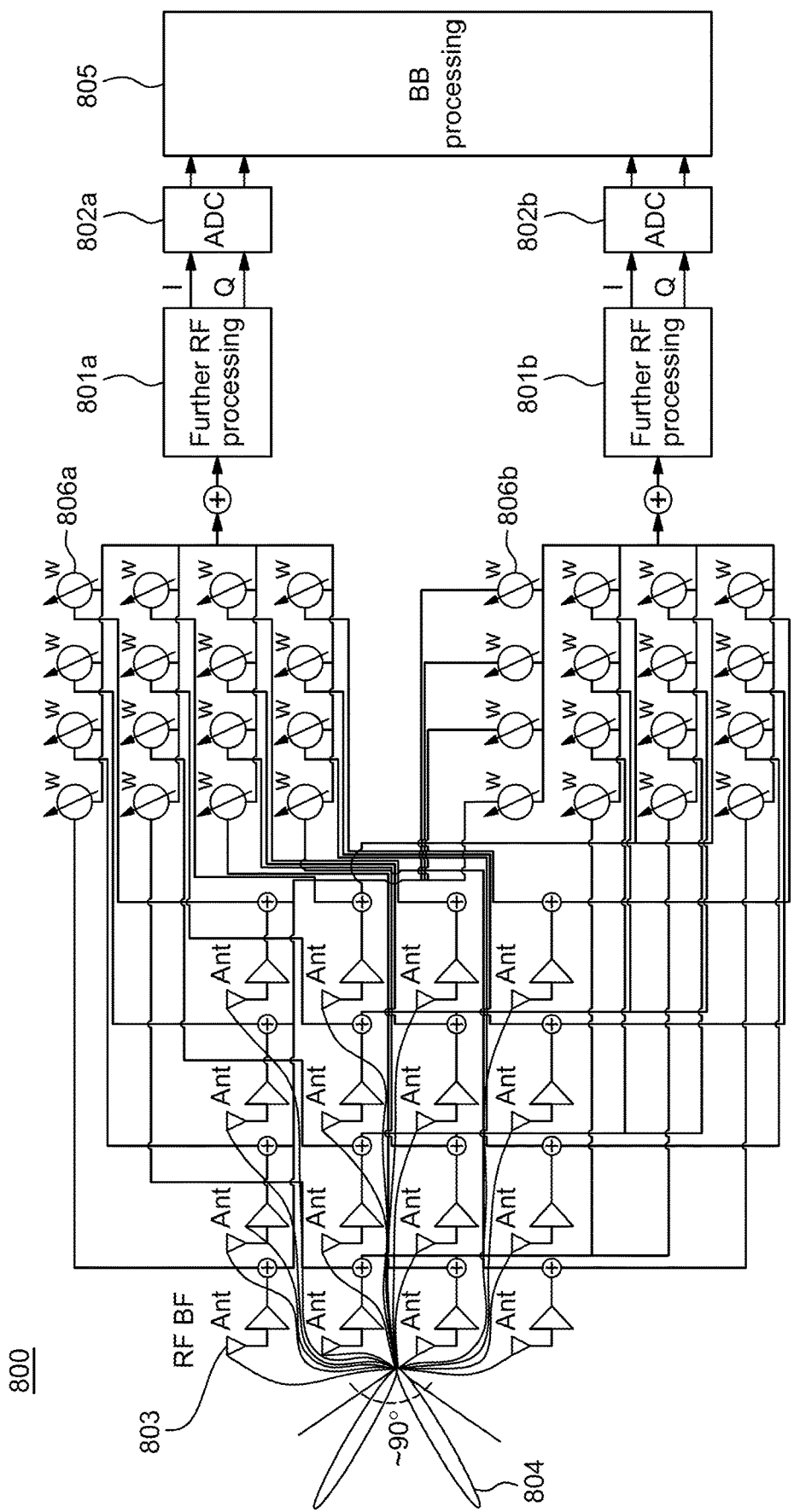
FIG. 8 illustrates mWTRU analog beamforming with one PAA and two RF chains.

One PAA may be connected to one RF chain, as shown in FIG. 7, or multiple RF chains depending on the system requirement and configuration, as shown in FIG. 8. FIG. 8 illustrates an mWTRU analog beamforming system 800 with one PAA and two RF chains. One antenna port may carry a beamformed reference signal uniquely associated with this antenna port that may be used to identify the antenna port. One PAA may be connected to one RF chain or multiple RF chains depending on the system requirement and configuration. In FIG. 8, one PAA of size 4×4 with 16 antenna elements 803, for receiving a signal 804, may be connected to two RF chains and each RF chain may have a set of 16 phase shifters 806a and 806b. The PAA may form two narrow beam patterns within a +45° and −45° coverage in an azimuth plane. In this configuration, $N_{PAA} < N_{AP} = N_{TRX} < N_{AE}$. Each RF chain further includes an RF processor 801a or 801b and an ADC 802a or 802b which provide an output to a BB processor 805.

Figure 9:
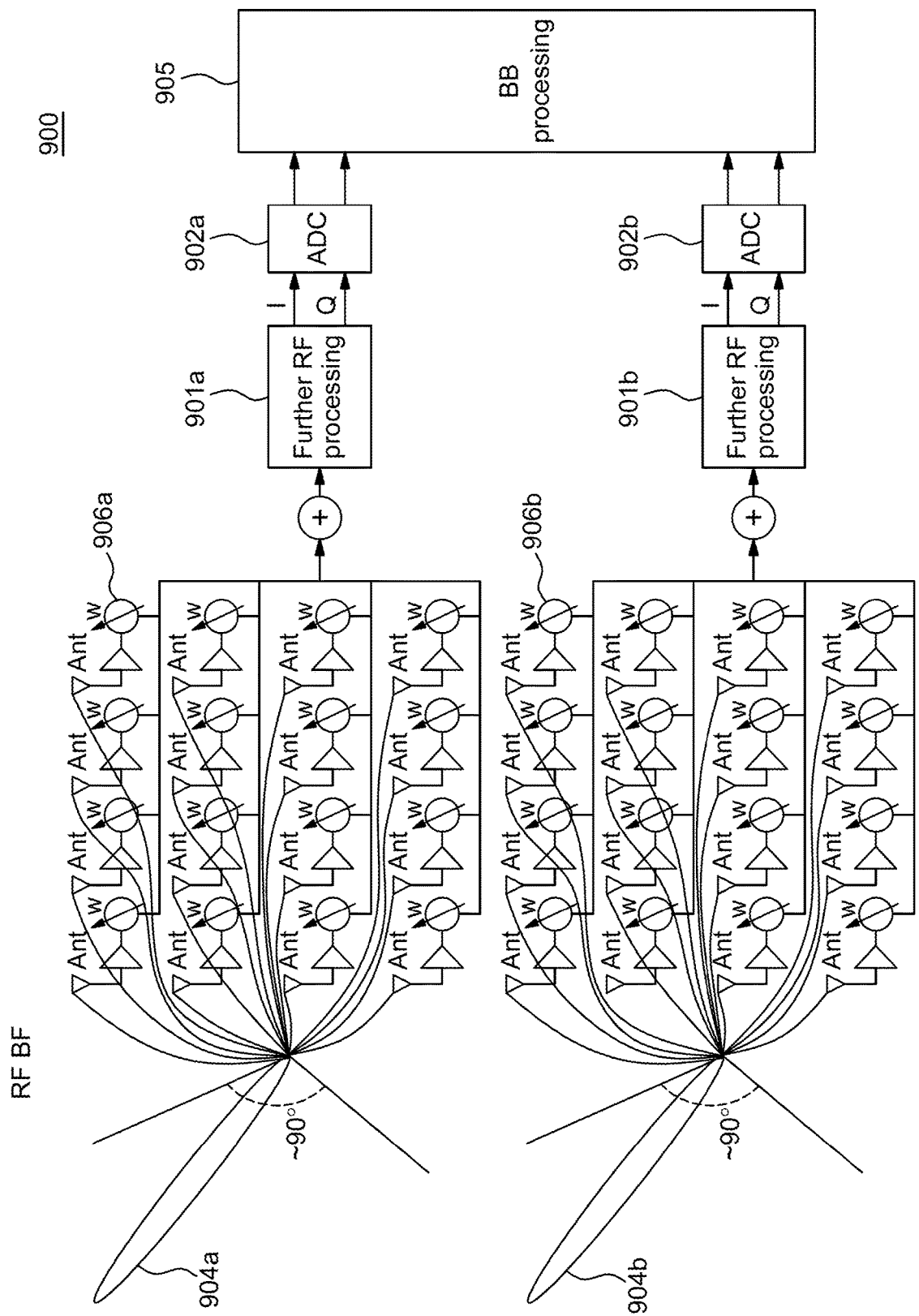
FIG. 9 illustrates mWTRU analog beamforming with two PAAs and two RF chains.

FIG. 9 shows a another example where there are two PAAs and each PAA has a dedicated RF chain, for example, $N_{PAA} = N_{AP} = N_{TRX} \leq N_{AE}$. In particular, FIG. 9 shows a diagram illustrating analog beamforming system 900 with two PAAs and two RF chains. Each PAA may have a set of antenna elements 903a and 903b, respectively, for receiving signals 904a and 904b. Each antenna element 903a, 903b may be connected to a phase shifter 906a, 906b, respectively. Each dedicated RF chain may include an RF processor 901a, 901b and an ADC 902a, 902b which provide an output to a BB processor 905. This configuration may allow spatial independence between the two simultaneous signals 904a and 904b by placing the PAAs at different orientations (e.g., in an azimuth plane). An aligned PAA arrangement may provide an aggregated larger coverage compared to the configuration in FIG. 8. Both configurations with two RF chains may apply Multiple Input Multiple Output (MIMO) with two data streams.

Figure 10:
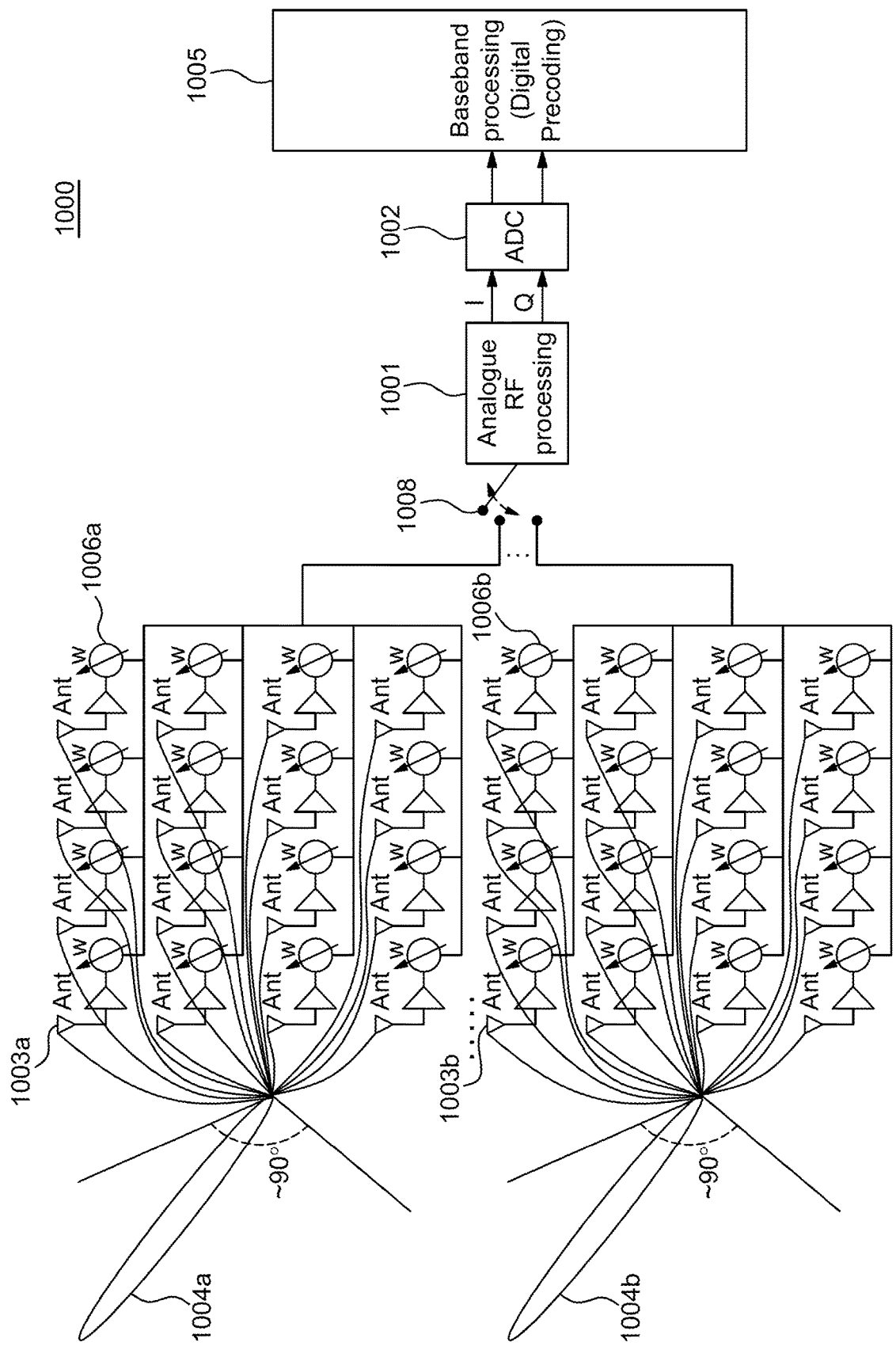
FIG. 10 illustrates mWTRU analog beamforming with two PAAs and one RF chain.

Referring now to FIG. 10, FIG. 10 shows a diagram illustrating analog beamforming system 1000 with two PAAs having a set of antenna elements 1003a and 1003b, respectively, for receiving signals 1004a and 1004b. Thus, in this configuration, $N_{AE} > N_{PAA} > N_{AP} = N_{TRX}$. Each antenna element 1003a, 1003b may be connected to a phase shifter 1006a, 1006b, respectively. The PAAs are connected to a single RF chain that includes a switch 1008, an RF processor 1001 and an ADC 1002 that provides an output to a BB processor 1005. Multiple PAAs may be connected to a single RF chain by using the switch 1008 (i.e., $N_{AE} > N_{PAA} > N_{AP} = N_{TRX}$). Each PAA may form a narrow beam pattern covering from +45° to −45° in an azimuth plane. They may be oriented separately so a single-beam network node may have a good coverage by using a beam at different direction at different time instances.

Figure 11A:
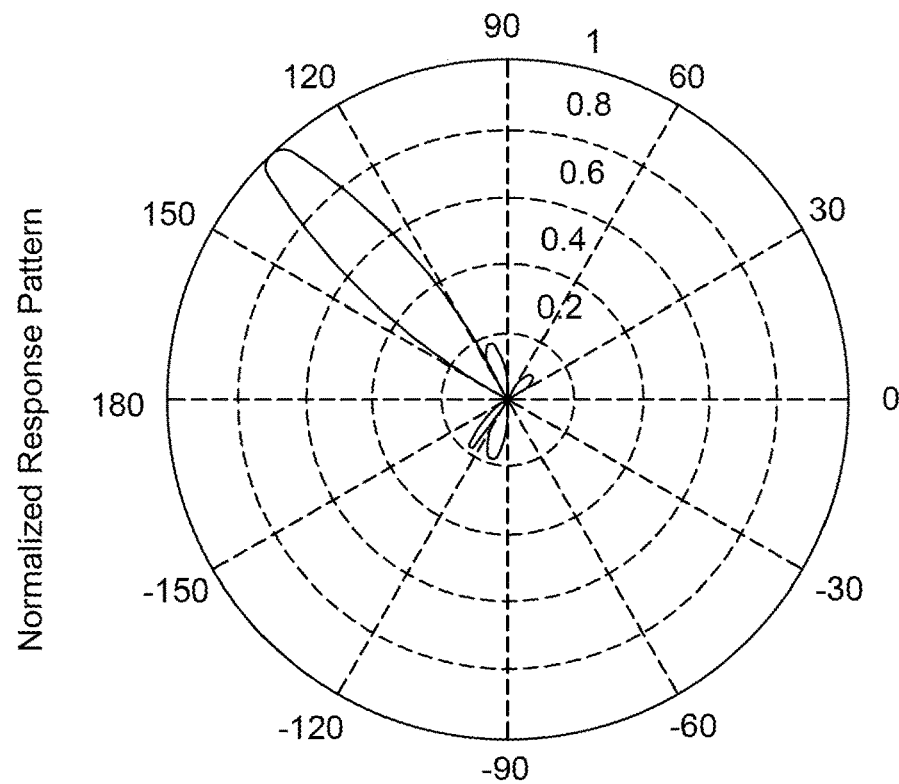
FIG. 11A illustrates a two dimensional (2D) narrow beam pattern.
Figure 11B:
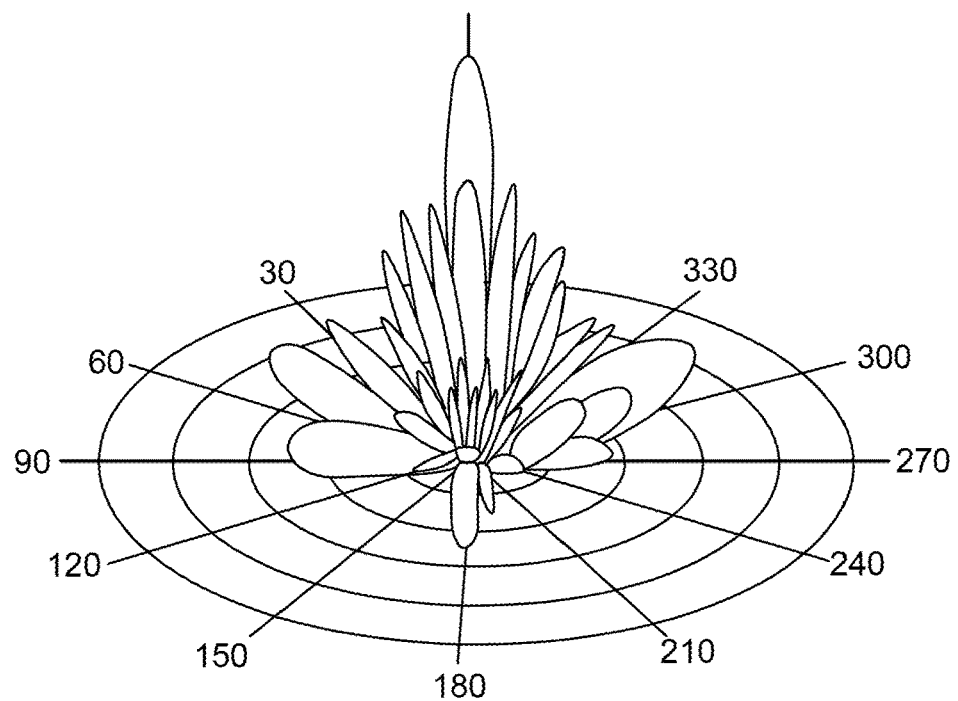
FIG. 11B illustrates a three dimensional (3D) narrow beam pattern.

According to another embodiment, the system parameters may be configured as follows: $N_{DATA} \leq N_{TRX} \leq N_{AE}$. Thus, when $N_{DATA}=N_{TRX}=1$, a mWTRU has a single-beam configuration and may operate one beam at a time. The mWTRU beamforming under this configuration may form a narrow beam pattern such as the one shown in FIGS. 11A and 11B for a 16×16 PAA at the strongest angular direction. Specifically, FIGS. 11A and 11B illustrate two dimensional (2D) narrow beam pattern and a three dimensional (3D) narrow beam pattern showing a LOS path obtained from beam measurement. Here, a narrow beam forms in the strongest angular direction.

Figure 12:
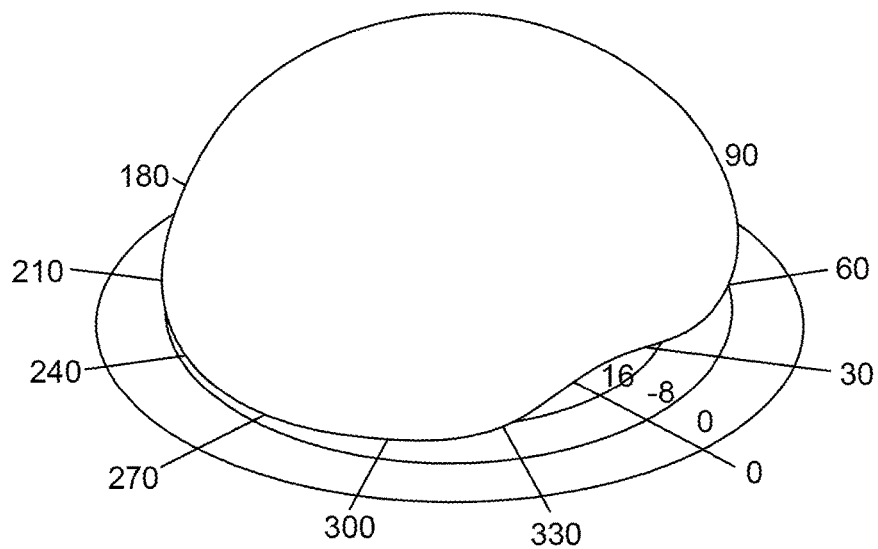
FIG. 12 illustrates a 3D broadside broad beam pattern.

FIG. 12 illustrates a 3D broadside broad beam pattern. The mWTRU may form a broad beam pattern, for example, a wide main lobe such as the one shown in FIG. 12 to cover a range of continuous angular directions including both strong and weak ones in-between. However, it is noted that the antenna gain may be reduced considerably with a broad beam pattern and the link budget may worsen.

When $N_{DATA}=1<N_{TRX}$, for example, when $N_{TRX}=2$, a mWTRU may have two simultaneous receive beam patterns, and the receive beam patterns may be different and may also be used for different applications. The mWTRU may place two narrow receive beam patterns at different angular incoming directions to receive one data stream. For example, coherent beam combining may be used to utilize the spatial diversity and mitigate the blockage effect and/or weak LOS condition. The mWTRU may form one narrow receive beam and one broad receive beam for different applications. For example, the narrow receive beam may be used for data transmission of a data channel and the broad receive beam may be used for control signaling of a control channel. When $1<N_{DATA}=N_{TRX}$, for example, the transmitter may apply MIMO to increase the capacity in a high SNR channel condition. Furthermore, the mWTRU may place two narrow receive beam patterns at different angular incoming directions to receive two data streams in parallel.

Equivalently, the SCmB beam forming embodiments may also include fixed beam, adaptive beam forming (e.g., codebook-based and non-codebook-based beam forming), and classical beam forming (e.g., direction-of-arrival (DoA) estimation). Each embodiment may require different procedures and work well in certain scenarios. For example, the DoA estimation may require a smaller angular spread and a mWTRU may need to transmit a LTE uplink reference signal to ensure DoA accuracy. The fixed beam system, on the other hand, may require beam cycling and switch procedures.

It should be noted that the mWTRU antenna configuration and beamforming disclosed herein in the following exemplary embodiments are based on a single-beam mWTRU antenna configuration with analog beamforming as illustrated in FIG. 7.

By way of background, the throughput of wireless communication systems has increased significantly by new technologies introduced in LTE and Wi-Fi. These technologies, however, are not sufficient to meet the demands of future applications which will require Gbits/sec of throughput and latencies of 1 ms. Therefore, research on a new radio access technology, known as 5G, has already started.

One of the critical components of the 5G RAT will be the radio waveform. OFDM has been used for LTE and Wi-Fi due to its simplicity in converting a frequency selective channel into smaller flat fading sub channels, allowing one-tap equalization per subchannel. Discrete Fourier Transform (DFT) spread OFDM (DFT-s-OFDM) improves the peak to average power ratio (PAPR) of OFDM by spreading the data sequence with DFT before loading the spread signal onto the subchannels.

Both OFDM and DFT-s-OFDM attach a cyclic prefix (CP) to prevent the inter-symbol interference (ISI) that may occur due to the channel delay spread, and to ensure cyclicity. The length of the CP is fixed and dimensioned for the maximum delay spread of the channel. This may result in loss of spectral efficiency when the delay spread of the channel is smaller than the CP. The loss may be significant when the variance of the RMS delay spread of the channel is large. For example, in mmW channels, the delay spread may be below 4 ns for indoor channels in LOS conditions, and up to 70 ns for indoor NLOS conditions. Since changing the CP size would change the number of OFDM symbols in a subframe, configuring many different CP sizes is not feasible for a fixed sub-frame duration.

To address the limitation posed by the CP, several waveforms such as zero tail (ZT) Discrete Fourier Transform (DFT) spread OFDM (DFT-s-OFDM) and unique word (UW) OFDM are provided in the following embodiments.

Discrete Fourier Transform (DFT) spread OFDM (DFT-s-OFDM) is a single carrier (SC)-like transmission scheme that can be combined with OFDM and has the flexibility to be used in multiple access schemes, which deals with the assignment of multiple users to a shared communication resource, has fast adaptation of the waveform to channel variations, and has effective adaptive modulation and coding (AMC) when CSI is available at the transmitter. A main benefit of DFT-s-OFDM, compared to a multi-carrier transmission scheme such as OFDM, is reduced variations in the instantaneous transmit power, implying the possibility for increased power-amplifier efficiency. As each sub-carrier carries a portion of the superimposed DFT spread data symbols, DFT-s-OFDM may be referred to as SC-FDMA.

DFT-s-OFDM is essentially a single carrier modulation block-based transmission scheme with which a lower Peak-to-Average-Power Ratio (PAPR) can be achieved in comparison than OFDM. Its robustness to the frequency selective fading is also equivalent to OFDM since cyclic prefix (CP) is introduced to avoid inter-symbol interference due to frequency selective fading.

With a DFT spreading block prior to a subcarrier mapping block and an Inverse Discrete Fourier Transform (IDFT) block, which may be referred to as an Inverse Fast Fourier Transform (IFFT) block, DFT-s-OFDM proves to be an effective way of combining the benefits of OFDM with a low PAPR transmission signal. In particular, the principle of DFT-s-OFDM transmission applied to an uplink multiple access system is explained whereby multiple users transform their time domain symbols independently via the DFT block to get the frequency domain symbols. Each user then maps its frequency domain symbols via a subcarrier mapping block onto a pre-assigned portion of the overall system spectrum, followed by IDFT (IFFT) and CP insertion as in a typical OFDM transmission. Each sub-carrier carries a portion of the superimposed DFT spread data symbols. That is, each sub-carrier contains information of all transmitted symbols. Note that M represents the number of sub-carriers assigned to a user (i.e., to a WTRU) and N is the total number of sub-carriers in the system. Thus, an M-sized DFT block is a DFT block with a size equal to the number of subcarriers (M) assigned to the WTRU for an UL transmission.

Subcarrier mapping performed by the subcarrier mapping block can be classified into two types: localized mapping and distributed mapping. In localized mapping, the DFT outputs are mapped to a subset of consecutive subcarriers, thereby confining them to only a fraction of the system bandwidth. In distributed mapping, the DFT outputs of the input data are assigned to subcarriers over the bandwidth non-continuously, resulting in zero amplitude for the remaining subcarriers.

Consider that a number of data symbols Nd are to be transmitted by a DFT-s-OFDM transmitter. In one case, Nd is equal to M, i.e., all data symbols are mapped to the DFT block. The transmit chain of data symbols Nd is first converted from serial data into M symbols of parallel data by which M subcarriers are modulated based on the number of sub-carriers (M). This may be done within the transmit buffer. Thus, a serial to parallel converter takes the serial stream of input data bits Nd and outputs M parallel streams to a DFT block. In another case, Nd is less than M. In this case, some of the inputs of the DFT block may be set to zero, or some known symbols, for example, reference signals.

M points DFT spreading (pre-coding) is performed for M modulated sub-carriers to distribute the time domain signal over the frequency domain. Thus, DFT "pre-coding" is performed on the Nd data symbols (i.e., a block of Nd modulation symbols from some modulation alphabet, e.g., QPSK or 16 QAM) by a size-M DFT to transform the Nd data symbols into the frequency domain. The output of the DFT block is M. The input is also M, but all of the M inputs may be data (e.g., when Nd=M) or only a portion of them (e.g., when Nd<M). By adjusting the transmitter DFT size M and the size of the block of modulation symbols, the nominal bandwidth of the DFT-s-OFDM signal can be dynamically adjusted.

The modulated symbols output from the DFT block are mapped to orthogonal subcarriers of the baseband spectrum by the subcarrier mapping block. The sub-carrier mapping allows flexible allocation of signals to available sub-carriers.

As used herein, IDFT and IFFT may be used interchangeably with respect to this component of the transmitter since the IDFT uses the inverse fast Fourier transform algorithm IFFT. The transformation back to the time domain is done with an N-point IDFT (N-point IFFT). In particular, the M points of DFT spread modulated signals are fed to N points of an IFFT processor where the Fourier transformation adds the orthogonal spectrum of each subcarrier to the resulting baseband spectrum to generate OFDM signals. Typically, the IFFT size is selected as $N=2^n$ for some integer n to employ FFT algorithm for reducing signal processing complexity. It may be assumed that M is an even number and M<N where the unused inputs of the IFFT are set to zero. Finally, the resultant output from the N parallel arms of the IFFT are summed up together to produce the OFDM signal. Also similar to OFDM, a cyclic prefix (CP) is preferably inserted for each transmitted block, the presence of a cyclic prefix allows for straightforward low-complexity frequency-domain equalization at the receiver side.

As noted above, M may be less than N and the remaining inputs to the IFFT may be set to zero. In this case, the output of the IFFT will be a signal with 'single-carrier' properties, i.e., a signal with low power variations, and with a bandwidth that depends on M. More specifically, assuming a sampling rate, with a sampling frequency Fs, at the output of the IFFT, the nominal bandwidth BW of the transmitted signal will be BW=M/N*Fs. Thus, by varying the block size M, the instantaneous bandwidth of the transmitted signal can be varied, allowing for flexible-bandwidth assignment. Furthermore, by shifting the IFFT inputs to which the DFT outputs are mapped by the subcarrier mapping block, the transmitted signal can be shifted in the frequency domain.

A DFT-s-OFDM receiver, after converting the serial data into parallel data, would follow the inverse of the DFT-s-OFDM transmitter processes described above, using an FFT block, a reverse subcarrier mapping block and an IDFT block in succession, before converting the parallel outputs of the IDFT into serial data.

ZT DFT-s-OFDM is described according to one or more embodiments. The zero tail based waveforms decouple the numerology from the channel characteristics. The zero tail duration may be dynamically adapted to the channel delay spread, without changing the OFDM symbol duration. In addition, the zero tail may be used as a gap for beam switching, DL/UL switching, and interference measurement in mmW channels.

Figure 13:
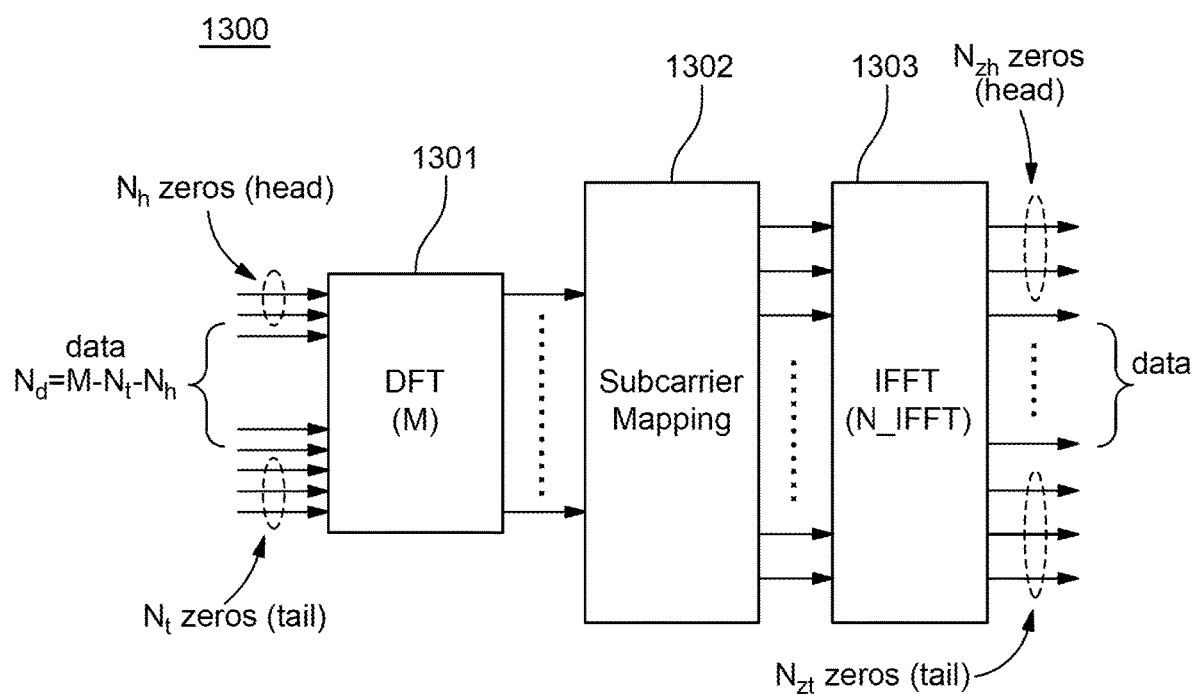
FIG. 13 is a block diagram which illustrates a zero tail (ZT) discrete Fourier transform (DFT) spread OFDM (DFT-s-OFDM) transmitter according to one or more embodiments.

FIG. 13 is a block diagram which illustrates a ZT DFT-s-OFDM transmitter 1300, including an M-sized DFT spreading block 1301, a subcarrier mapping block 1302 and an N_IFFT-sized IFFT block 1303, each of which perform functions similarly described above for DFT-s-OFDM. In addition, in ZT DFT-s-OFDM, a zero tail is generated by feeding a number of zeros Nh to the head and a number of zeros Nt to the tail of the DFT spreading block, as shown in FIG. 13. As described above, the DFT spreading block spreads the data symbols Nd, the Nh zeros and the Nt zeros between all the available (allocated) subcarriers. Thus, the number of input data symbols Nd is equal to M-Nt-Nh, where M represents size of the DFT spreading block 1301. Applying a specific carrier mapping as an example, if the size of the DFT spreading block 1301 is M and the size of the IFFT block 1303 is N_IFFT, at the output of the IFFT there will be the M data symbols and (N_IFFT/M-1) interpolated samples between each data symbol, as shown in FIG. 14.

Figure 14:
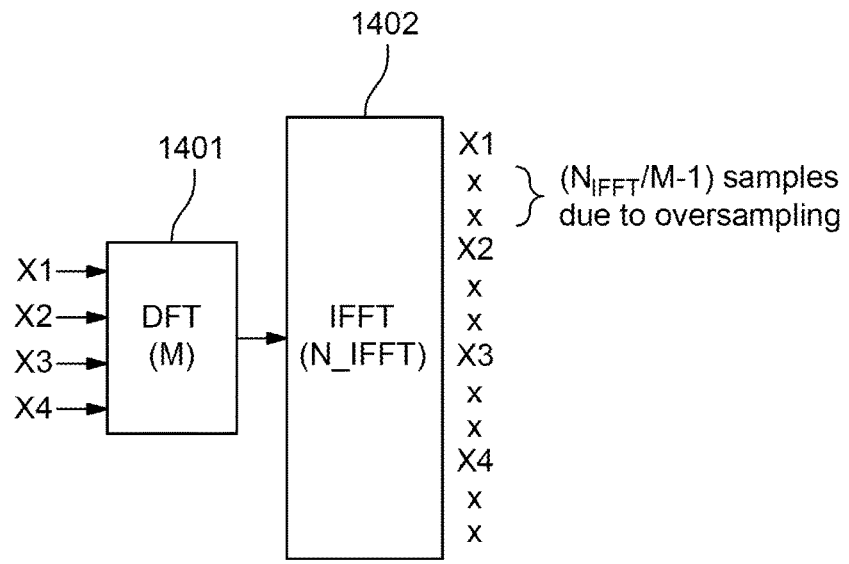
FIG. 14 illustrates a block diagram zero tail/head generation according to one or more embodiments.

FIG. 14 illustrates a mechanism for zero tail/head generation. In particular, inputs X1-X4 are fed into an M-size DFT block 1401, and a number of outputs, including X1-X4, are output from the NIFFT-size IFFT block 1402. $N_{IFFT}$ or NIFFT is the IFFT size performed over the entire system bandwidth. Inputs X2 and X3 represent data symbols that are subsequently output by the IFFT block 1402. If in FIG. 14, X1 is set to zero at the input of the DFT block 1401, the X1 (head) output of the NIFFT-size IFFT block 1402 becomes zero. Similarly, if X4 is set to zero at the input of the M-size DFT block 1401, the X4 (tail) output of the NIFFT-size IDFT block 1402 becomes zero. Therefore, the zero inputs to the DFT block 1401 will be distributed on the head and tail of the signal at the output of the IFFT.

However, the tail does not become exactly zero due to the interpolated samples. In addition, since the interpolated samples are data dependent, the zero tail is different from one DFT-s symbol to the next. Therefore, the cyclic property is not preserved, which leads to a bit error floor at high SNR for high order modulations.

In summary, one shortcoming of the ZT DFT-s OFDM signal is that the non-perfect zero tail breaks the cyclic property of the OFDM signal and creates Inter-Symbol Interference (ISI). This results in a bit error rate (BER) floor at high signal-to-noise ratio (SNR) in high delay spread channels.

The ZT solution shown in FIG. 13 is defined for DFT-s OFDM only. Thus, other high complexity solutions to generate ZT for OFDM are provided herein.

Unique Word (UW) OFDM is a method used to eliminate the waveform overhead due to the CP, by replacing the CP with a fixed pilot, referred to as "Unique Word". The unique word may be used for synchronization, channel estimation and phase tracking purposes. In this case, the CP is not required, as the UW acts a guard interval against ISI and maintains the cyclic property of the signal.

In one method of generating the UW OFDM, the tail of the OFDM symbol at the output of the IFFT block is forced to zero. This may be achieved using a redundant signal at the input of the IFFT, whereby the redundant signal is generated by precoding the data symbols and mapped to a certain set of subcarriers. The set of subcarriers should be carefully selected so that the power used for the redundant data does not become excessive. Once the tail is forced to zero, the deterministic UW sequence may be added to the zero tail to facilitate tasks such as synchronization, channel estimation, etc.

Figure 15:
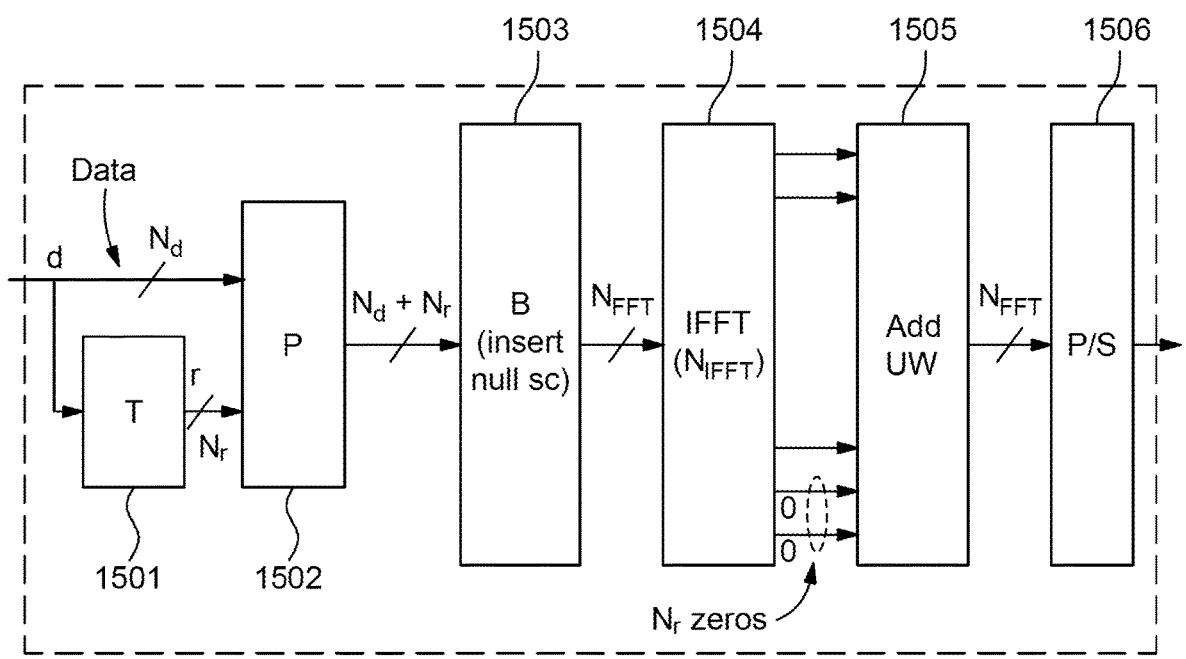
FIG. 15 is a block diagram of an exemplary unique word (UW) OFDM transmitter according to one or more embodiments.

FIG. 15 shows a UW OFDM transmitter 1500 according to one or more embodiments. Modulation data symbols d are input to the transmitter 1500. The data symbols d are passed on to a redundant data generator (T) 1501, which generates redundant data r, and a permutation matrix (P) 1502. The permutation matrix 1502 receives a number of data symbols Nd and a number of redundant data symbols Nr. The modulation data symbols d and redundant data r are mapped to the IFFT block 1504 after processed by the permutation matrix 1502, whose task is to map the data d and redundant data r to the correct subcarriers, and block (B) 1503, whose task is to insert a null set of (zero) subcarriers for the guard bands. The transmitted signal with zero tail may be written as $$F_{NIFFT}^H BP \begin{bmatrix} d \\ r \end{bmatrix} = \begin{bmatrix} x_d \\ 0 \end{bmatrix},$$

where block B 1503 inserts the zero subcarriers for the guard bands, and $F_{NIFFT}^H$ is the FFT matrix (of size N_IFFT× N_IFFT), and the superscript H indicates the Hermitian (transpose conjugate) of the matrix. The formula describes in matrix form the processing steps at the transmitter, specifically:

$$P \begin{bmatrix} d \\ r \end{bmatrix}$$

means the permutation matrix applied to the input vector of data and redundant symbols;

$$BP \begin{bmatrix} d \\ r \end{bmatrix}$$

describes the next step, i.e., the sub-carrier mapping function performed by block B 1503, which can also be expressed as matrix multiplication; and $$F_{NIFFT}^H BP \begin{bmatrix} d \\ r \end{bmatrix}$$

describes the next step, which is the IFFT processing (that can also be expressed as matrix multiplication, i.e., the IFFT matrix times the vector at the matrix input, which is the vector generated as output of second step above. Writing, $$M = F_{NIFFT}^H BP = \begin{bmatrix} M_{11} & M_{12} \\ M_{21} & M_{22} \end{bmatrix},$$

the redundant data may be computed as r=Td where $T=-M_{22}^{-1}M_{21}$.

A unique word block 1505 generates and inserts a unique word for each transmitted block, and the OFDM signal NFFT is converted to a serial data symbols by a parallel to serial converter 1506.

The Tx and Rx complexity for the UW OFDM signal are high. For each resource allocation, the permutation matrix P used in 1502 needs to be optimized to minimize the power of the redundant subcarriers. This results in both computational complexity at the transmitter, and in signaling overhead, as knowledge of the permutation matrix is required at the receiver, in order to decode the data. Due to the need to optimize the permutation matrix for each resource allocation, support of frequency domain scheduling and multi-user is difficult with UW-OFDM.

Thus, embodiments disclosed herein may provide waveform(s) that dynamically change the guard interval duration to support different channel delay spreads without changing the numerology. Embodiments may further address one or more shortcomings of existing ZT or UW waveforms. These embodiments may eliminate an error floor of ZT DFT-s OFDM and improve the BER performance, if possible, and provide flexible support for frequency domain scheduling and multi-user to UW-OFDM, while reducing the overall complexity. Embodiments disclosed herein may define a flexible framework that supports both DFT-s-OFDM, and OFDM based waveforms.

Embodiments disclosed herein include an enhanced ZT solution (eZT) for DFT-s-OFDM, an eZT solution for OFDM, and system aspects for ZT/UW waveforms. These embodiments may be implemented in a transmitter, a receiver and/or a transceiver, and in combination with a processor, of a WTRU and/or any type of base station (e.g., eNode-B (eNB), mmW eNB (mB), Small Cell mmW eNB (SCmB), etc.), collectively referred to herein as a wireless communication device.

The eZT solution for DFT-s-OFDM provides one or more of the following: an iterative approach for exact zero-tail generations; time-domain tail cancellation prior to guard band insertion including UW support using eZT DFT-s-OFDM; extending the time-domain tail cancellation prior to guard band insertion for multi-user support; time-domain tail cancellation at the IFFT output after guard band insertion; a receiver structure including an optimal Linear Minimum Mean Square Error (LMMSE) and a reduced complexity receiver; and performance metrics including BER, PAPR, and out-of-band (OOB).

The eZT solution for OFDM includes one or more of the following: an iterative approach for exact zero-tail cancellation; time-domain tail cancellation prior to guard band insertion; tail cancellation using a ZT DFT-s approach and a UW-ZT approach; multi-user support; and performance metrics. System aspects for ZT/UW waveforms are further disclosed.

The set of examples disclosed herein may have a number of advantages over the existing ZT DFT-s-OFDM and UW OFDM waveforms. The eZT DFT-s-OFDM solution may significantly reduce the tail power as compared to ZT DFT-s-OFDM, thus improving the performance at high SNR and high order modulation. This is an important enabler for reaching the high peak data rates expected for 5G. The eZT ODFM solution has a reduced complexity transmitter architecture, that makes it easier to support frequency domain (and multi-user) scheduling, thus solving the problem experienced by the current UW OFDM waveform. The disclosed eZT solution has a flexible, modular architecture that supports both DFT-s-OFDM and OFDM. Due to the fact that the disclosed solution significantly reduces the tail power compared to ZT, it may be used to support UW insertion, for both DFT-s-OFDM and OFDM. The disclosed solution has low out-of-band (OOB) emissions, significantly lower than the traditional CP DFT-s-OFDM or CP OFDM, making it a promising solution for 5G.

In an enhanced ZT embodiment for DFT-s-OFDM, an iterative approach for exact zero tail generation is provided herein. In this low complexity embodiment, the exact zero tail is generated by adding a low power cancellation signal to data sub-carriers, whereby the low power cancellation signal is generated by selecting the Nzt time-domain samples, spreading them with a DFT block of size Nzt, then mapping the cancellation signal in an interleaved fashion to the in-band subcarriers, and super-imposing the cancellation signal on the data subcarriers, as shown in FIG. 16.

Figure 16:
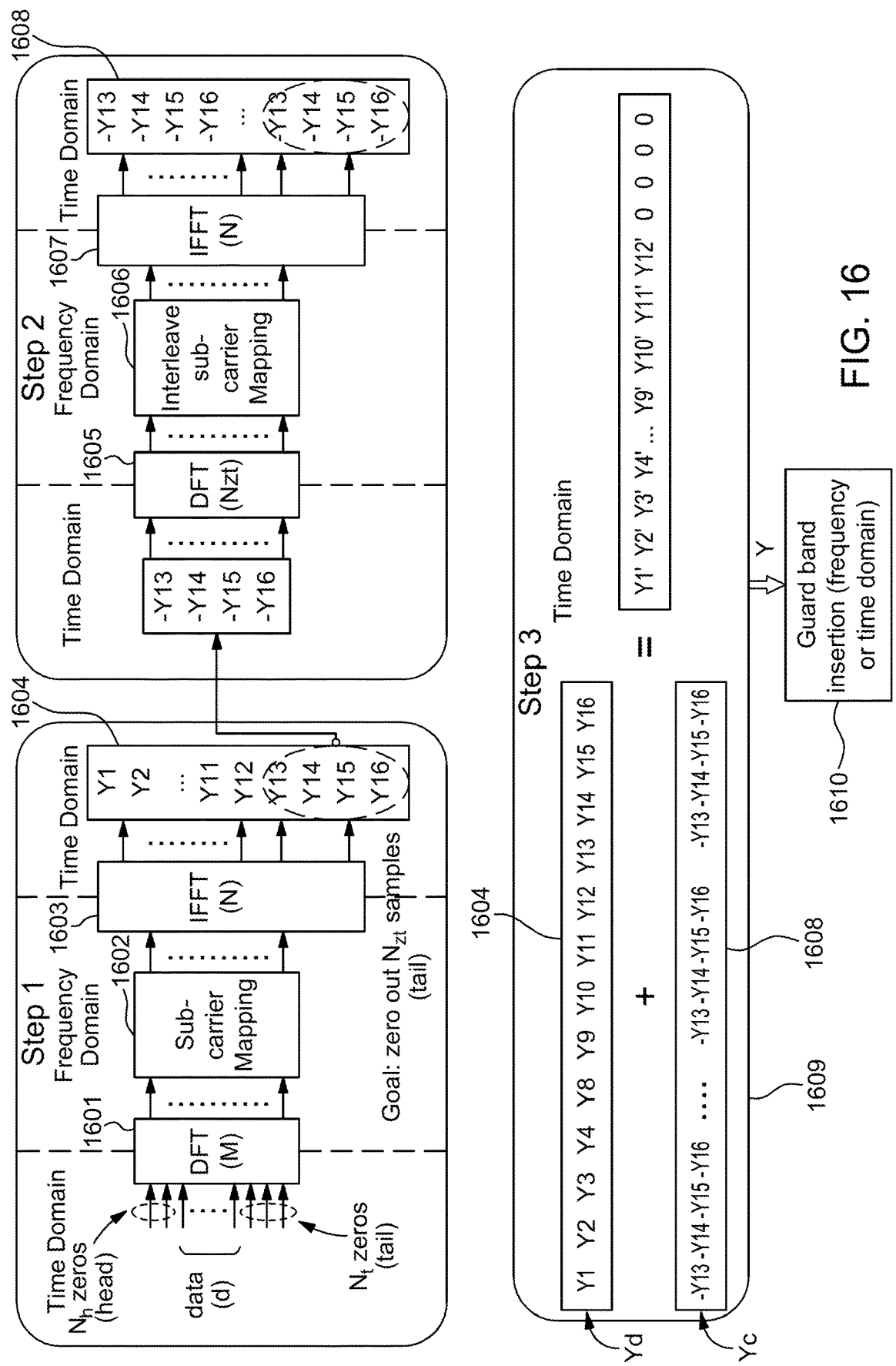
FIG. 16 is an flow diagram which illustrates an iterative approach implemented in a transmitter for exact zero tail generation for discrete Fourier transform spread (DFT-s) according to one or more embodiments.

FIG. 16 is a flow diagram which illustrates an iterative approach implemented in a transmitter for eZT generation for DFT-s-OFDM. To generate a low power tail cancellation signal of Nzt time domain samples Y13, Y14, Y15 and Y16 at the IFFT output, shown by way of example as Y13, Y14, Y15 and Y16 in step 1 of FIG. 16, Nt zero symbols may be placed at the tail of the input data symbols (d), as inputs to the DFT block 1601. Additionally, as an enhancement, Nh zero symbols may be placed at the head of the data symbols (d) at the input of the DFT block 1601, to further reduce the tail power. If the zero head is not used, Nh may be set to 0.

The frequency-domain output of the DFT block 1601 in step 1 is mapped to the input of the size N IFFT block 1603, by means of a (non-interleave) sub-carrier mapping block 1602. The sub-carrier mapping block 1602 may map the DFT outputs to consecutive sub-carriers at the IFFT block 1603 input, in order to preserve the single carrier property of the signal.

In Step 2 of the processing shown in FIG. 16, Nzt time domain samples (i.e., sub-vector) at the output of the IFFT block 1603, shown by way of example as Y13, Y14, Y15 and Y16 in step 1 of FIG. 16, are sign inverted (e.g., −Y13, −Y14, −Y15 and −Y16) by an inverter, may be normalized (e.g., multiplied by a normalization factor), and fed to the input of a size Nzt DFT block 1605. The outputs of the size Nzt DFT block 1605 are mapped by an interleave subcarrier mapping block 1606 in an interleaved fashion to the size N IFFT block 1607, whereby zeros are inserted on $$\frac{N}{N_{zt}} - 1$$

consecutive sub-carriers between each output of the Nzt size DFT block 1605, where $$\frac{N}{N_{zt}}$$

is an integer value. As a result of this interleaved sub-carrier mapping, the output of the IFFT block 1607 is a replica of the signal at the input of the DFT block 1605, repeated $$\frac{N}{N_{zt}}$$

times. Using the example shown in Step 2 of FIG. 16, the output of the IFFT block 1607 is comprised of the vector [−Y13, −Y14, −Y15, −Y16], repeated $$\frac{N}{N_{zt}}$$

times.

In Step 3 of the processing, the outputs 1604 and 1608 of the IFFT blocks 1603 and 1607, respectively, in Steps 1 and 2 are summed together by a summing block 1609, thus resulting in an exact zero tail of length Nzt samples, at the output of the summing block 1609. It will be appreciated that the Nzt time domain samples Y13, Y14, Y15 and Y16 may not be inverted, but instead, the low power cancellation signal (output of Step 2) may be subtracted from the data signal (output of Step 1) in step 3.

The time-domain signal y, generated at the output of Step 3 by the summing block 1609, is further processed by a guard insertion block 1610 before being transmitted on the channel. The guard insertion may be performed either in the frequency domain, or in the time domain. The tail, in general, may not be exactly zero after guard band insertion.

Figure 17:
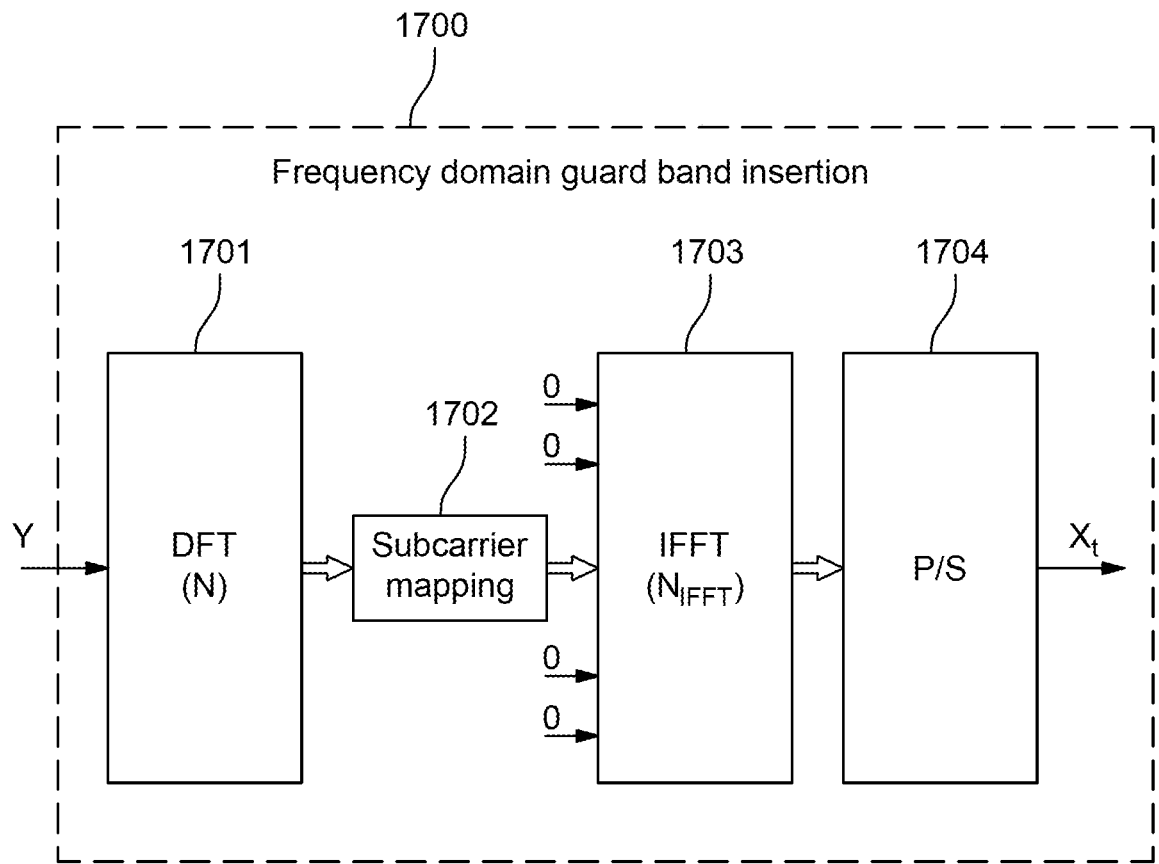
FIG. 17 illustrates a block diagram of a guard band insertion block implemented in a frequency domain according to one or more embodiments.
Figure 18:
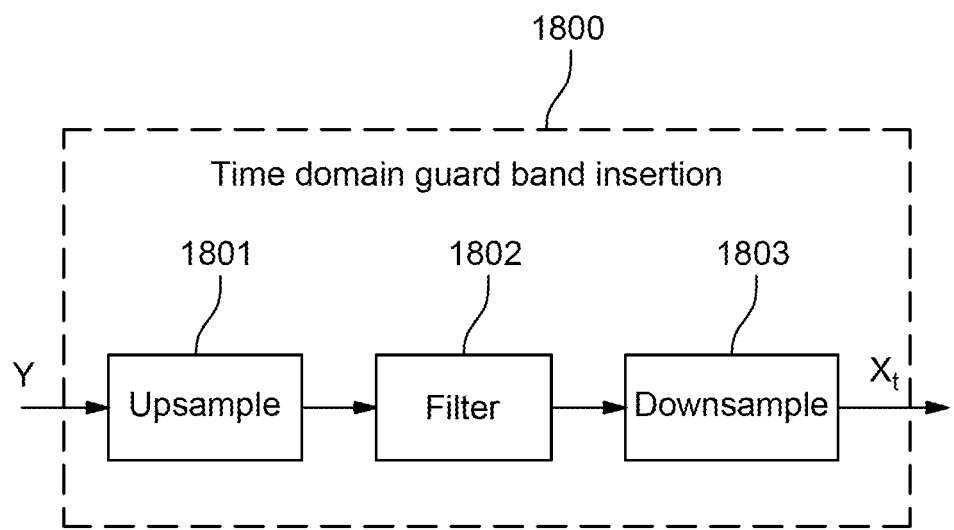
FIG. 18 illustrates a block diagram of a guard band insertion block implemented in a time domain according to one or more embodiments.

An example of guard band insertion performed in the frequency domain is shown in FIG. 17 and an example of guard band insertion performed in the time domain is shown in FIG. 18.

The following notations are used herein:

$F_N \in \mathbb{C}^{N \times N}$ is an N size FFT matrix (normalized), $F_N^H$ denotes the N size IFFT matrix, $I_N \in \mathbb{R}^{N \times N}$ is an identity matrix, $O_{N_1 \times N_2} \in \mathbb{R}^{N_1 \times N_2}$ is an $N_1 \times N_2$ zero matrix, $P_d \in \mathbb{R}^{N \times M}$ is the sub-carrier mapping matrix used by the subcarrier mapping block 1602 for the data part of the signal in Step 1 of FIG. 16, and $P_c \in \mathbb{R}^{N \times N_{zt}}$ is the sub-carrier mapping matrix used by the subcarrier mapping block 1606 for the cancellation part of the signal in Step 2 of FIG. 16.

As explained previously, the Nzt outputs of the DFT block 1605 are mapped in a uniformly interleaved fashion, to the inputs of the N-size IDFT (IFFT) block 1607. Thus the $P_c$ matrix may be expressed as follows:

$$P_c(n, m) = \begin{cases} 1, & \text{for } n = k \cdot \frac{N}{N_{zt}} \text{ and } m = k, 0 \leq k \leq N_{zt} - 1 \\ 0, & \text{otherwise} \end{cases} \quad \text{Equation 1}$$

In an example, for N=16 and Nzt=4, the $P_c$ matrix is defined as:

$$P_c = \begin{bmatrix} 1 & 0 & 0 & 0 \\ 0 & 0 & 0 & 0 \\ 0 & 0 & 0 & 0 \\ 0 & 0 & 0 & 0 \\ 0 & 1 & 0 & 0 \\ 0 & 0 & 0 & 0 \\ 0 & 0 & 0 & 0 \\ 0 & 0 & 0 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 1 \\ 0 & 0 & 0 & 0 \\ 0 & 0 & 0 & 0 \\ 0 & 0 & 0 & 0 \end{bmatrix} \quad \text{Equation 2}$$

Nzt is the desired length of the zero tail (in samples). M is the DFT size. N is the number of used sub-carriers. Nt is the number of symbols set to zero at the tail at the DFT input.

$$N_{zt} = N_t \left\lfloor \frac{N}{M} \right\rfloor,$$

where $\lfloor A \rfloor$ denotes a "floor" operation, for example, the largest integer smaller or equal to A. $N_{IFFT}$ is the IFFT size performed over the entire system bandwidth. $B \in \mathbb{R}^{N_{IFFT} \times N}$ is the matrix used for sub-carrier mapping, which includes the guard band insertion.

The size M vector at the input of the DFT 1601 may be expressed as:

$$x = \begin{bmatrix} 0_{N_h \times 1} \\ d \\ 0_{N_t \times 1} \end{bmatrix}$$

where $d \in \mathbb{C}^{(M-N_h-N_t) \times 1}$ is a vector of complex data modulation symbols.

At the output of the N-size IFFT 1603 of FIG. 16, the last Nzt samples may be used to generate the tail cancellation signal, as follows. Let $y_d = [y_0 \, y_1 \, \ldots \, y_{N-1}]^T$, $y_d \in \mathbb{C}^{N \times 1}$ be the vector at the output of the N-size IFFT 1603, and $y_{temp\_c} \in \mathbb{C}^{N_{zt} \times 1}$ be the vector of the last Nzt samples of $y_d$, $y_{temp\_c} = [y_{N-N_{zt}} \, \ldots \, y_{N-1}]^T$. The last Nzt samples used in the cancellation process ($y_{temp\_c}$) may be expressed in terms of the vector $y_d$ at the output of the IFFT 1603 as: $y_{temp\_c} = C y_d$ where $C \in \mathbb{R}^{N_{zt} \times N}$ is a matrix that may be used to select the last Nzt samples of $y_d$. The C matrix may be expressed as: $C = [0_{N_{zt} \times (N-N_{zt})} \, I_{N_{zt}}]$. Using the previous notations, the signal $y_d$ at the output of the N-size IFFT 1603 of step 1 may be written as: $y_d = F_N^H P_d F_M x$.

Similarly, when applying the sign-inverted $-y_{temp\_c}$ samples to the input of the Nzt size DFT 1605, followed by the sub-carrier mapping operation $P_c$ of the mapping block 1606, and followed by the N-size IFFT 1607, the cancellation signal (scaled by a factor of $$\sqrt{\frac{N}{N_{zt}}}\,)$$

at the output of Step 2 may be written as:

$$y_c = -\sqrt{\frac{N}{N_{zt}}} F_N^H P_c F_{N_{zt}} y_{temp\_c} = \quad \text{Equation 3}$$

$$-\sqrt{\frac{N}{N_{zt}}} F_N^H P_c F_{N_{zt}} C y_d = -\sqrt{\frac{N}{N_{zt}}} F_N^H P_c F_{N_{zt}} C F_N^H P_d F_M x$$

Next, the data signal $y_d$ and the cancellation signal $y_c$ are summed together by summing block 1609, resulting in the time-domain signal $y = y_d + y_c$ with the last Nzt samples equal zero. By substituting $y_d$ and $y_c$ in the previous equation, the time-domain signal y may be rewritten as:

$$y = F_N^H \left( I_N - \sqrt{\frac{N}{N_{zt}}} P_c F_{N_{zt}} C F_N^H \right) P_d F_M x \quad \text{Equation 4}$$

As previously indicated, once the tail cancellation is performed in time domain by the summing block 1609, the guard bands may be inserted by the guard band insertion block 1610 before the signal is transmitted.

In an example of the frequency domain guard band insertion, a guard band insertion block 1700 is shown in FIG. 17. The signal y at the output of step 3 may be passed through an N-size DFT block 1701, followed by guard band insertion, which may be modeled for analysis purposes as a multiplication by matrix B by a subcarrier mapping block 1702, and an IFFT operation over the entire system bandwidth by size NIFFT IFFT block 1703, followed by a parallel to serial conversion by parallel to serial converter block 1704. The time domain signal at the transmitter output may be expressed as:

$$x_t = F_{N_{IFFT}}^H B F_N y \quad \text{Equation 5}$$

By substituting y in the previous equation, the transmitted signal $x_t$ becomes:

$$x_t = F_{N_{IFFT}}^H B \left( I_N - \sqrt{\frac{N}{N_{zt}}} P_c F_{N_{zt}} C F_N^H \right) P_d F_M x \quad \text{Equation 6}$$

This expression for the time domain transmitted signal will be used below to derive the receiver structure for the eZT DFT-s-OFDM signal.

In an example of the time domain guard band insertion, a guard band insertion block 1800 is shown in FIG. 18. The signal y at the output of step 3 may be passed through an upsampler 1801, a filter 1802, and a downsampler 1803, and the transmitted signal $x_t$ is output.

Time-domain tail cancellation prior to guard band insertion is described in more detail below. In an embodiment, a low complexity method to generate exact zero tail in time domain is provided, whereby a low power cancellation signal yc is subtracted from the data signal yd prior to guard band insertion, and the cancellation signal yc is generated by repeating Nzt samples of the data. An example is illustrated in FIG. 19, where, in the example, the tail that needs to be cancelled is comprised of the vector [Y13 Y14 Y15 Y16], which is labeled a for convenience.

Figure 19:
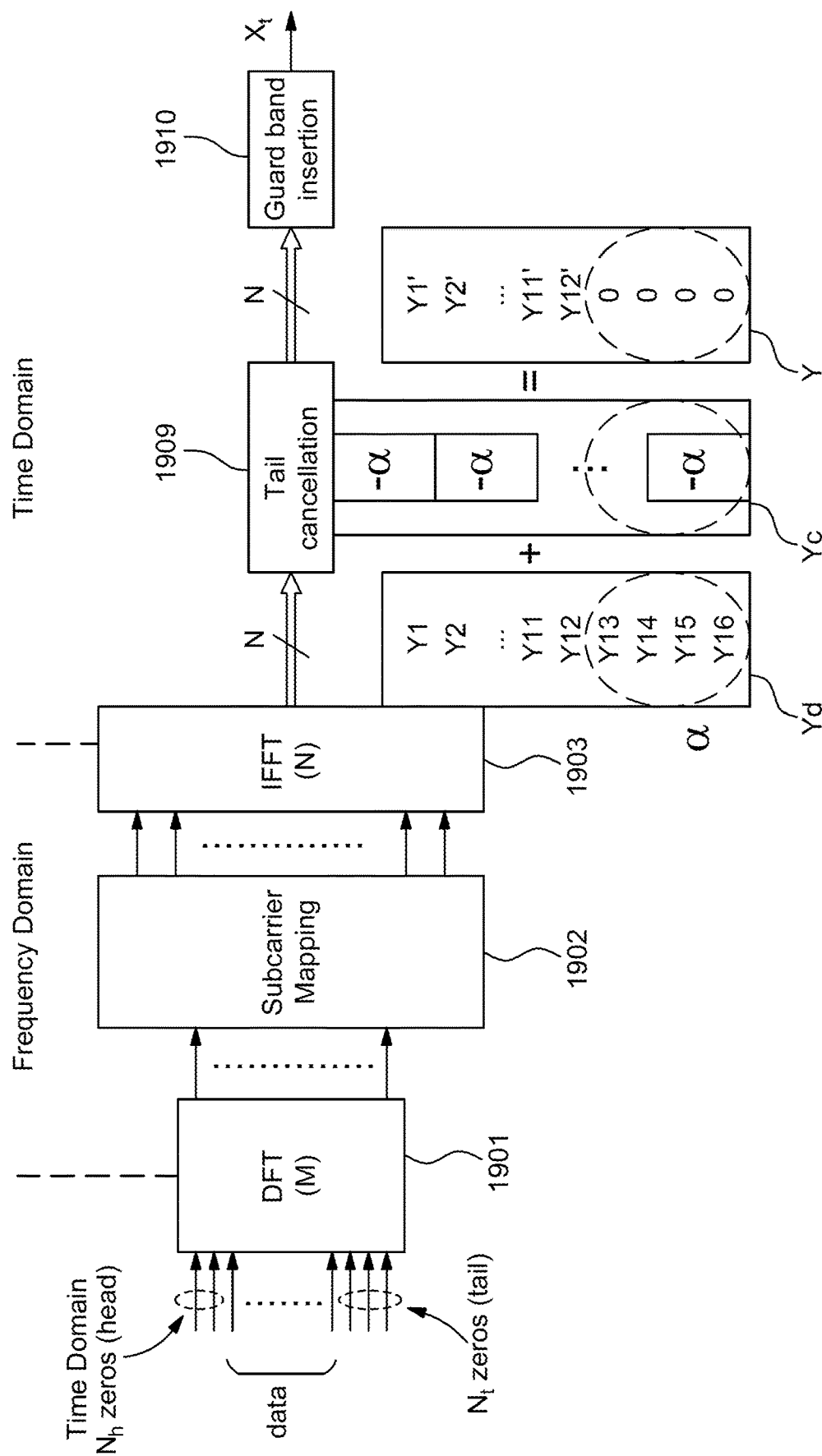
FIG. 19 is a block diagram of a transmitter utilizing time-domain tail cancellation prior to guard band insertion according to one or more embodiments.

FIG. 19 is a block diagram which illustrates time-domain tail cancellation prior to guard band insertion according to one or more embodiments. The transmitter illustrated in FIG. 19 includes an M size DFT block 1901, a (non-interleave) subcarrier mapping block 1902 and an N size IFFT block 1903, as similarly described in step 1 of FIG. 16, a tail cancelation block 1909, as similarly described in step 3 of FIG. 16, and a guard band insertion block 1910, as similarly described at the final output (1610) of FIG. 16. Further, the cancelation signal comprised of the vector [−α −α . . . −α], is generated by repeating the tail part (alpha vector) N/Nzt times. The tail cancelation block 1909 generates the cancellation signal [−α −α . . . −α] and adds it to the output of the IFFT block (1903). Here, like numerals correspond to like elements and the functionality of each block is not repeated for conciseness.

UW support using eZT DFT-s-OFDM is further provided in one or more embodiments. For example, a UW DFT-s-OFDM signal is generated, by adding in the time domain a UW to the exact zero-tail generated by eZT DFT-s-OFDM (i.e., the UW is added prior to guard band insertion).

Figure 20:
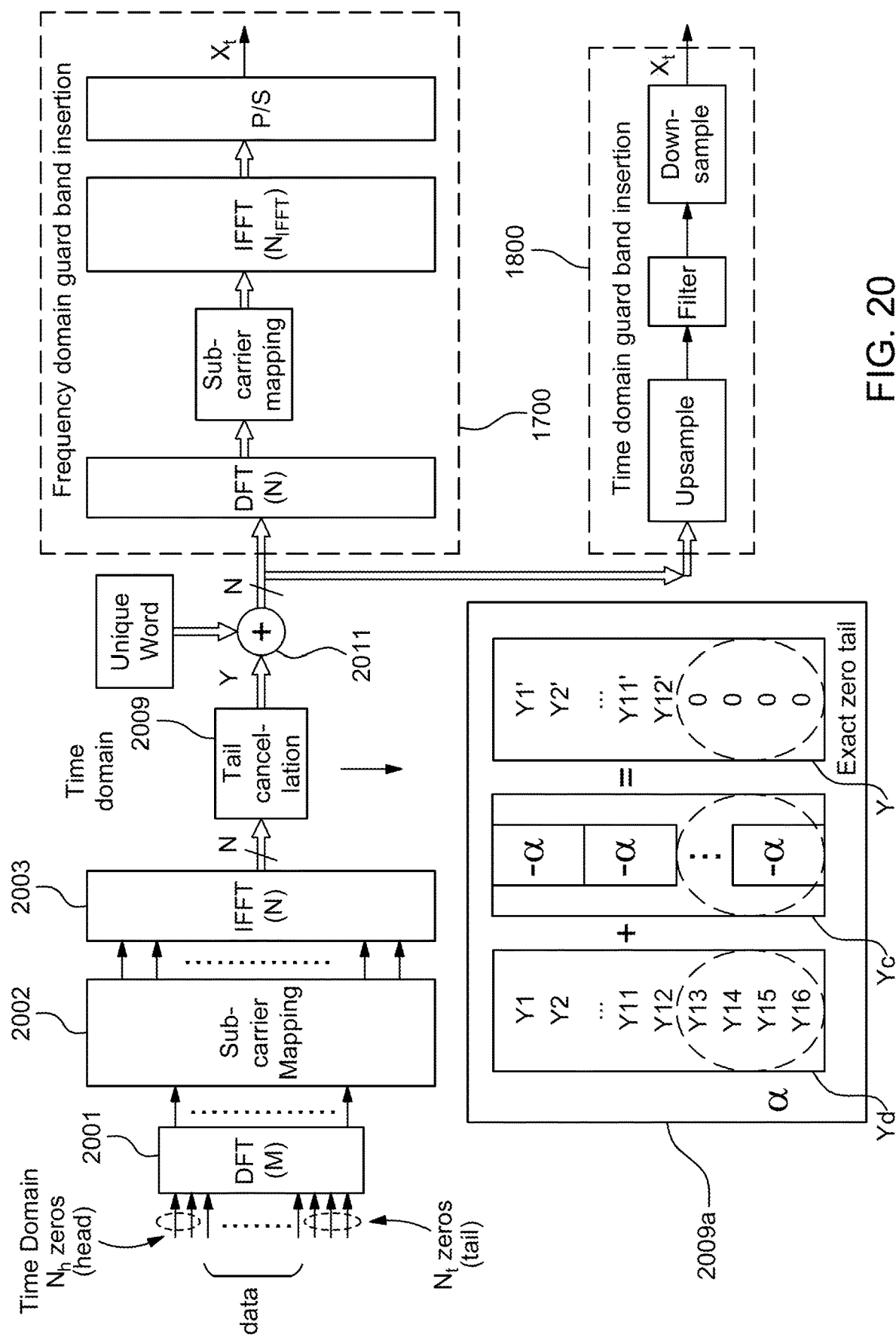
FIG. 20 is a block diagram of a transmitter utilizing UW support using eZT DFT-s OFDM according to one or more embodiments.

FIG. 20 is a block diagram which illustrates UW support using eZT DFT-s-OFDM. The transmitter illustrated in FIG. 20 includes an M size DFT block 2001, a subcarrier mapping block 2002 and an N size IFFT block 2003, as similarly described in step 1 of FIG. 16, a tail cancelation block 2009, as similarly described in step 3 of FIG. 16, and a guard band insertion block 1700 and 1800, as similarly described in FIGS. 17 and 18. Further, the cancelation signal comprised of the vector [−α −α . . . −α], is generated by repeating the tail part (alpha vector) N/Nzt times. The tail cancelation block 2009 generates the cancellation signal [−α −α . . . −α], and adds it to the output of the IFFT block (2003), as shown in process 2009a performed by the tail cancelation block 2009. In addition, a unique word is added by adder 2011 to the time-domain signal y, and the guard band is inserted by guard band insertion block 1700 or 1800 to generate transmitted signal xt. Block 1900a further illustrates the process of generating the time-domain signal y, as previously described. Here, like numerals correspond to like elements and the functionality of each block is not repeated for conciseness.

Figure 21:
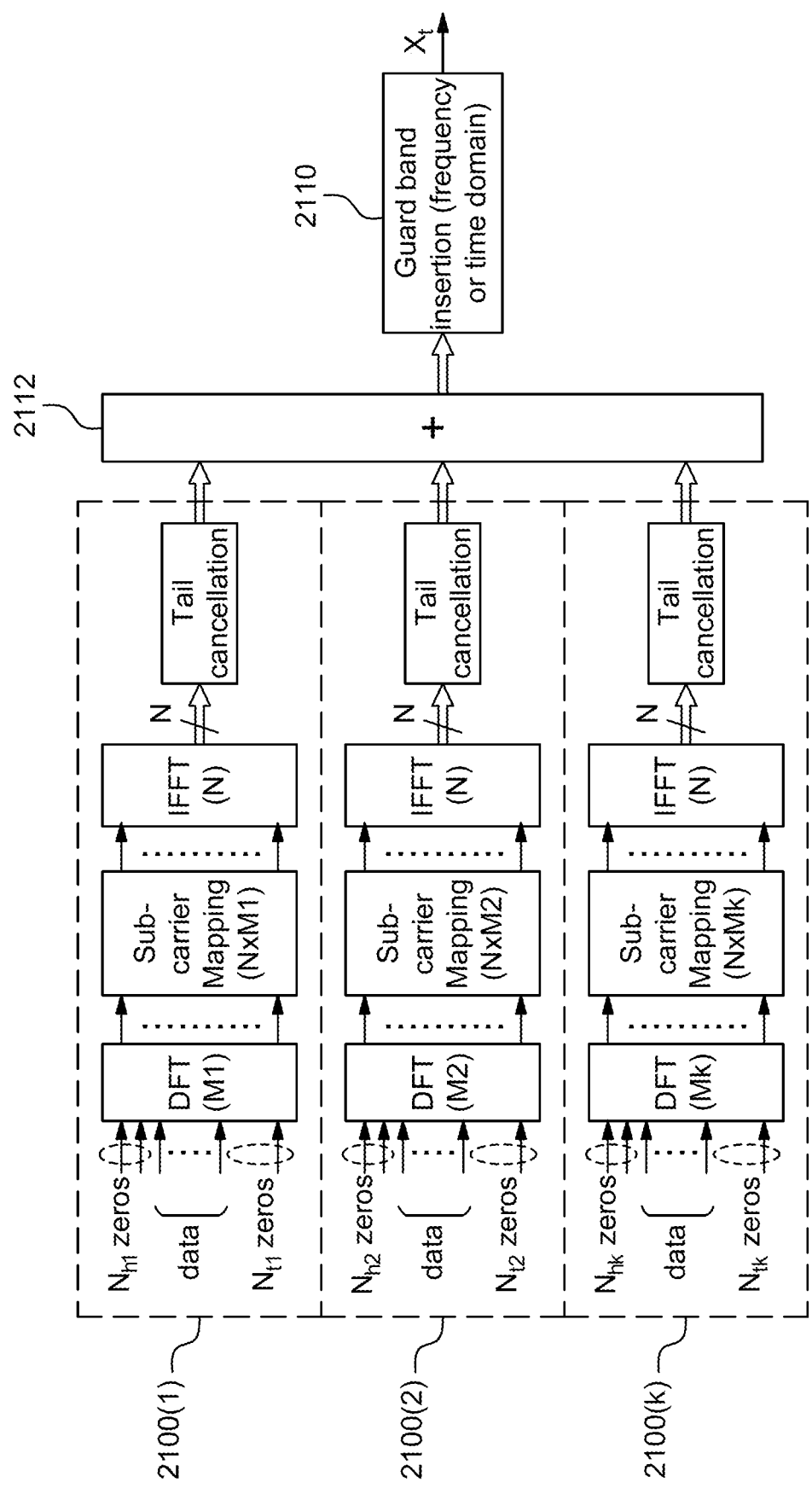
FIG. 21 illustrates a block diagram of a multi-user transmitter utilizing exact zero tail (eZT) DFT-s OFDM according to one or more embodiments.

An architecture for multi-user support is further provided in FIG. 21 in which redundant transmitter structures 2100 (1), 2100(2) . . . 2100(k), as similarly described in reference to FIG. 19, are provided for each user to generate a multi-user transmission. Here, a transmitter (e.g., a base station transmitter) uses the enhanced zero-tail mechanism to generate user specific exact zero-tail for DL DFT-s-OFDM multi-user transmission, whereby, first, the tail cancellation is performed per user, then the multi-user signal for transmission is generated by adding the individual users signals together by adder 2112, and followed by guard band insertion via guard band insertion 2110 for completion of the composite signal. The block diagram of FIG. 21 shows how user specific ZT lengths may be supported. For example, the number of zero sub-carriers that may be placed at the tail of the input data symbols may vary or be the same for each user, and the size of each DFT block may also be the same or different.

As the tail cancellation is performed per user, the solution shown in FIG. 21 enables setting different lengths of zero tail for individual users.

Figure 22:
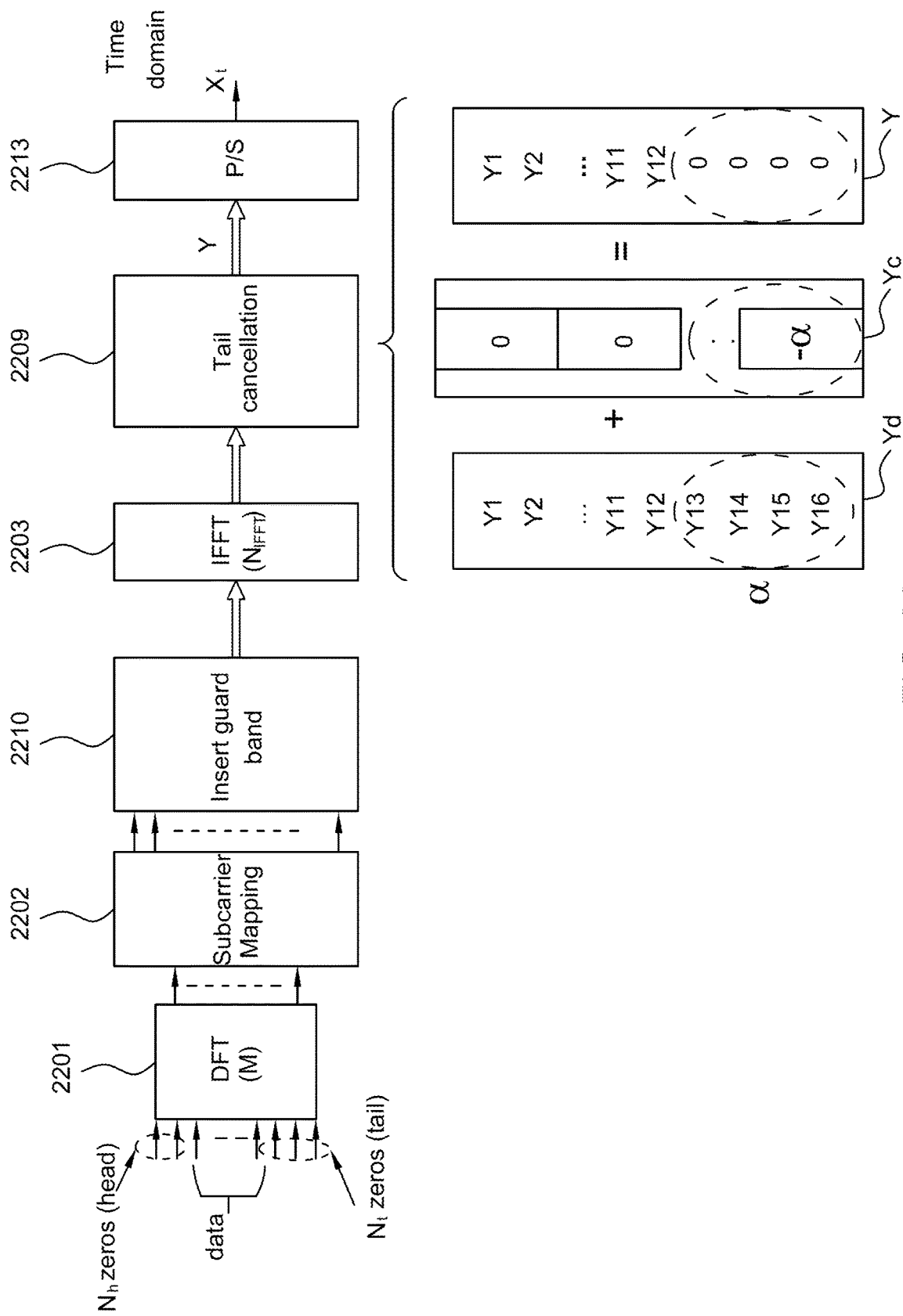
FIG. 22 is a block diagram of a transmitter utilizing tail cancellation in time domain after guard band insertion according to one or more embodiments.

Time-domain tail cancellation at the IFFT output after guard band insertion is provided as another embodiment. Here, tail cancellation may be performed in the time domain at the output of an IFFT block, after the guard band insertion operation, as shown in FIG. 22. The transmitter illustrated in FIG. 22 includes an M size DFT block 2201, a subcarrier mapping block 2202 and an $N_{IFFT}$ size IFFT block 2203, as similarly described in FIG. 17, a tail cancelation block 2209, as similarly described in step 3 of FIG. 16, and a guard band insertion block 2210, as similarly described in FIGS. 16 and 17 with the exception that the guard band insertion block 2210 is disposed between the subcarrier mapping block 2202 and the $N_{IFFT}$ size IFFT block 2203. Further, the cancelation signal comprised of the vector [0, 0 . . . −α], is generated by multiplying the tail part (alpha vector) is taken by −1 to generate—alpha. The tail cancelation block 2209 generates the cancellation signal [0, 0 . . . −α] and adds it to the output of the IFFT block (2203). A parallel to serial converter 2213 receives the time-domain signal y from the tail cancelation block 2209 and converts into serial data symbols. Here, like numerals correspond to like elements and the functionality of each block is not repeated for conciseness.

In this embodiment, it is important to feed Nt and Nh zeros for the tail and head at the input to the DFT. This way, the Nzt tail samples at the output of the IFFT block have low power, which helps reduce the spectrum regrowth that may occur as a result of time domain tail cancellation of Nzt tail samples.

Figure 23:
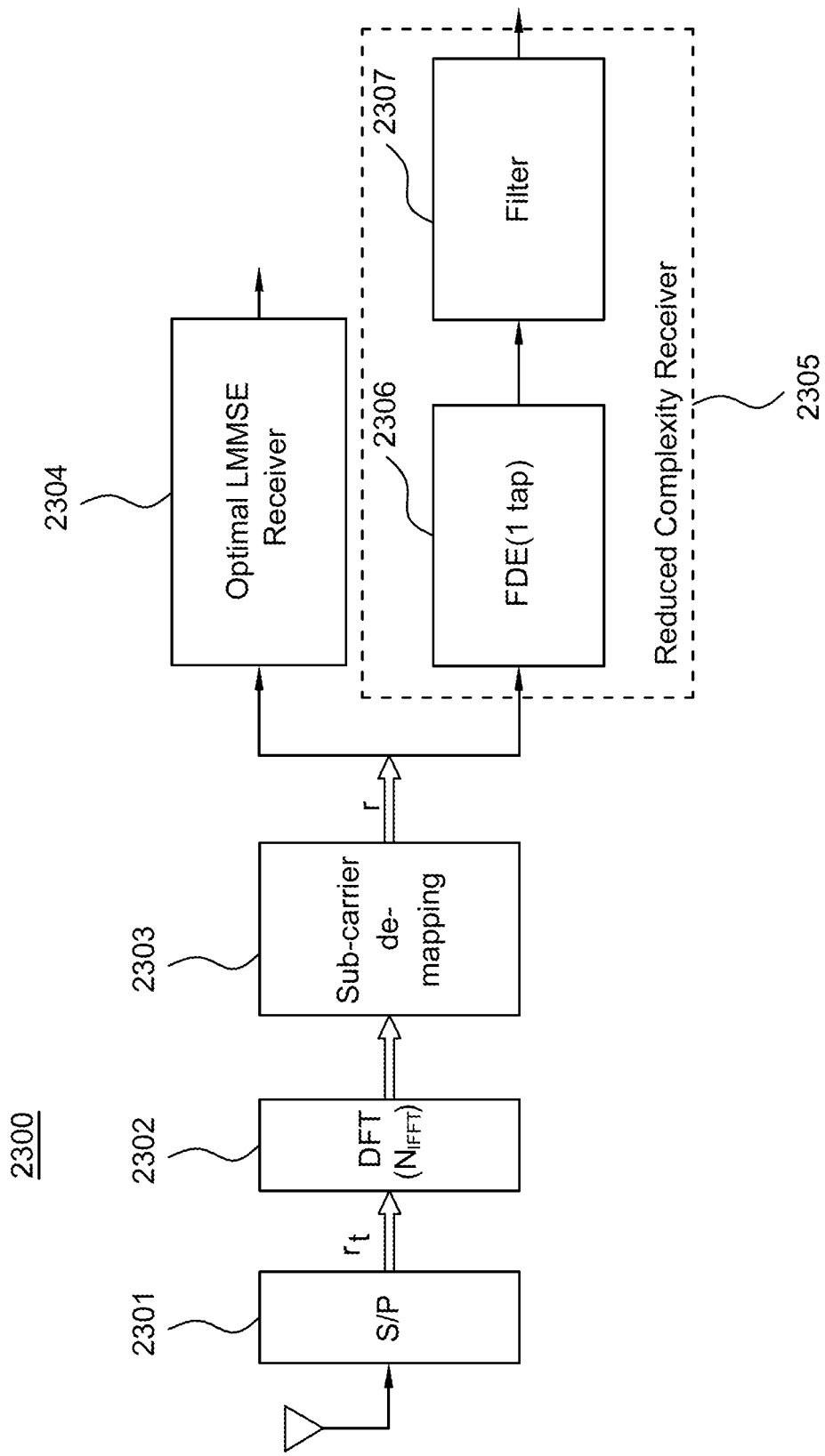
FIG. 23 is a block diagram of a receiver according to one or more embodiments.

In addition to the transmitter structures described above, receiver structures for eZT DFT-s-OFDM are also provided herein. For example, FIG. 23 illustrates a block diagram of a high level receiver 2300 according to one or more embodiments. The structure of the receiver 2300 may be derived starting from the expression of the time domain transmitted signal which is repeated for convenience:

$$x_t = F_{N_{IFFT}}^H B \left( I_N - \sqrt{\frac{N}{N_{zt}}} P_c F_{N_{zt}} C F_N^H \right) P_d F_M x \qquad \text{Equation 7}$$

The frequency domain channel response is denoted by $\Lambda$: $\in \mathbb{C}^{N_{IFFT} \times N_{IFFT}}$, where $\Lambda$ is a diagonal matrix whose diagonal elements represent the complex channel gains per subcarrier. With this notation, the time domain signal $r_t$ at the receiver input may be expressed as:

$$r_t = F_{N_{IFFT}}^H \Lambda F_{N_{IFFT}} x_t + n' \qquad \text{Equation 8}$$

where n' is the time-domain noise vector. The first stages of the receiver processing of receiver 2300 are a serial to parallel conversion 2301, followed by a FFT processing by an DFT block 2302, and a sub-carrier de-mapping by a sub-carrier de-mapping block 2303, as illustrated in FIG. 23.

The sub-carrier de-mapping operation by the sub-carrier de-mapping block 2303 is the inverse of the sub-carrier mapping performed at the transmitter side, and in matrix form it is simply expressed as $B^T$, so the frequency domain signal at the sub-carrier de-mapping output r is:

$$r = B^T F_{N_{IFFT}} r_t + n \qquad \text{Equation 9}$$

where n is the frequency-domain noise vector. After substituting $r_t$ in the previous equation, r becomes:

$$r = B^T F_{N_{IFFT}} F_{N_{IFFT}}^H \Lambda F_{N_{IFFT}} x_t + n = B^T \Lambda F_{N_{IFFT}} x_t + n =$$

-continued $$B^T \Lambda F_{N_{IFFT}} F^H_{N_{IFFT}} B \left( I_N - \sqrt{\frac{N}{N_{zt}}} P_c F_{N_{zt}} CF_N^H \right) P_d F_M x + n$$

The received signal r at the output of the sub-carrier de-mapping block 2303 may further be expressed as:

$$r = B^T \Lambda B \left( I_N - \sqrt{\frac{N}{N_{zt}}} P_c F_{N_{zt}} CF_N^H \right) P_d F_M x + n = HGx + n \quad \text{Equation 11}$$

where the following notations are used: $H = B^T \Lambda B$, $H \in \mathbb{C}^{N \times N}$ represents the effective channel response matrix over the occupied sub-carriers, and G=

$$\left( I_N - \sqrt{\frac{N}{N_{zt}}} P_c F_{N_{zt}} CF_N^H \right) P_d F_M,$$

$G \in \mathbb{C}^{N \times M}$ is a matrix that depends on the sub-carrier mapping matrices for the data and the cancellation signals ($P_d$ and $P_c$, respectively), as well as on the FFT matrices of the corresponding sizes. It should be noted that for a given (fixed) resource allocation, the G matrix is constant.

To calculate the G matrix, only the resource allocation and the length of the zero tail need to be signaled to the receiver. Based on the signaled resource allocation, the receiver determines the data sub-carrier mapping matrix $P_d$, the FFT matrices $F_M$ and $F_N$. Additionally, once the length of the zero tail Nzt is known, the receiver determines the sub-carrier mapping matrix for the tail cancellation signal, $P_c$, the FFT matrix $F_{N_{zt}}$ and thus it may calculate the G matrix using the equation above.

The receiver 2300 may further include an optimal LMMSE receiver 2304. The optimal LMMSE receiver 2304 is configured to retrieve the transmitted vector x as the LMMSE. Corresponding to the received signal r=HGx+n, the optimal LMMSE receiver 2304 may be expressed as:

$$x_{est} = (G^H H^H H G + \sigma^2 I)^{-1} G^H H^H r \quad \text{Equation 12}$$

In the previous equation, $\sigma^2$ represents the estimated noise variance.

As mentioned previously, the G matrix is only a function of the resource allocation, and does not depend on the channel. Therefore, for a fixed resource allocation, the G matrix is fixed.

Moreover, for slowly varying channels, which may be the case for indoor propagation channels, the channel response may not change significantly, so matrix H may change slowly. As a result, once the LMMSE filter coefficients are calculated, they may be reused for a longer time, which may help lower the receiver complexity.

The receiver 2300 may further include a reduced complexity receiver 2305. The reduced complexity receiver 2305 may be derived for the received signal r=HGx+n as a two-step approach, whereby the first step is a 1-tap equalizer 2306 that equalizes the channel (recall that the H matrix is diagonal), and the filter 2307 for the second step inverts the transmit processing chain that includes the cancellation signal. More specifically, the reduced complexity receiver 2305 consists in the two steps described herein. Step 1: $x_{est\_1} = (H^H H + \sigma^2 I)^{-1} H^H r$ and Step 2: $x_{est} = (G^H G)^{-1} G^H x_{est\_1}$.

The reduced complexity receiver 2305 is lower in complexity than the optimal LMMSE receiver 2304 because the first step of the processing or channel equalization is a simple 1 tap channel equalization, and the 2nd step needs to be performed only when the resource allocation changes, for example, when the G matrix changes.

Both the optimal LMMSE receiver 2304 and the reduced complexity receiver 2305 may be used to simulate the performance of eZT DFT-s-OFDM as disclosed herein.

Performance metrics are shown herein for one or more eZT DFT-s-OFDM embodiments, including for the BER performance, peak to average power ratio (PAPR), out of band (OOB) emissions, as well as a sample performance for the multi-user case.

Figure 24:
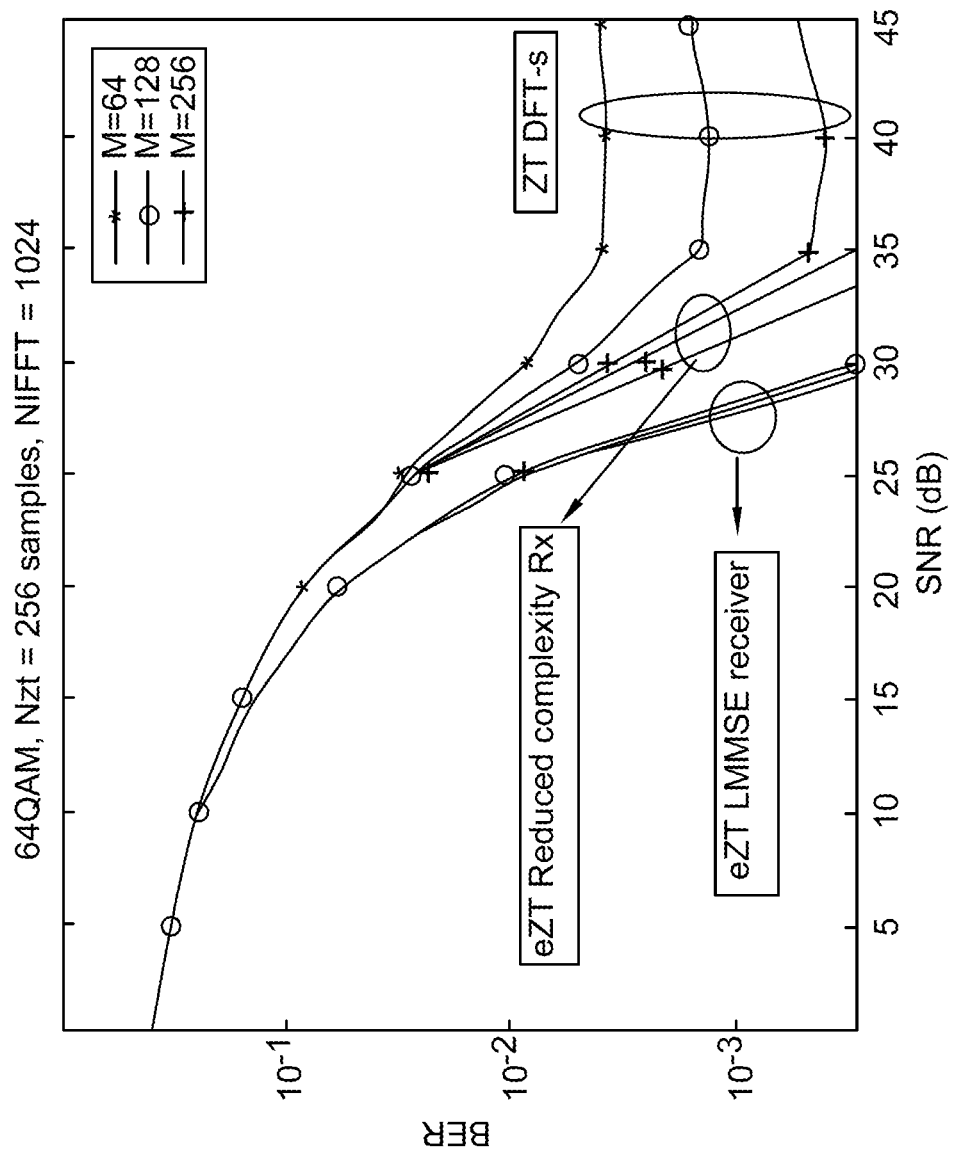
FIG. 24 illustrates bit error rate (BER) performance of eZT DFT-s and ZT DFT-s embodiments in high delay spread channels according to one or more embodiments.

The raw BER performance of eZT DFT-s-OFDM for three different values of M, and with a high delay spread channel and 64-QAM modulation, is shown in FIG. 24. The eZT performance has been evaluated using the optimal LMMSE receiver 2304, as well as the reduced complexity receiver 2305. The performance of ZT DFT-s-OFDM (non-enhanced) is also illustrated for comparison purposes. For all simulation results, the total transmission power is normalized and SNR is defined as symbol energy (Es) to noise (No) ratio (Es/No).

As may be seen in FIG. 24, for high delay spread channels, the ZT DFT-s-OFDM exhibits an error floor, which is due to the fact that the ZT DFT-s-OFDM does not have a perfect zero tail. This tail breaks the cyclic property of the OFDM signal and creates ISI. This limits the performance in high delay spread channels and manifests itself in an error floor that occurs with higher order modulation symbols. By contrast, the eZT DFT-s-OFDM system does not exhibit this error floor, as shown by the optimal LMMSE receiver results and the reduced complexity receiver results. Use of the optimal LMMSE receiver 2304 results in a significant performance improvement over ZT, of 2.5 to 4 dB SNR improvement at BER=10−2, as well as in the elimination of the error floor. The reduced complexity receiver 2305 also eliminates the error floor of the ZT.

Figure 25:
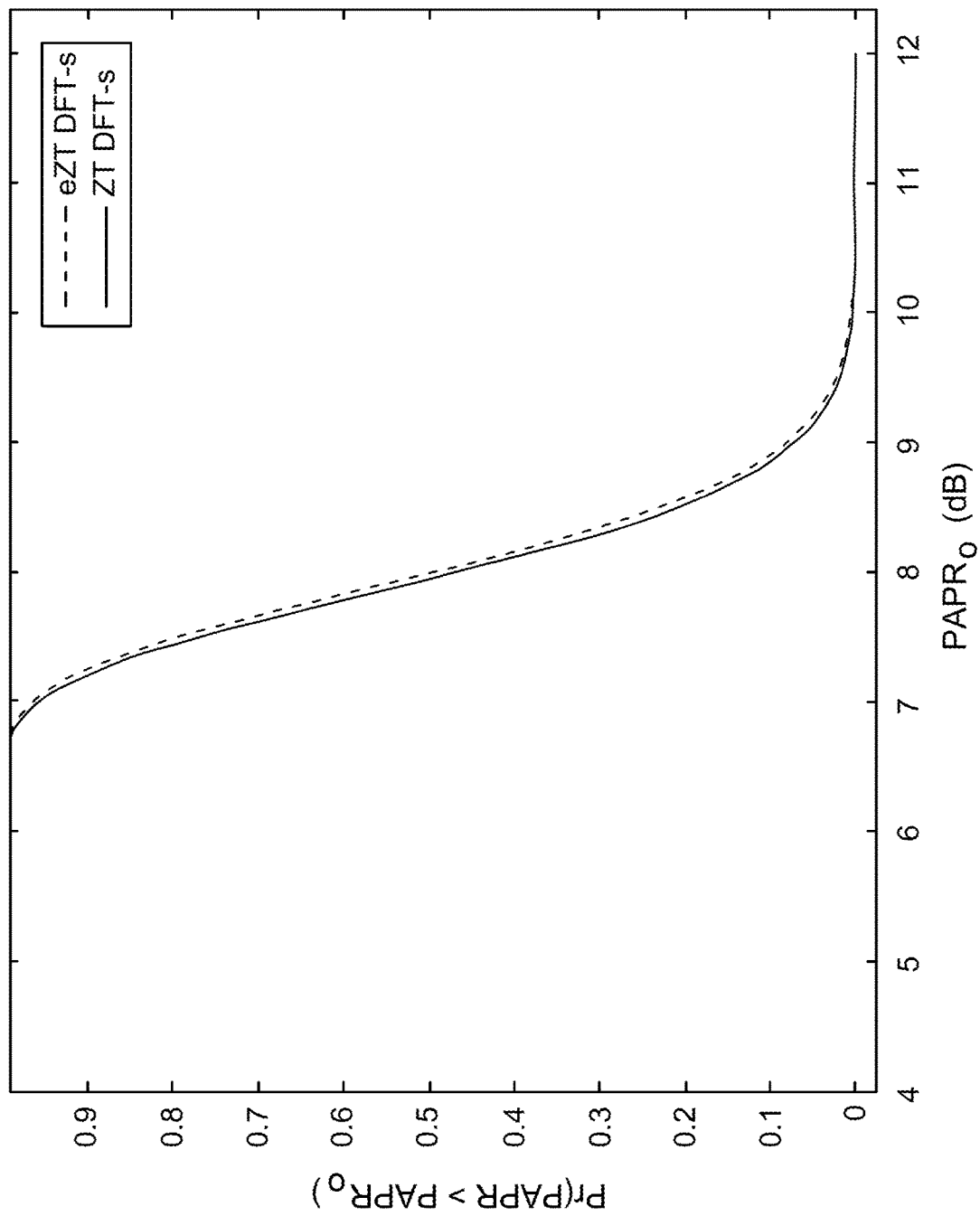
FIG. 25 illustrates peak to average power ratio (PAPR) of eZT DFT-s ODFM compared to ZT DFT-s OFDM according to one or more embodiments.

Since the cancellation signal yc used to generate the zero tail is low power, the cancellation signal yc is not expected to increase the PAPR as compared to the ZT DFT-s-OFDM. The Nzt samples may be seen at the output of the N-size IFFT 1603 in Step 1, FIG. 16. This has been confirmed by simulations, the results of which are captured in FIG. 25, where it may be seen that the PAPR of eZT DFT-s-OFDM is the same as for ZT DFT-s-OFDM.

Figure 26:
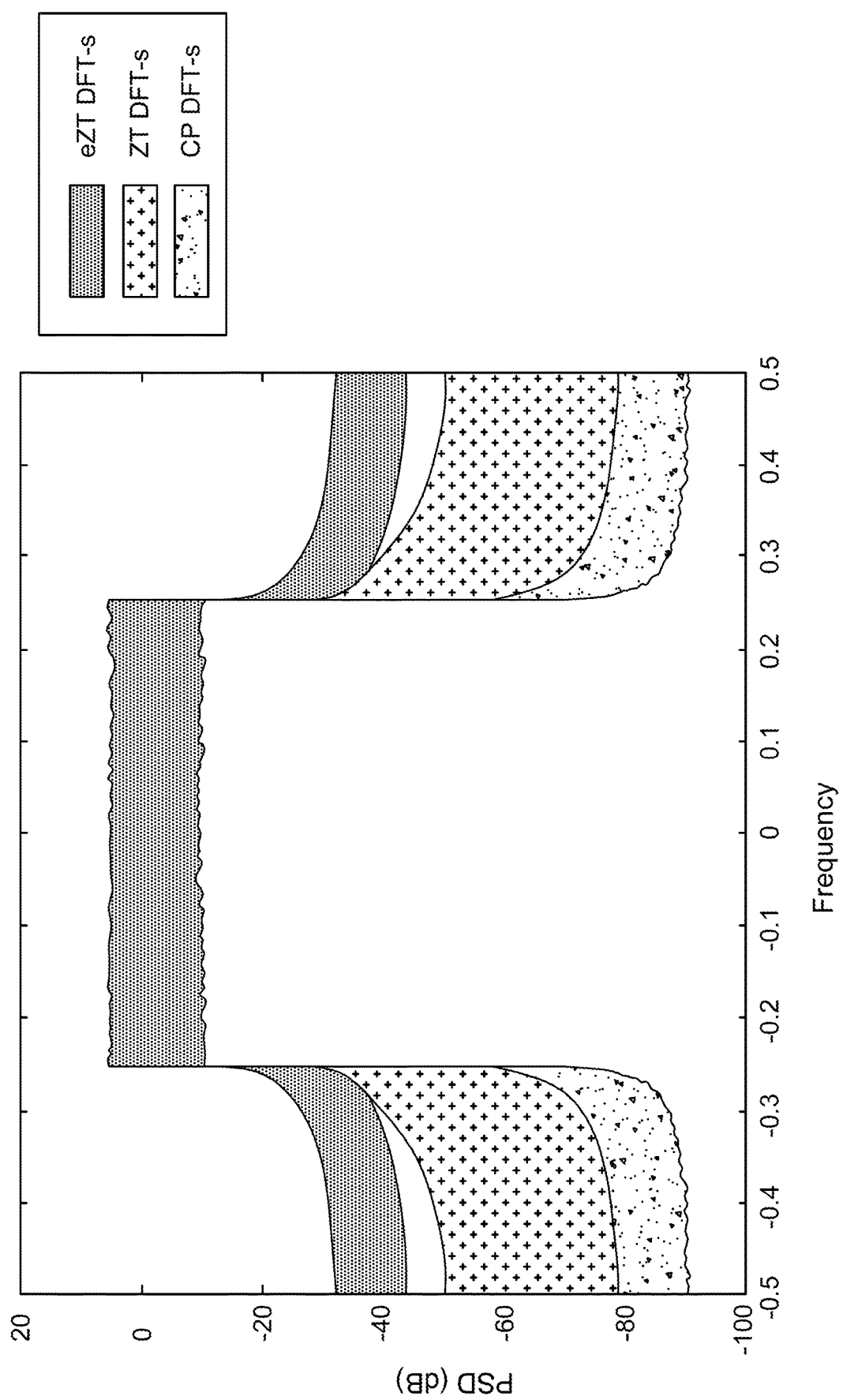
FIG. 26 illustrates out of band (OOB) emissions of eZT DFT-s OFDM compared to cyclic prefix (CP) and ZT DFT-s OFDM according to one or more embodiments.

Additionally, the disclosed eZT method preserves the advantage of the ZT, in that it has a low out-of-band emission. As a result, eZT DFT-s-OFDM may be used as an alternative to filter-based OFDM such as Filtered-OFDM (F-OFDM) or Universal Filtered Multi-Carrier (UFMC), and may be applicable to flexible air-interfaces for sub-6 GHz frequencies. The simulated OOB performance of the disclosed eZT DFT-s-OFDM embodiment is shown in FIG. 26, where it may be seen that the OOB emission is significantly lower compared to the traditional CP DFT-s-OFDM embodiment.

Figure 27:
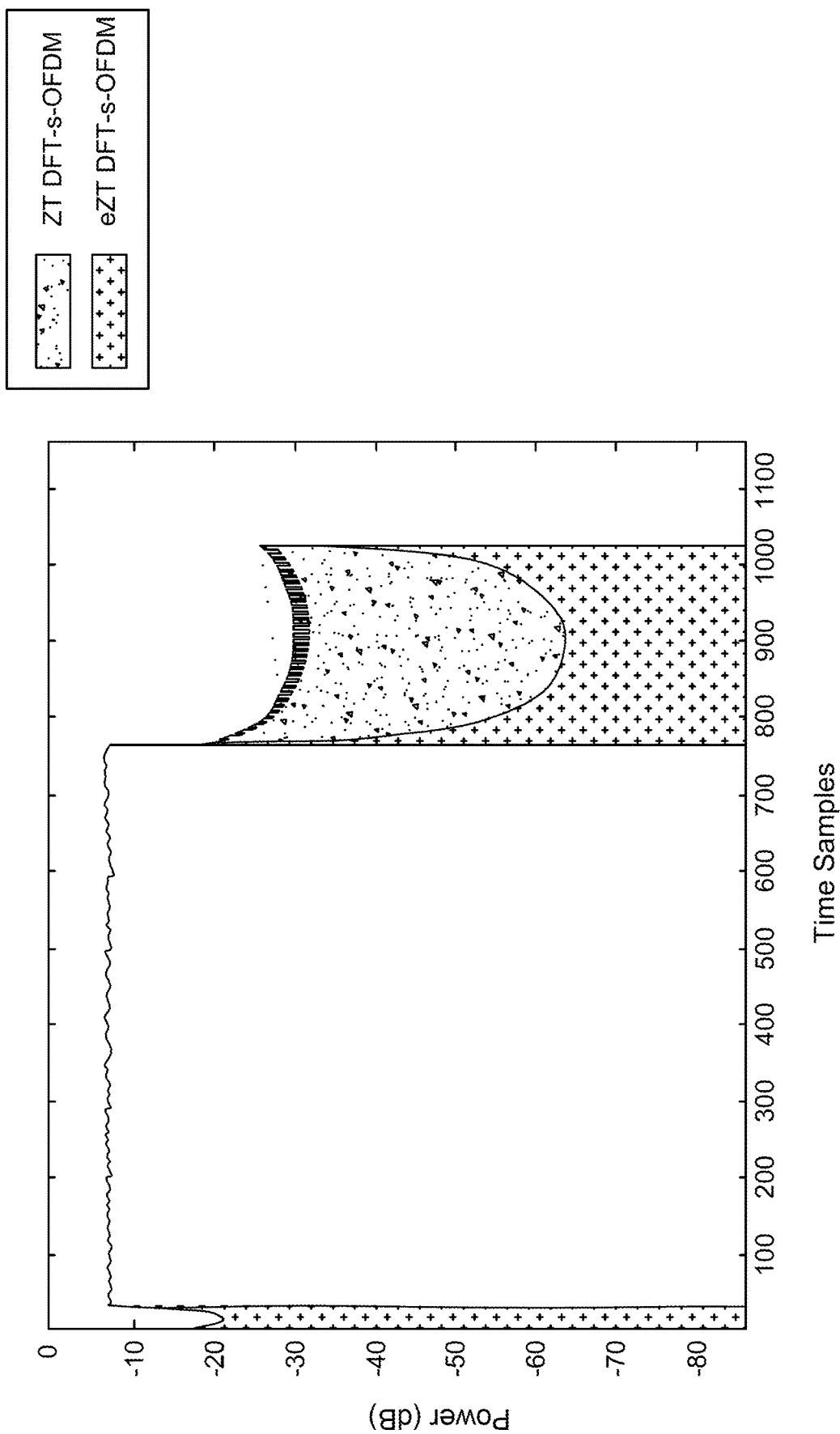
FIG. 27 is time-domain illustration of the tail for eZT DFT-s compared to ZT DFT-s according to one or more embodiments.

The time-domain illustration of the eZT DFT-s-OFDM signal shown in FIG. 27 confirms that the tail of the disclosed eZT embodiment is 20-30 dB lower than the tail of ZT DFT-s-OFDM.

Figure 28:
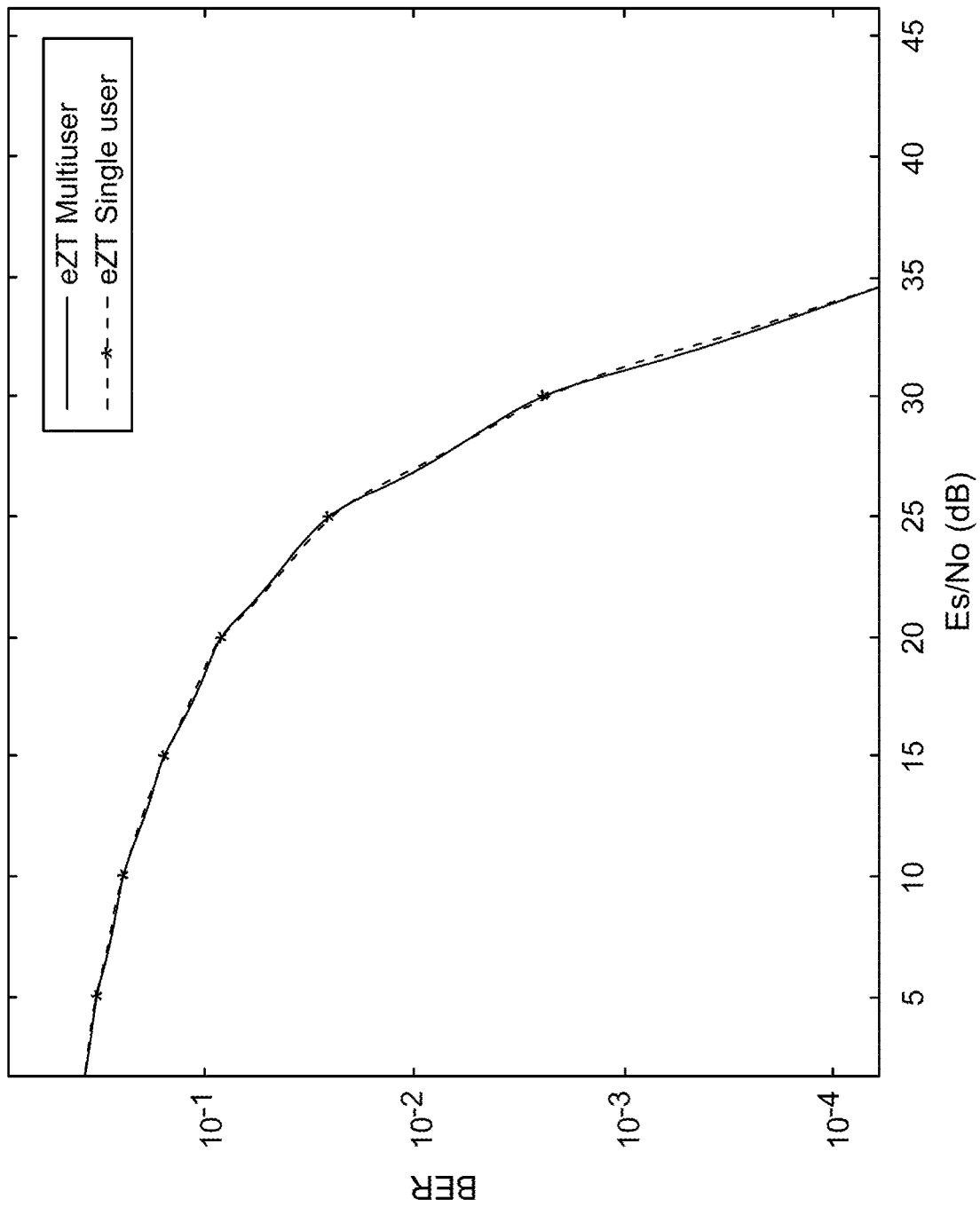
FIG. 28 illustrates multi-user versus single user performance for eZT DFT-s OFDM according to one or more embodiments.

A simulation was run for the multi-user scenario described in FIG. 21. The simulation results, presented in FIG. 28 confirm that the multi-user performance of the disclosed embodiment matches the single user performance.

Figure 29:
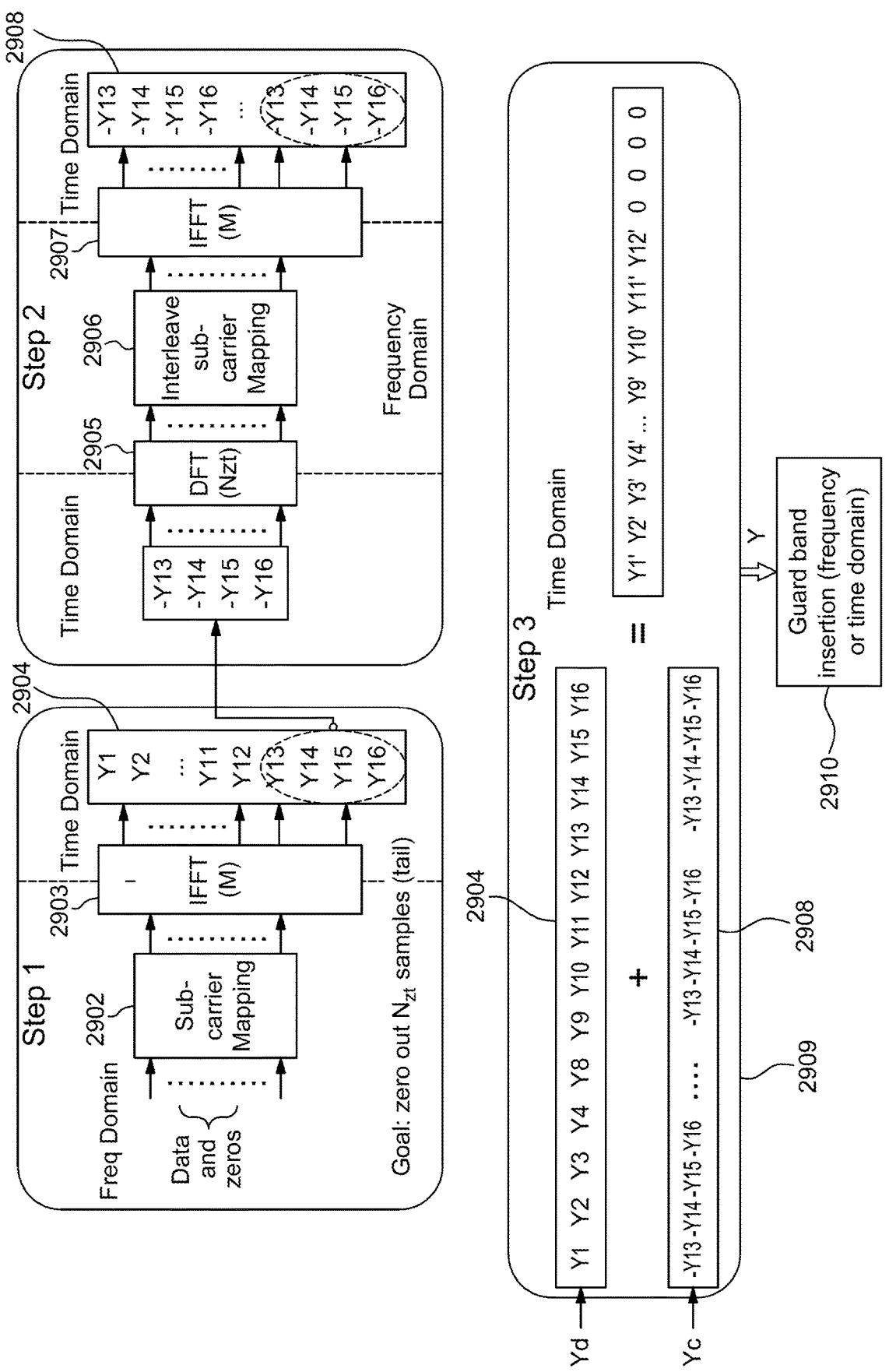
FIG. 29 is a flow diagram which illustrates an iterative approach implemented in a transmitter for exact zero tail generation for OFDM according to one or more embodiments.

FIG. 29 illustrates a step block diagram of another eZT solution for OFDM in which an iterative approach for exact zero tail generation is used. In a low complexity solution, the exact zero tail is generated by adding a cancellation signal to data sub-carriers, whereby the cancellation signal is generated by selecting the Nzt time-domain samples, spreading them with DFT of size Nzt, then mapping the cancellation signal in an interleaved fashion to the in-band subcarriers, as similarly described in reference to FIG. 16. However, in the method presented in FIG. 29, the subcarriers on which the cancellation signal is mapped, do not carry modulated data symbols. That is, the cancellation signal and the modulated data symbols are transmitted on disjoint subcarriers.

FIG. 29 is a step block diagram which illustrates an iterative approach for exact zero tail generation for OFDM. In Step 1, an OFDM signal 2904 is generated by mapping modulated data symbols to M allocated subcarriers in a subband. In particular, zeros are input in the frequency domain to an interleave subcarrier mapping block 2902 and are interleaved to a portion of the subcarriers by the interleave subcarrier mapping block 2902. Data symbols are also input to the interleave subcarrier mapping block 2902 and fill the remaining subcarriers that have not been mapped to by the zeros. Thus, data and zeros are interleaved with each other at the output of the interleave subcarrier mapping block 2902. For example, data symbols and zeros may be mapped accordingly: 0, d1, d2, d3, 0, d4, d5, . . . , etc. Thus, a subset of the subcarriers that may be uniformly interleaved over the subband is left empty, for example, wherein data is not mapped to those subcarriers by the mapping block 2902. Instead, as shown in Step 1 of FIG. 29, zeros are mapped to the input of the IFFT block 2903 where these empty subcarriers are located.

In Step 2 of the processing, Nzt time domain samples at the output of the IFFT block 2903, shown by example as Y13, Y14, Y15 and Y16 in Step 1 of FIG. 29, are sign inverted by an inverter, normalized by a normalization factor, and fed to the input of a size Nzt DFT operation performed by DFT block 2905. The outputs of the size Nzt DFT block 2905 are mapped in an interleaved fashion to the size M IFFT block 2907 by interleave subcarrier mapping block 2906, whereby zeros are inserted on $$\frac{M}{N_{zt}} - 1$$

consecutive sub-carriers between each output of the Nzt size DFT block 2905. As a result of this interleaved sub-carrier mapping, the IFFT output 2908 is a replica of the signal at the input of the DFT block 2905, repeated $$\frac{M}{N_{zt}}$$

times. Using the example shown in Step 2 of FIG. 29, the IFFT output 2908 consists of the vector [−Y13, −Y14, −Y15, −Y16], repeated $$\frac{M}{N_{zt}}$$

times.

In Step 3 of the processing, the outputs 2904 and 2908 of the IFFT blocks 2903 and 2907 in Steps 1 and 2 are summed together by a summing block 2909, thus resulting in an exact zero tail of length Nzt samples, at the output of summing block 2909. It will be appreciated that the Nzt time domain samples Y13, Y14, Y15 and Y16 may not be inverted, but instead, the low power cancellation signal (output of Step 2) may be subtracted from the data signal (output of Step 1) in Step 3.

The signal y generated at the output of Step 3 is further processed by a guard insertion block 2910 before being transmitted on the channel. The guard insertion may be performed either in the frequency domain, or in the time domain as previously described in reference to FIGS. 16-18.

Figure 30:
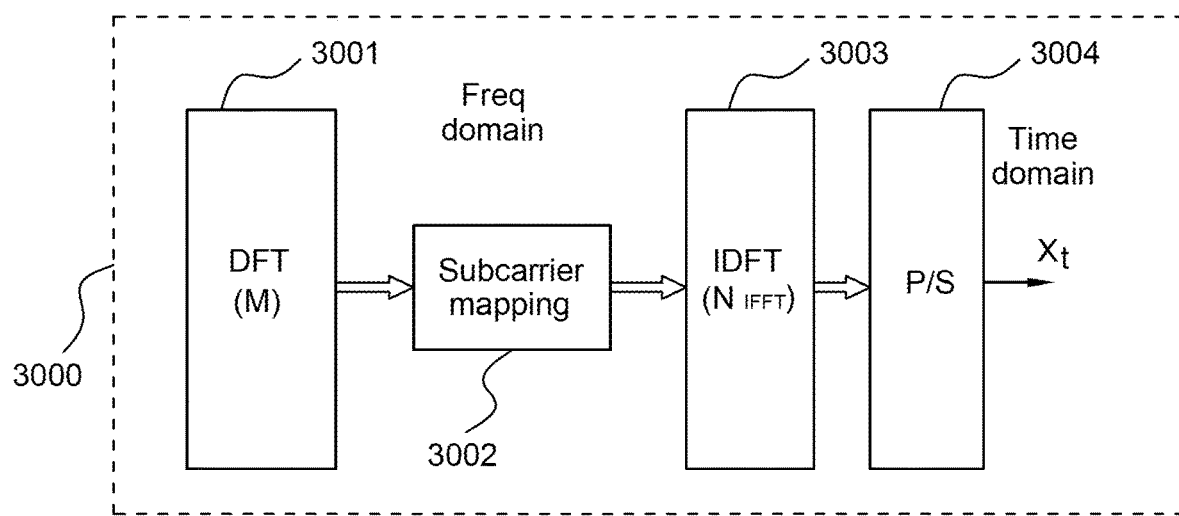
FIG. 30 illustrates a block diagram of a guard band insertion block implemented in a frequency domain according to one or more embodiments.
Figure 31:
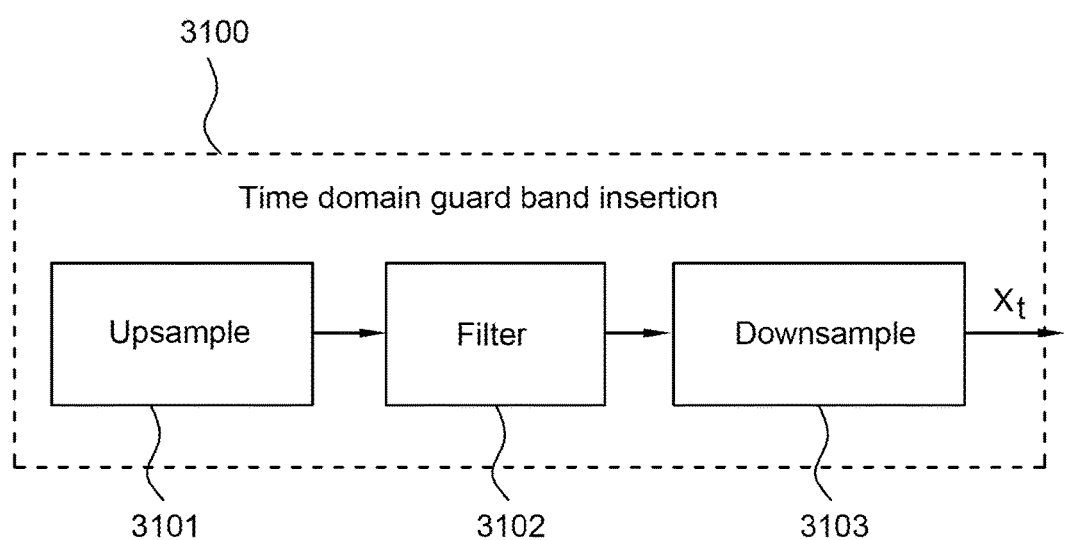
FIG. 31 illustrates a block diagram of a guard band insertion block implemented in a time domain according to one or more embodiments.

An example of guard band insertion performed in the frequency domain is shown in FIG. 30, similar to FIG. 17. An example of guard band insertion performed in the time domain is shown in FIG. 31, similar to FIG. 18.

The following notations are described as used herein. $F_M \in \mathbb{C}^{M \times M}$: M size FFT matrix (normalized). Thus $F_M^H$ denotes the M size IFFT matrix. $I_M \in \mathbb{R}^{M \times M}$ is the identity matrix. $O_{N_1 \times N_2} \in \mathbb{R}^{N_1 \times N_2}$ is a N1×N2 zero matrix. $P_d \in \mathbb{R}^{(M) \times (M-Nzt)}$ is a sub-carrier mapping matrix, used for the data part of the signal in Step 1 of FIG. 29. $P_c \in \mathbb{R}^{M \times Nzt}$ is a sub-carrier mapping matrix, used for the cancellation part of the signal in Step 2 of FIG. 29. Nzt is the desired length of the zero tail (in samples). $N_{IFFT}$ is the IFFT size performed over the system bandwidth. $B \in \mathbb{R}^{N_{IFFT} \times M}$ is the matrix used for guard band insertion.

At the output of the M-size IFFT 2903 of FIG. 29, the last Nzt samples may be used to generate the tail cancellation signal yc, as follows. Let $y_d = [y_0 \ y_1 \ \cdots \ y_{M-1}]^T$, $y_d \in \mathbb{C}^{M \times 1}$ be the vector at the M-size IFFT output of IFFT 2903, and $y_{temp\_c} \in \mathbb{C}^{Nzt \times 1}$ the vector of the last Nzt samples of $y_d$, $y_{temp\_c} = [y_{M-N_{zt}} \ y_{M-1}]^T$. The last Nzt samples used in the cancellation process ($y_{temp\_c}$) may be expressed in terms of the vector $y_d$ at the output of the IFFT 2903 as:

$$y_{temp\_c} = Cy_d \qquad \text{Equation 13}$$

where $C \in \mathbb{R}^{Nzt \times M}$ is a matrix that may be used to select the last Nzt samples of $y_d$. The C matrix may be expressed as:

$$C = [O_{N_{zt} \times (M-N_{zt})} \ I_{N_{zt}}] \qquad \text{Equation 14}$$

The signal $y_d$ at the output of the M-size IFFT 2903 of Step 1 may be written as:

$$y_d = F_M^H P_d x \qquad \text{Equation 15}$$

Similarly, when applying the sign-inverted $-y_{temp\_c}$ samples to the input of the Nzt size DFT 2905, followed by the sub-carrier mapping operation $P_c$ by mapping block 2906 and the M-size IFFT 2907, the cancellation signal (scaled by a factor of $$\sqrt{\frac{M}{N_{zt}}}$$

at the output of Step 2 may be written as:

$$y_c = -\sqrt{\frac{M}{N_{zt}}} F_M^H P_c F_{N_{zt}} y_{temp\_c} = \qquad \text{Equation 16}$$

-continued $$-\sqrt{\frac{M}{N_{zt}}} F_M^H P_c F_{N_{zt}} C y_d = -\sqrt{\frac{M}{N_{zt}}} F_M^H P_c F_{N_{zt}} C F_M^H P_d x$$

Next, the data signal $y_d$ and the cancellation signal $y_c$ are summed together by summing block 2909, resulting in the time-domain signal $y=y_d+y_c$ with the last Nzt samples equal zero. By substituting $y_d$ and $y_c$ in the previous equation, the time-domain signal y may be rewritten as:

$$y = F_M^H \left( I_M - \sqrt{\frac{M}{N_{zt}}} P_c F_{N_{zt}} C F_M^H \right) P_d x \quad \text{Equation 17}$$

As previously indicated, once the tail cancellation is performed in the time domain, the guard bands may be inserted by guard band insertion block 2910 before the signal may be transmitted.

In an example of frequency domain guard band insertion by a guard band insertion block 3000 as shown in FIG. 30, the signal y at the output of Step 3 may be passed through an M-size DFT 3001, followed by guard band insertion, which may be modeled for analysis purposes as a multiplication by matrix B by a subcarrier mapping block 3002, and an IFFT operation over the entire system bandwidth by size N IFFT block 3003, followed by a parallel to serial conversion by parallel to serial converter block 3004. The time domain signal $x_t$ at the transmitter output may be expressed as:

$$x_t = F_{N_{IFFT}}^H B F_M y \quad \text{Equation 18}$$

By substituting y in the previous equation, the transmitted signal becomes:

$$x_t = F_{N_{IFFT}}^H B \left( I_M - \sqrt{\frac{M}{N_{zt}}} P_c F_{N_{zt}} C F_M^H \right) P_d x \quad \text{Equation 19}$$

This expression for the time domain transmitted signal will be used as disclosed to derive the receiver structure for the eZT OFDM signal.

In an example of the time domain guard band insertion, a guard band insertion block 3100 is shown in FIG. 31. The signal y at the output of step 3 may be passed through and upsampler 3101, a filter 3102, and a downsampler 3103, and the transmitted signal $x_t$ is output.

In one or more embodiments, a low complexity method to generate exact zero tail in time domain is provided in order to achieve time-domain tail cancellation prior to guard band insertion. Time-domain tail cancellation is achieved by subtracting a cancellation signal yc from the data signal yd, whereby the input reserved zeros are mapped in an interleaved fashion to sub-carriers within the user's resource allocation, and data symbols are mapped to the remaining subcarriers to generate the time-domain data signal, and the time domain cancellation signal is generated by repeating the last Nzt samples of the data signal. During the interleaving of zeros onto the subcarriers, the interleaving may be performed uniformly or non-uniformly.

Figure 32:
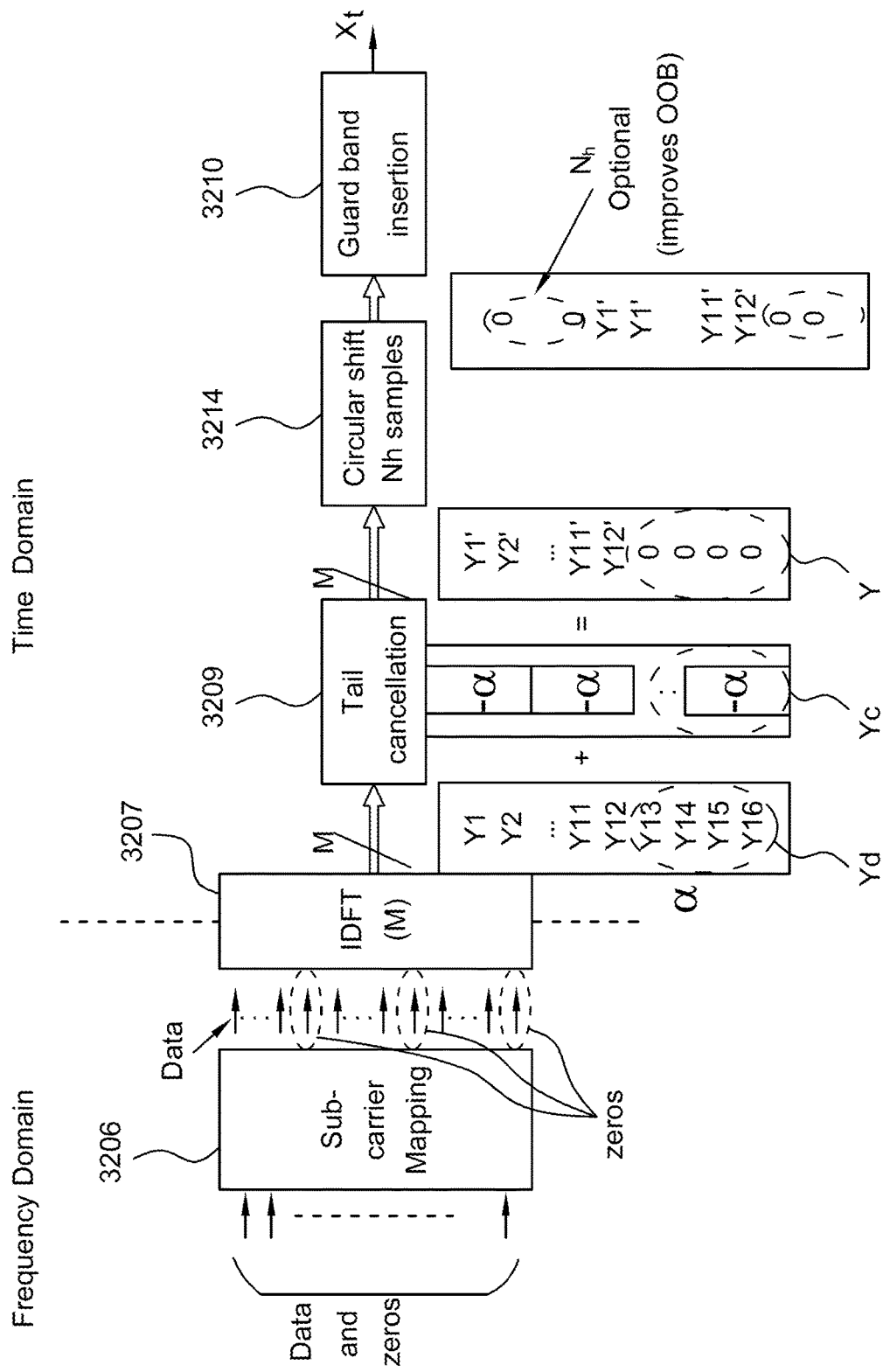
FIG. 32 is a block diagram of a transmitter utilizing a time-domain tail cancellation for OFDM according to one or more embodiments.

FIG. 32 is a block diagram of a transmitter configured to perform time-domain tail cancellation prior to guard band insertion (OFDM) according to one or more embodiments, as similarly described in conjunction with FIG. 29. The transmitter illustrated in FIG. 32 includes an interleave subcarrier mapping block 3206, which receives modulated data symbols and zeros in the frequency domain. The zeros are first mapped to the subcarriers in an interleaved manner, and the data symbols are mapped to the remaining subcarriers. Thus, a subset of the subcarriers that are uniformly interleaved over the subband is left empty, for example, wherein data is not mapped to those subcarriers by the mapping block 3206. Instead, zeros are mapped to the input of the IFFT block 3207 where these empty subcarriers are located and the data symbols fill in the remaining subcarriers that have not been mapped to by the zeros. Thus, data and zeros are interleaved with each other at the output of the interleave subcarrier mapping block 3206. For example, if eight subcarriers and two zeros are present, the input to the IDFT 3203 may be [0 d1 d2 d3 0 d4 d5 d6].

The transmitter illustrated in FIG. 32 further includes an M size IFFT block 3207, as similarly described in step 1 of FIG. 16, a tail cancelation block 3209, as similarly described in step 3 of FIG. 16, and a guard band insertion block 3210, as similarly described at the final output of FIG. 16. Further, the cancelation signal comprised of the vector [−α −α . . . −α], is generated by repeating the tail part (alpha vector) of the output signal of IFFT block 3207 N/Nzt times. The tail cancelation block 3209 generates the cancellation signal [−α −α . . . −α] and adds it to the output of the IFFT block (3207). In addition, a circular shift block 3214 (optional) may be provided to receive the signal from the tail cancellation block 3209 to apply a circular shift to this signal so that the $N_h$ zeros from the tail appear at the head. That is, at least one zero from the tail portion is shifted to the head portion of the OFDM signal to provide continuity between consecutive data symbols. Here, like numerals correspond to like elements and the functionality of each block is not repeated for conciseness.

Data modulation symbols are mapped to the M-IFFT block 3207, where a subset of the subcarriers that are uniformly interleaved over the subband are fed with zeros by the subcarrier mapping block 3206. Let $y_d=[y_0 \, y_1 \ldots y_{M-1}]^T$, $y_d \in \mathbb{C}^{M \times 1}$ be the vector at the M-size IFFT output, and $y_{temp\_c} \in \mathbb{C}^{N_{zt} \times 1}$ the vector of the last Nzt samples of $y_d$, $y_{temp\_c}=[y_{M-N_{zt}} \ldots y_{M-1}]^T=\alpha$. The tail cancellation signal $y_c$ is formed by negating α and repeating it $$\frac{M}{N_{zt}}$$

times, for example, $y_c=[-\alpha \, -\alpha \ldots -\alpha]^T$. The zero-tail signal is computed by adding the cancellation signal to the IFFT output as $y=y_d+y_c$. The signal y has a perfectly zero-tail, for example, $y=[y'_0 \, y'_1 \ldots y'_{M-N_{zt}-1} 0 \ldots 0]^T$ To reduce out-of-band emission of the OFDM signal, zeros may also be inserted to the head of y to generate $y'=[0 \ldots 0 y'_0 \, y'_1 \ldots y'_{M-N_{zt}} 0 \ldots 0]^T$. One method of adding zeros to the head of the signal y is to insert $N_h$ zeros to generate $y'=[0_1 \, 0_2 \ldots 0_{N_h} \, y^T]^T \in \mathbb{C}^{M+N_h}$. This method will increase the size of y' from M to M+$N_h$. Another method is to create y with a zero-tail of size $N_{zt}+N_h$, and then apply a circular shift by the circular shifter 3214 to this signal so that the $N_h$ zeros from the tail appear at the head. This method will not change the size of y'.

The next step is guard band insertion which may be performed in frequency or time domain guard band insertion block 3210, and as similarly described in reference to FIGS. 17 and 18. It should be noted that, in general, the tail does not have to be completely cancelled. It is possible to partially cancel the tail by introducing a parameter that controls the power spent on the cancellation signal.

As described herein, a method to generate a unique word (UW) OFDM signal by adding a UW in the time domain to the exact zero-tail generated with eZT OFDM, prior to guard band insertion, is provided according to one or more embodiments.

Figure 33:
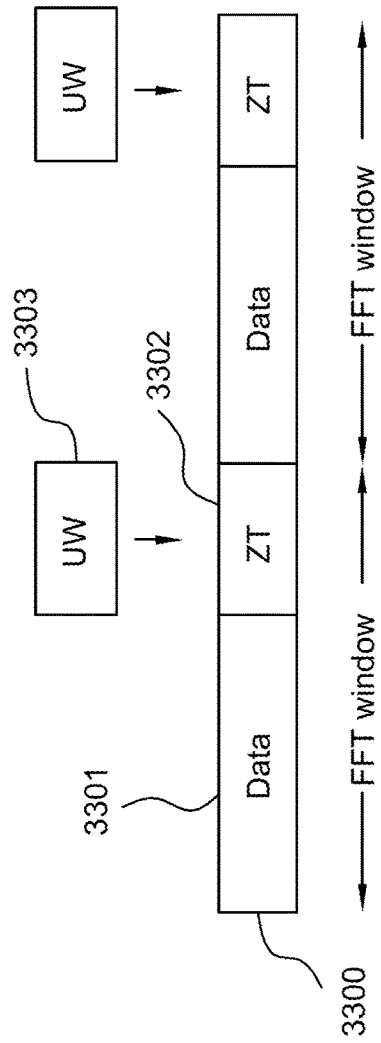
FIG. 33 illustrates data signal with UW insertion according to one or more embodiments.

FIG. 33 illustrates a zero-tail signal to be transmitted by a transmitter by introducing time domain samples with zero power or very low power in specific positions of a time symbol tail. FIG. 33 further illustrates an insertion of the unique word according to one or more embodiments. The zero-tail signal 3300 includes data blocks 3301 with each data block 3301 having a zero-tail portion 3302 at the tail end of the corresponding data block 3301 and between two consecutive data blocks 3301, as shown. In addition, eZT OFDM supports insertion of a deterministic sequence, which may also be referred to as a unique word 3303, on top of the zero-tail 3302. In one example, the unique word is 3303 added to each zero-tail portion 3302 of the time domain signal, as shown in FIG. 33.

In general, the lengths of the zero tail 3302 and the unique word 3303 do not have to be equal, for example, the length of the UW should be smaller than or equal to the length of the zero tail. For example, a 16-sample UW may be added within a 64-sample zero tail. The length of the zero tail may be set as a function of the channel delay spread to mitigate the ISI while minimizing the overhead, while the length of the UW may be set according to synchronization requirements.

Figure 34:
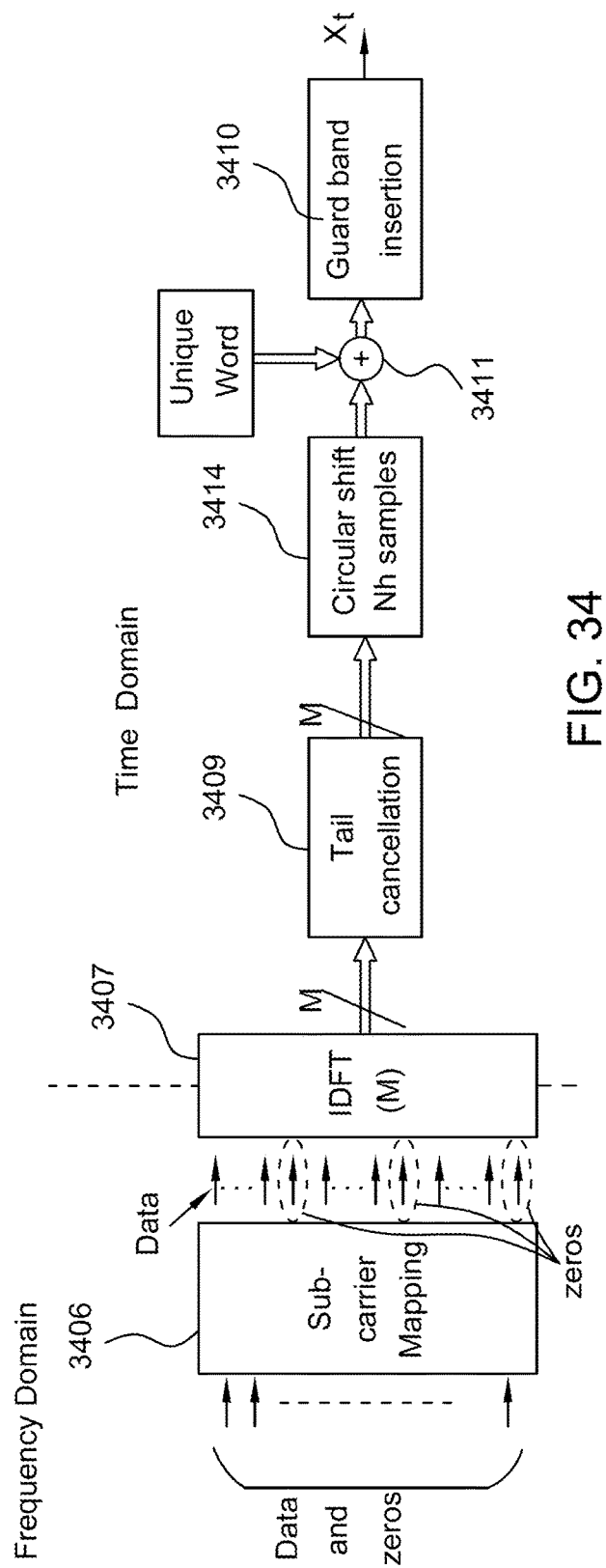
FIG. 34 is a block diagram of a transmitter utilizing UW support for eZT OFDM according to one or more embodiments.

FIG. 34 illustrates a block diagram of a transmitter which adds UW in the time domain to the exact zero-tail generated with eZT OFDM, prior to guard band insertion, according to one or more embodiments. The transmitter shown in FIG. 34 is similar to the transmitter shown in FIG. 32, except a unique word is added by adder 3411 to the time-domain signal y, and the guard band is inserted by guard band insertion block 1700 or 1800 to generate transmitted signal $x_t$. Blocks 3406, 3407, 3409, 3414 and 3410 are similar to blocks 3206, 3207, 3209, 3214 and 3210 described in reference to FIG. 32, respectively. Thus, like numerals correspond to like elements and the functionality of each block is not repeated for conciseness.

In another embodiment, the unique word may be added to the composite signal after the guard band insertion.

Figure 35:
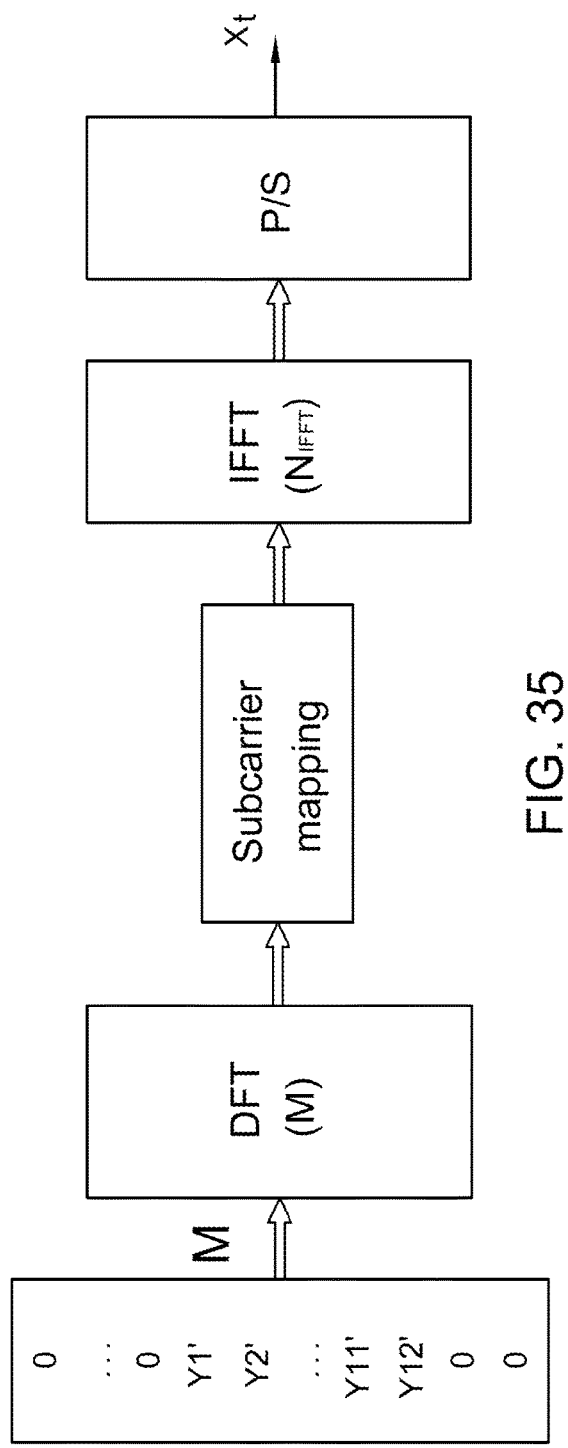
FIG. 35 is a block diagram of a guard band insertion block for eZT OFDM according to one or more embodiments.
Figure 36:
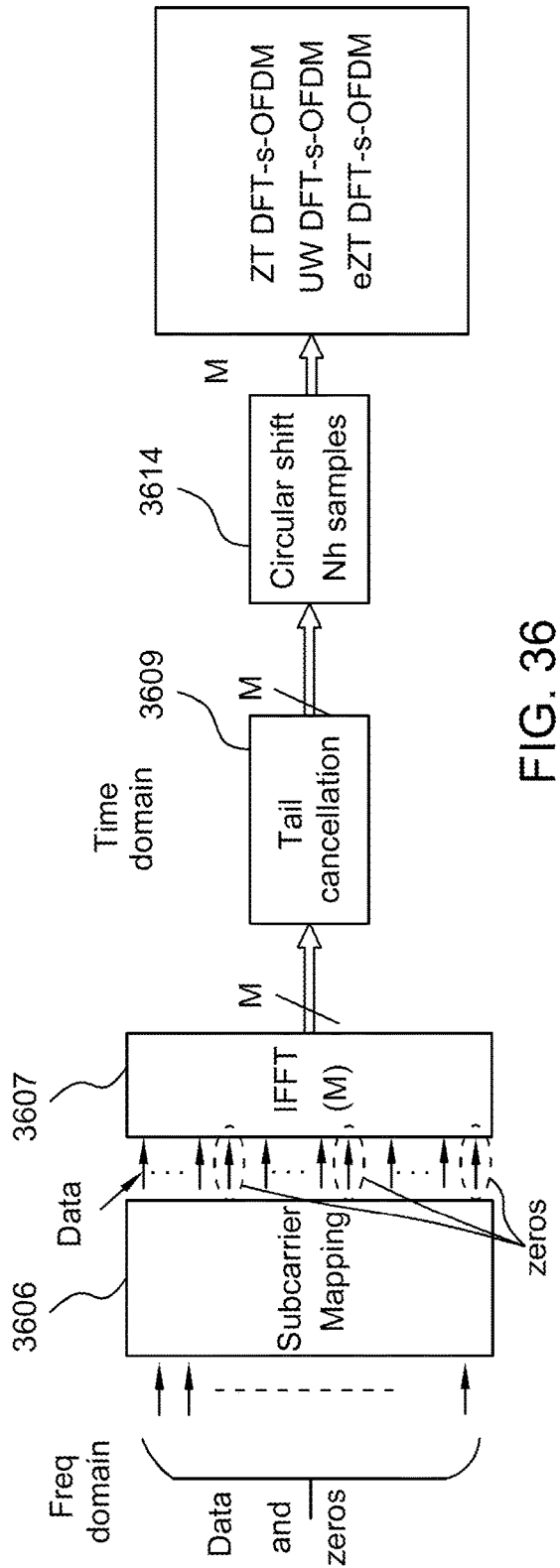
FIG. 36 illustrates a block diagram of a transmitter tail cancellation and UW insertion for OFDM according to one or more embodiments.
Figure 37:
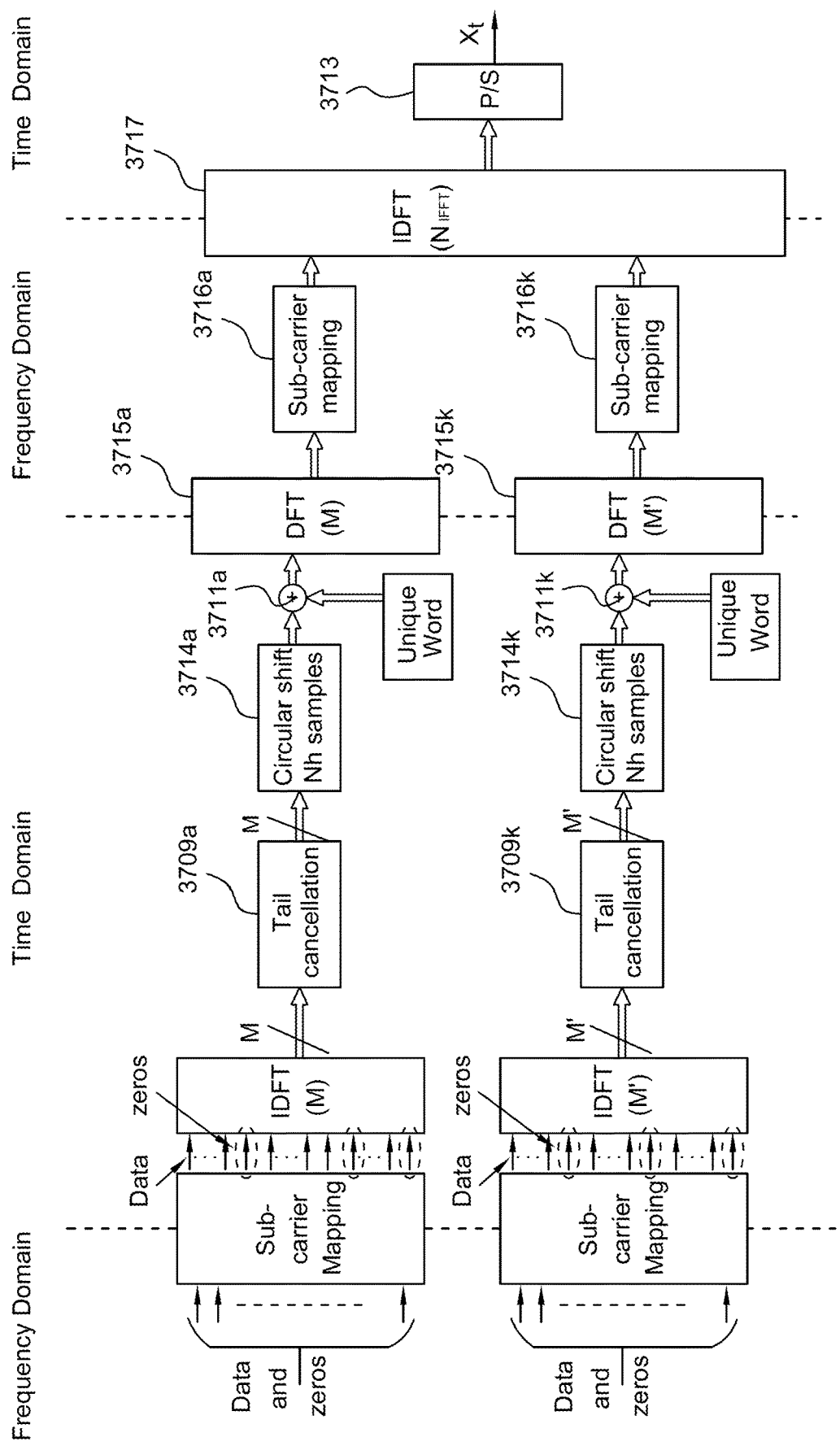
FIG. 37 illustrates a block diagram of a transmitter for multi-user eZT OFDM according to one or more embodiments.

Alternative approaches for tail cancellation are provided herein. In an example, extending ZT DFT-s-OFDM to support OFDM, for either zero tail or unique word applications is provided. For example, FIG. 35 illustrates a block diagram of a frequency domain guard band insertion block of eZT OFDM, where a zero tail and zero head OFDM signal has already been generated by using approaches disclosed in one or more above embodiments. It may be seen that the block diagram of FIG. 35 is provided with the ZT DFT-s-OFDM architecture. This shows that eZT OFDM may be viewed as extending the framework of ZT DFT-s to OFDM. As shown in FIG. 36, eZT OFDM provides an efficient method to concatenate OFDM with various DFT-s-OFDM waveforms. The transmission techniques of these DFT-s-OFDM waveforms may be applied to the eZT OFDM signal after tail cancellation by the tail cancelation block 3609 and zero-head insertion by the circular shifter 3614. Other blocks shown in FIG. 36 (e.g., interleave subcarrier mapping block 3606 and IFFT block 3607) are similar to those previously described, the functionality of which is not repeated for conciseness.

eZT OFDM may support generating per-user signals with zero-tail and/or unique word. One or more embodiments provide a method for generating a user specific exact zero-tail and or user specific UW for an OFDM multi-user transmission. In particular, FIG. 37 illustrates a block diagram of a transmitter (e.g., a base station transmitter) that supports multi-user transmissions, where k is the number of users, according to one or more embodiments. The transmitter uses the enhanced zero-tail mechanism to generate user specific exact zero-tail for DL OFDM multi-user transmission. Here, first the tail cancellation is performed by tail cancellation blocks 3709a . . . 3709k for each user, then circular shifting is performed by circular shifters 3714a . . . 3714k so that the $N_h$ zeros from the tail portion appear at the head portion for each user, then a user specific UW is added in time domain per user by adders 3711a . . . 3711k, and then multiple user signals are mapped to the corresponding sub-carriers of the full system bandwidth (BW) by using DFT blocks 3715a . . . 3715k subcarrier mapping blocks 3716a . . . 3716k, and an $N_{IFFT}$ size IDFT block 3717, before the composite time-domain signal y is converted into serial data symbols by a parallel to serial converter 3713.

FIG. 37 illustrates the MU eZT OFDM with frequency domain guard band insertion, where the guard band insertion is performed by using DFT blocks 3715a . . . 3715k subcarrier mapping blocks 3716a . . . 3716k, and an $N_{IFFT}$ size IDFT block 3717, as similarly described in reference to FIG. 30. For example, after the zero-tail and head is generated per subband, the signal is converted to the frequency domain by a DFT 3715a . . . 3715k of size M where M is the total number of subcarriers in the subband. Then, the output of the DFT blocks 3715a . . . 3715k are mapped to the corresponding subcarriers of the IFFT block 3717 of size $N_{IFFT}$ by subcarrier mapping blocks 3716a . . . 3716k, where $N_{IFFT}$ is the total number of subcarriers in the system, including the zero guard subcarriers. Different subbands may have different sizes as shown in FIG. 37 where M and M' represent a different number of subcarriers in the corresponding subband. When using time domain guard band insertion, the signal per each subband is generated separately, and the oversampled signals belonging to all subbands are added. It is noted that, in the uplink, the oversampled signals are added in the air.

Figure 38:
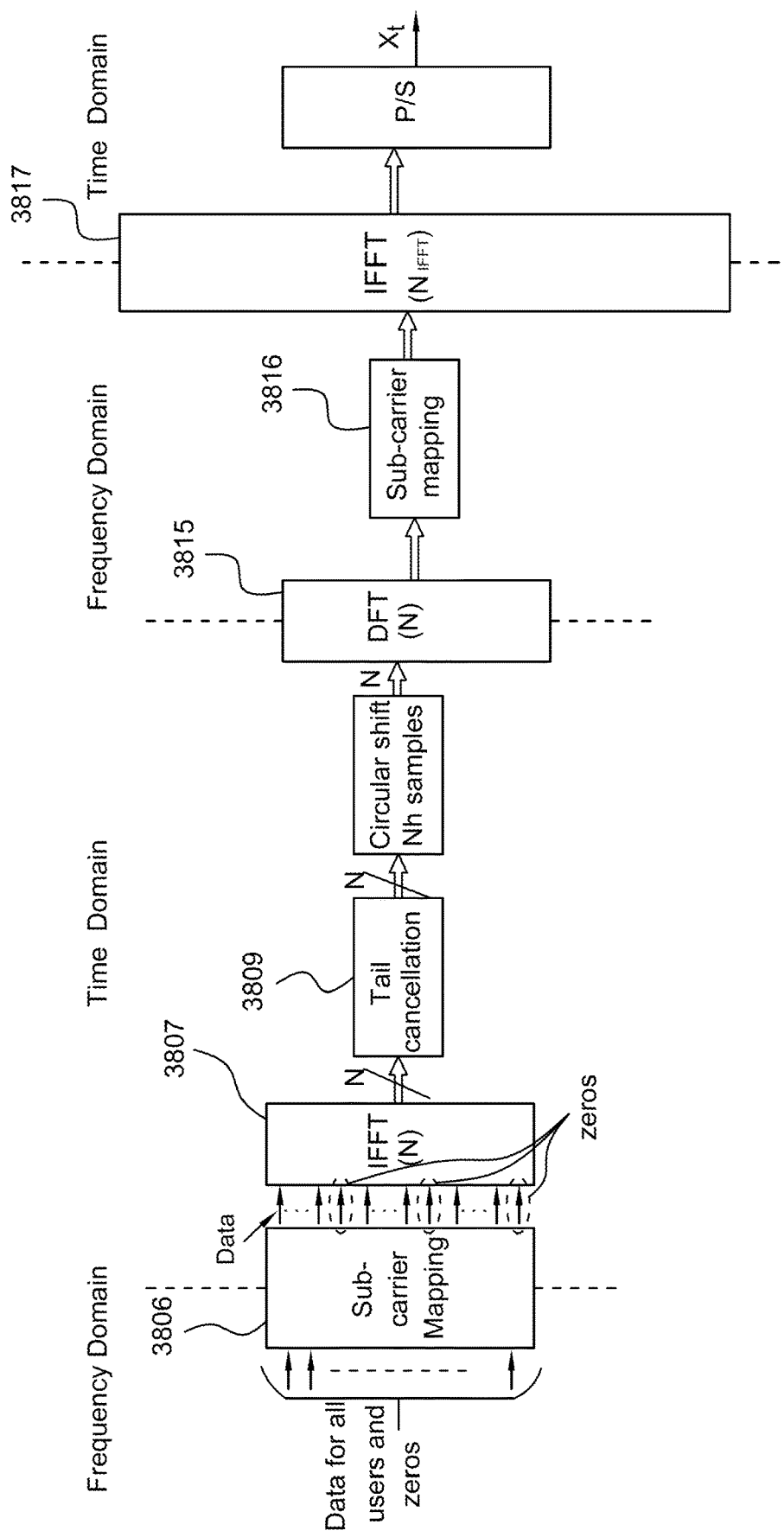
FIG. 38 illustrates a block diagram a transmitter for multi-user eZT OFDM according to one or more embodiments.

An alternative implementation of multi-user eZT OFDM is illustrated in FIG. 38. In this implementation, the data for all users are mapped to the subcarriers via interleave subcarrier mapping block 3806 and N size IFFT 3807, a tail cancellation is applied to the composite signal via tail cancellation block 3809, and then circular shifting is performed by circular shifter 3814 so that the $N_h$ zeros from the tail appear at the head. Then, guard bands are inserted to this signal by N size DFT 3815, subcarrier mapping block 3816 and $N_{IFFT}$ size IFFT 3817, as similarly described in FIGS. 30 and 37.

A receiver structure is further described in reference to FIG. 23. After passing through a multipath fading channel, the received signal may be written as:

$$y = F_{NIFFT}{}^H \Lambda F_{NIFFT} x_t + n \qquad \text{Equation 20}$$

where $\Lambda$ is a diagonal matrix of $F_{NIFFT} h \sqrt{NIFFT}$. It should be noted that since the tail is not exactly zero, expressing the channel as a circulant matrix is an approximation.

At the receiver 2300, after passing the received signal through the FFT block 2302 and sub-carrier de-mapping block 2303, the signal becomes:

$$r = B^T F_{NIFFT} y =$$ Equation 21

$$B^T \Lambda B \left( I_M - \sqrt{\frac{M}{N_{zt}}} P_c F_{N_{zt}} C F_M^H \right) P_d x + B^{-1} F_{NIFFT} n =$$

$$H(G)x + n'$$

where:

$$H = B^T \Lambda B$$ Equation 22

$$G = \left( I_M - \sqrt{\frac{M}{N_{zt}}} P_c F_{N_{zt}} C F_M^H \right) P_d$$

To calculate the G matrix, only the resource allocation and the length of the zero tail need to be signaled to the receiver. Based on the signaled resource allocation, the receiver 2300 determines the data sub-carrier mapping matrix $P_d$ and the FFT matrix $F_M$. Additionally, once the length of the zero tail Nzt is known, the receiver determines the sub-carrier mapping matrix for the tail cancellation signal P, and the FFT matrix $F_{N_{zt}}$, and thus it may calculate the G matrix using equation 22 above.

The optimal LMMSE receiver 2304 may be used to compute the data estimate as:

$$x_{est} = G^H (GG^H + \sigma^2 (H^H H)^{-1})^{-1} H^{-1} r$$ Equation 23

For a channel that does not change very fast, such as an indoor channel, the LMMSE filter coefficients may be computed and used for a relatively long time, reducing the complexity of the receiver.

One method to reduce the complexity of the receiver is to decouple filtering with G from equalization. In this method, as a first step, one-tap equalization by 1-tap equalizer 2306 is used to compute $x_{est1} = (H^H H + \sigma^2 I)^{-1} H^H r$. Then, in the second step, the data estimate may be derived by filter 2307 as: $x_{est} = (G^H G)^{-1} G^H x_{est1}$.

Figure 39:
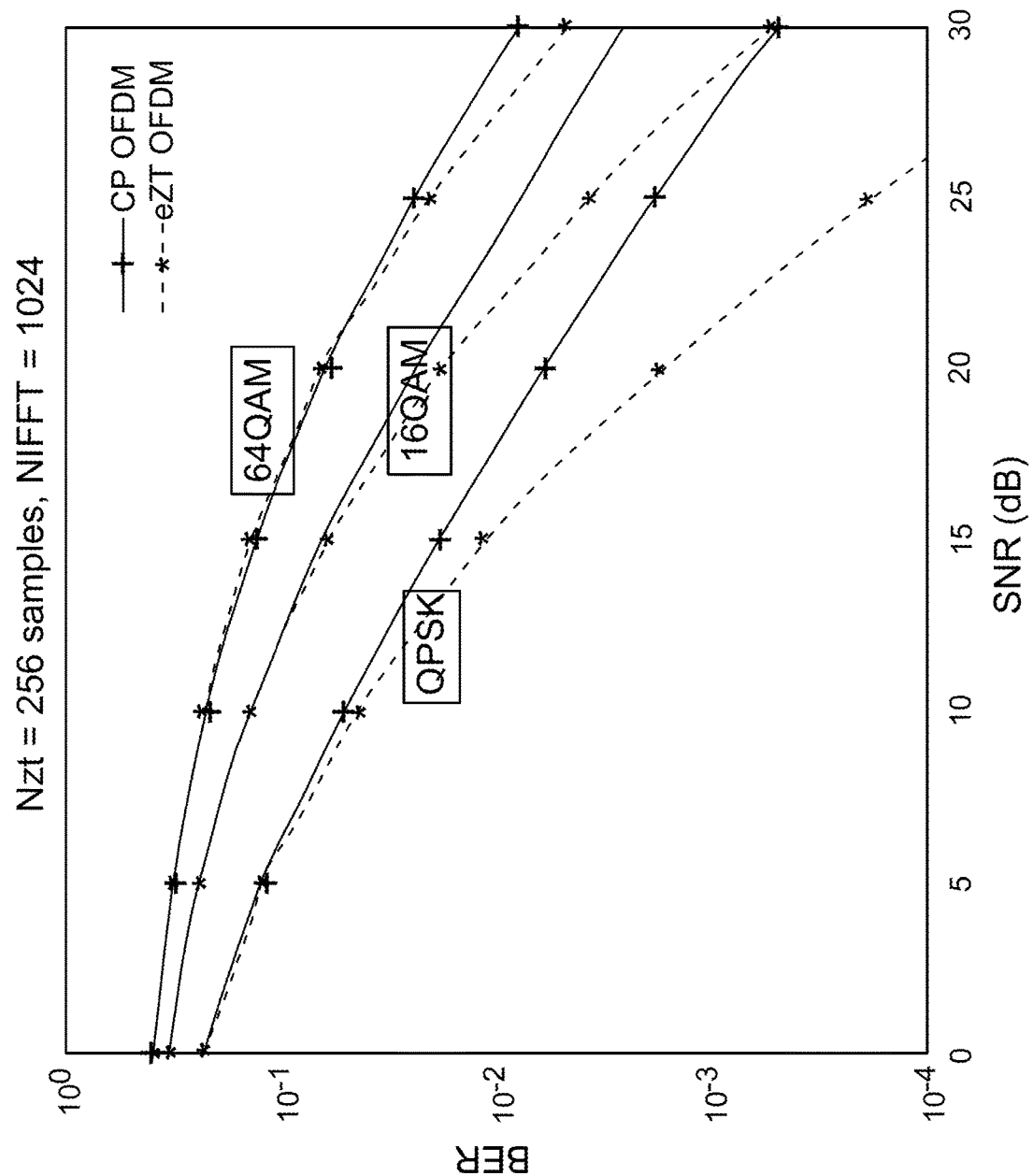
FIG. 39 illustrates BER simulation results for eZT OFDM according to one or more embodiments.

The performance of the disclosed eZT OFDM waveform has been analyzed with simulations. In the simulations M is set to 512, and NIFFT=1024. Nzt is set to 256 and high delay spread channel is assumed. FIG. 39 shows that eZT OFDM outperforms CP-OFDM due to the coding gain provided by the redundancy introduced as a result of the cancellation signal.

Figure 40:
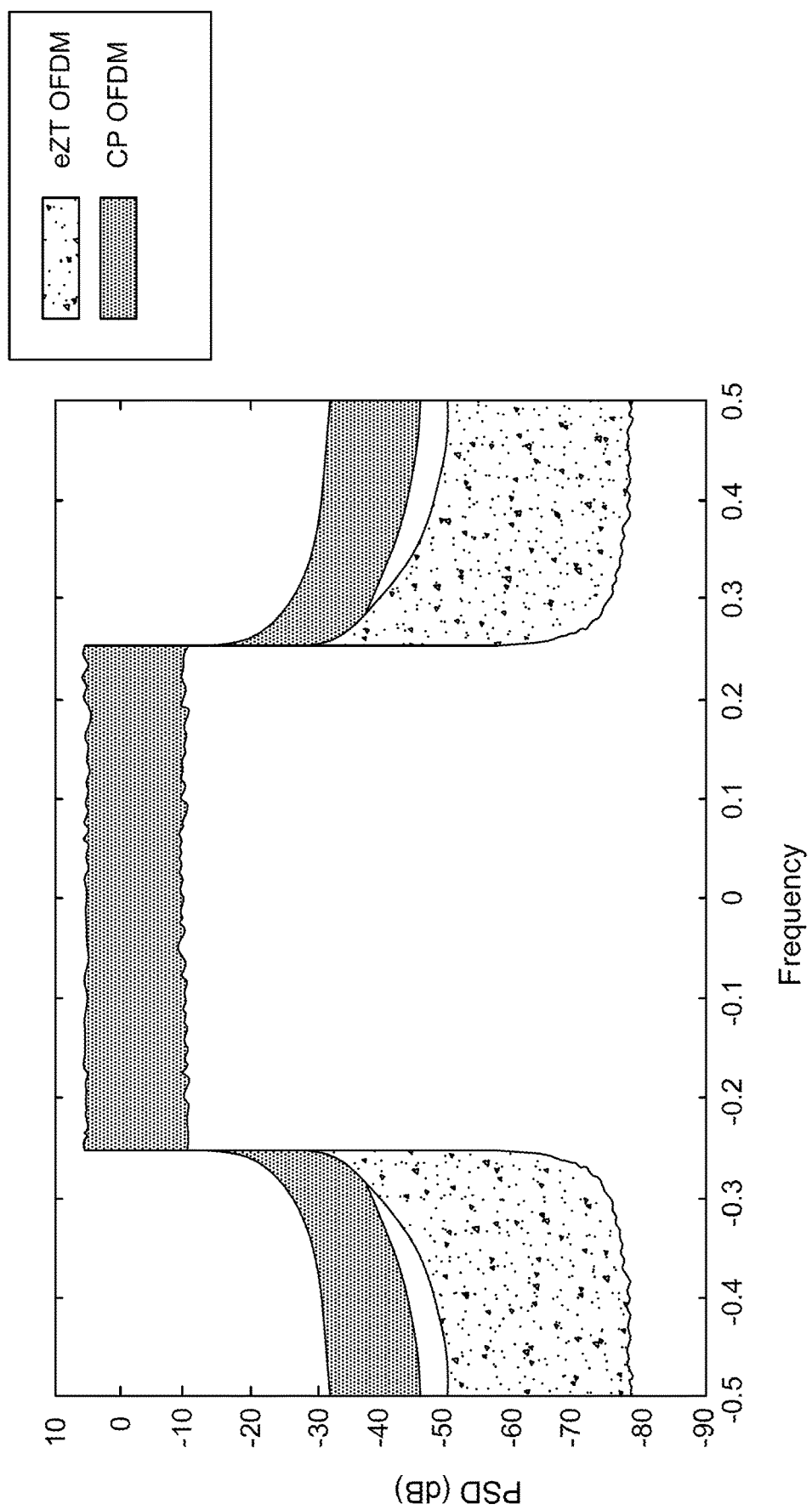
FIG. 40 illustrates out-of-band emission of eZT-OFDM according to one or more embodiments.

FIG. 40 shows that the out-of-band emission of eZT OFDM is much lower than CP-OFDM. Due to its low out-of-band emissions, eZT OFDM may be used as an alternative to filter-based OFDM embodiments such as F-OFDM or UFMC.

Setting a length of exact zero tail is described according to one or more embodiments. The length of an exact zero tail may vary from symbol to symbol or from transmission time interval (TTI) to TTI for the same user, and may take different exact zero tail lengths for different users simultaneously, as previously mentioned.

The length of the zero tail may be set by changing the number of zeros fed at the tail of the DFT (e.g., the DFT 1601 in FIG. 16) for eZT-DFT-s-OFDM or the number of sub-carriers fed with zeros for eZT-OFDM. Optionally, the head may also be fed a non-zero number of zeros at the DFT to further reduce tail power or out-of-band emissions. In this case, these will be in addition to the number of zeros fed to obtain a required tail length.

Mechanisms to generate unique word (UW) based waveforms both for eZT DFT-s-OFDM and eZT OFDM have been described above in reference to one or more embodiments. Utilizing the disclosed mechanisms, the length of the UW in either of these waveforms may be altered as required by first setting the length of exact zero-tail to the desired length, which may be equal to or less than a zero-tail portion of a data signal.

There may be one or more factors driving setting of zero-tail length. For example, the length of the exact zero tail required may be driven by at least one of several factors such as need for amount of delay spread to be addressed in a given TTI(s) for a specific user, length of the unique word (UW) required for different purposes such as synchronization, channel estimation, phase/gain tracking, identification of a specific user or a group of users based on UW sequence, beam-switching time, or any other purpose where the exact zero tail or unique sequence could be used.

Physical layer channels may be enabled on a per physical layer channel basis based exact zero-tail. For example, length of the exact zero-tail may be set differently for different physical layer control channels. This may be driven by a variety of factors. For instance, the beam-width with which each of the physical layer control channels need to be transmitted may be different, and hence may require different length of the exact zero-tail to compensate handling the required delay spreads.

The physical layer control channels may be transmitted with a wider beam-width compared to the physical layer data channels. Even within the physical layer control channels, the physical layer common control channel may be transmitted with a wider beam-width compared to physical layer dedicated control channel. This implies that the length of the exact zero-tail to be utilized may vary from physical layer control channels to physical layer data channels and even within physical layer control and data channels, the lengths may be different.

It should be noted that this does not restrict the scenarios where the beam-width or in other words same exact zero-tail length could be same between physical layer control and physical layer data or physical layer common versus physical layer dedicated channels.

Additionally or alternatively, UW lengths may be different for different physical layer channels. A unique word generated from the exact-zero tail methods described above may also utilize the same methodology as used for varying the lengths of exact-zero tail. For example, the length of UWs may be different for different physical layer channels. Also, the length of the UWs may vary from physical layer control channels to physical layer data channels and, even within physical layer control and data channels, the lengths of UWs may be different.

It also follows from the above that, even non-exact zero-tail based waveforms may utilize similar methodologies to vary their length as used for varying the lengths of exact zero-tail. For example, the length of non-exact zero-tail lengths may be different for different physical layer channels. Also, the length of the non-exact zero-tail lengths may vary from physical layer control channels to physical layer data channels and, even within physical layer control and data channels, the lengths of non-exact zero-tail lengths may be different.

In view of the above, exact zero tail may be used for beam switching. Beam-switching is important in the above 6 GHz frequencies for several reasons. It should be noted that this is a non-exhaustive list. These examples could be because a specific user has moved, an existing path is blocked either by a dynamic blocker or due to self-blocking, a change in user device's orientation, for example, rotational motion, etc., all potentially leading to change in propagation conditions. It could also be because the transmitter, for instance, is switching between users, or between different physical layer channels, etc.

As the eZT waveforms described above produce exact zeros, the exact zero tail could be utilized to assist with beam-switching without any degradation in performance. The exact zero-tail actually provides a period in which beam-switching may occur and the length of the exact zero-tail may be set or updated according to the beam-switching requirements. Details on how the length of the exact zero-tail may be altered for both eZT-DFT-s-OFDM and eZT-OFDM are disclosed above.

Signaling for conveying the length of exact zero tail or unique word is provided by the transmitter since the length of the zero tail or unique word should be signaled to the receiver. For example, the change of the ZT/UW length is initiated by the mB and signaled to the WTRUs.

In one solution, the mB may use separate signaling for downlink transmissions versus uplink transmissions. For downlink transmissions, the mB may use a downlink control information (DCI) format in the control channel, for example, PDCCH or the like, to signal the new ZT/UW length to the WTRU. An offset may be pre-defined and may be applied between the TTI used for the control channel transmission, and the TTI where the new ZT/UW length is applied. Also for downlink transmissions, when the length of the ZT/UW is changed semi-statically, the length may be signaled via RRC signaling or a Medium Access Control (MAC) control element (CE). For uplink transmissions, the mB may signal the change in ZT/UW length to the WTRU, via PDCCH transmissions associated to uplink grants.

In another solution, the same signaling may be used by the mB to configure the new ZT/UW length to the WTRUs for both downlink and uplink transmissions.

Both the disclosed eZT-DFT-s-OFDM and eZT-OFDM waveforms may be used either to generate exact zero-tail or to have unique word on a per symbol basis. These may easily be extended to adapt them on a per user, per TTI or any other combination thereof as these waveforms provide finer granularity at the symbol level to make required changes.

Figure 41:
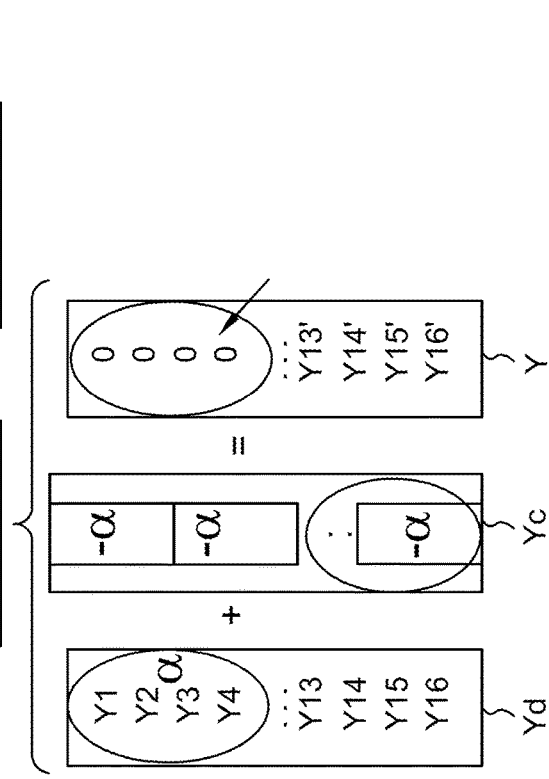
FIG. 41 illustrates selective addition of UW in both eZT-DFT-s-OFDM and eZT-OFDM achieved in the time domain according to one or more embodiments.

As described above, the addition of UW in both eZT-DFT-s-OFDM and eZT-OFDM is achieved in the time domain. Note that this may be done selectively in only a subset of the symbols where in the other symbols still have exact zero tails for both eZT-DFT-s-OFDM and eZT-OFDM as shown in FIG. 41. The opposite could also be the case where most symbols contain UW and few symbols contain exact zero-tail.

Without a loss of generality, it may also be seen that other combinations where a subset of symbols have zero-tail (not exact zeros) and other symbols have exact zero-tail, subset of symbols have no tail (which would correspond to length of exact zero tail being zero) whereas other symbols may have different non-zero length of zero tails, and other combinations thereof are also envisioned.

UW may be utilized to convey scheduling/control information and/or user/group identification. Unique word may refer to the insertion of known sequences instead of cyclic prefixes at the head of each the symbol. This may be obtained by adding the unique word after exact zeros are created as described above.

Implicit scheduling for data channels may be implemented using unique word. For example, unique word or a part of the unique word may be used to convey scheduling information for WTRU specific data channels. Here, a WTRU specific identifier or part of it may be used as a unique word in the symbols carrying data for that particular WTRU. Alternately, the unique word may be generated by a function of WTRU specific identifier, or a cell specific unique word may be scrambled with a WTRU specific identifier. Such a WTRU specific identifier may be assigned by the mB when the WTRU enters connected mode, for example, during a random access procedure. A WTRU may implicitly determine the data symbols destined for the WTRU by monitoring the presence of preconfigured identifier in the unique word. In some solutions, semi-static part of the scheduling information may be signaled using a separate control channel for example PDCCH which may last for one or more subframes. Such semi-static scheduling information may include frequency domain resource allocation, transmission mode, MCS, and optionally the WTRU specific identifier to be used in the unique word, etc. The fine grained time domain allocation information, for example, symbol level allocation, may be signaled using WTRU specific identifier in the unique word.

Implicit identification of channel type may be implemented using a unique word. A WTRU may use a unique word or a part of a unique word to identify or distinguish different types of physical channel transmitted by the mB. For example, the symbols within the subframe carrying control channel may be attached to a preconfigured unique word. A WTRU may be preconfigured with a logical mapping between different channel types and an associated unique word. A WTRU may additionally determine the length of the control channel within the subframe by calculating a number of symbols carrying a unique word associated with a control channel. Such a mechanism may be used instead of a separate physical channel such as Physical Control Format Indicator Channel (PCFICH). Similar mechanisms may be used to determine other physical channels like PHICH, etc.

A WTRU may identify broadcast channels similarly by monitoring for unique word reserved for broadcast signaling such as SIB, paging, etc.

A unique word may be used to identify a multicast group or a set of users. For example, a unique word or a part of a unique word may be used to identify or distinguish multicast groups or different sets of users, for example, device-to-device (D2D) users. The symbols within the subframe or an allocation may be associated with a preconfigured unique word. Users may be preconfigured with mapping between different multicast groups or user-sets and associated unique word(s). Additional information related to D2D or the multicast group could also be deduced from the unique word or number of symbols carrying the UW. Certain broadcast or multicast services, or different services offered for specific D2D users may also carry preconfigured unique words.

Figure 42:
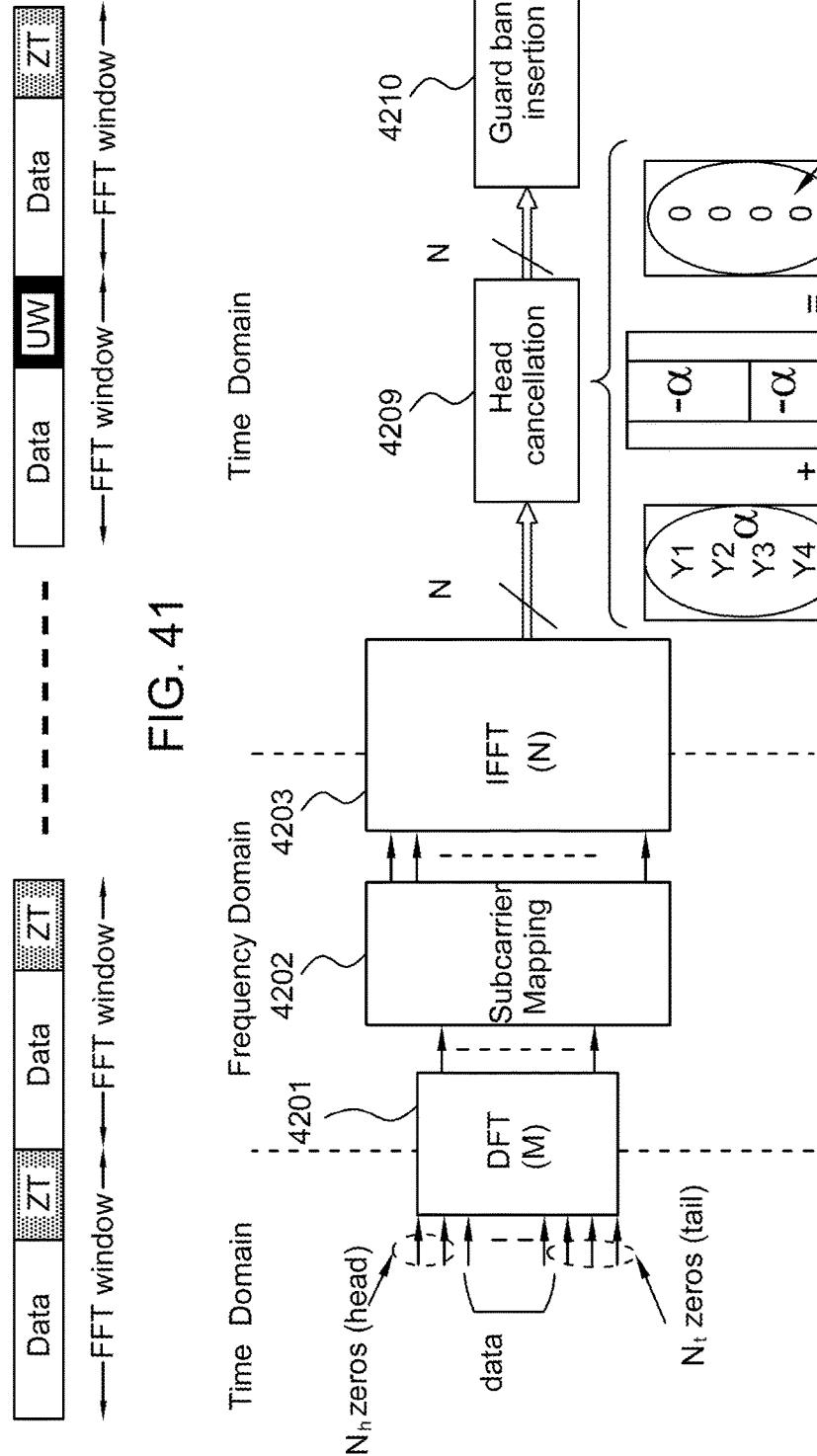
FIG. 42 illustrates a block diagram of a transmitter for DFT-s-OFDM with zero head generation according to one or more embodiments.

The ZT and UW based waveforms could also use a zero head instead of the zero tail without breaking the cyclicity of the signal. In this case, time domain head cancellation is implemented such that an exact zero is created at the head instead of the tail. The cancellation signal is generated by repeating Nzh samples from the head of the IFFT output. An example is illustrated in FIG. 42 for DFT-s-OFDM, where the head that needs to be cancelled consists of the vector [Y1 Y2 Y3 Y4], which is labeled a for convenience. It should be noted that, in this case, Nh>Nt.

FIG. 42 is a block diagram which illustrates time-domain head cancellation prior to guard band insertion for DFT-s-OFDM according to one or more embodiments. The transmitter illustrated in FIG. 42 includes an M size DFT block 4201, a subcarrier mapping block 4202 and an N size IFFT block 4203, as similarly described in step 1 of FIG. 16, a head cancelation block 4209, as similarly described in step 3 of FIG. 16 (except Nht time domain samples are used to generate data signal yd and cancellation signal yc to generate signal y), and a guard band insertion block 4210, as similarly described at the final output of FIG. 16. Further, the cancelation signal comprised of the vector [−α −α . . . −α], is generated by repeating the tail part (alpha vector) of the output signal of IFFT block 4203 N/Nzt times. The tail cancelation block 4209 generates the cancellation signal [−α −α . . . −α] and adds it to the output of the IFFT block (4203).

Similarly, zero head may be generated for one or more embodiments disclosed above.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus. A block may represent a processor or part of a processor for carrying out one or more functions.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
an antenna; and
a processor operatively coupled to the antenna; wherein:
the processor is configured to receive modulated data symbols and zeros in a frequency-domain;
the processor is further configured to map, in the frequency-domain, the modulated data symbols and zeros in an interleaved manner to sub-carriers within a resource allocation;
the processor is further configured to generate a time-domain data signal based on the mapped sub-carriers;
the processor is further configured to generate a time-domain cancellation signal by sign inverting and repeating a predetermined number of time-domain samples at a tail portion of the time-domain data signal;
the processor is further configured to combine the time-domain data signal and the time-domain cancellation signal to generate an exact zero tail data signal, wherein the exact zero tail data signal has a zero tail length equal to the predetermined number of time-domain samples; and
the processor and the antenna are configured to transmit the exact zero tail data signal.

2. The WTRU of claim 1, wherein the processor is further configured to generate the time-domain cancellation signal by inverting a sign of the time-domain samples and repeating a sequence of the inverted time-domain samples.

3. The WTRU of claim 1, wherein the processor is further configured to generate the time-domain cancellation signal by inverting a vector comprising the tail time-domain samples and repeating the inverted vector a plurality of times to generate a string of the inverted vectors such that the time-domain cancellation signal comprises the string of the inverted vectors.

4. The WTRU of claim 1, wherein the processor is further configured to generate the time domain cancellation signal by inverting the time-domain samples, converting the sign inverted time-domain samples into a plurality of frequency-domain symbols, and mapping the plurality of frequency-domain symbols in an interleaved manner to a plurality of allocated sub-carriers.

5. The WTRU of claim 4, wherein the plurality of frequency-domain symbols are uniformly interleaved over the plurality of allocated sub-carriers.

6. The WTRU of claim 1, wherein the processor is further configured to generate an exact zero tail data signal by shifting at least one time-domain sample from a tail portion of the exact zero tail data signal to a head portion of the exact zero tail data signal.

7. The WTRU of claim 1, wherein the exact zero tail data signal comprises a plurality of data blocks each having a zero-tail portion, and wherein the processor is further configured to insert, in the time-domain, a unique word at each zero tail portion of the exact zero tail data signal.

8. The WTRU of claim 1, wherein the processor is further configured to insert guard bands into the exact zero tail data signal.

9. The WTRU of claim 1, wherein the processor is further configured to:
sign invert the tail time-domain samples;
convert the tail time-domain samples into an inverted plurality of tail frequency-domain symbols with an Nzt size discrete Fourier transform (DFT);
map the inverted plurality of tail frequency-domain symbols to a plurality of allocated sub-carriers in an interleaved manner such that another plurality of zeros are inserted on $$\frac{M}{N_{zt}} - 1$$

consecutive sub-carriers of the plurality of allocated sub-carriers between each output of the Nzt size DFT, wherein M is a number of the plurality of allocated sub-carriers, Nzt is a number of the selected plurality of tail time-domain samples, and $$\frac{M}{N_{zt}}$$

is an integer; and
generate the time domain cancellation signal by converting the mapped inverted plurality of tail frequency-domain symbols into the time-domain such that the time-domain cancellation signal is a replica of the inverted plurality of tail time-domain samples, repeated $$\frac{M}{N_{zt}}$$

times.

10. The WTRU of claim 1, wherein the exact zero tail data signal is an orthogonal frequency-division multiplexing (OFDM) signal.

* * * * *